United States Patent

Hajjahmad et al.

[11] Patent Number: 5,933,537
[45] Date of Patent: Aug. 3, 1999

[54] METHOD AND APPARATUS FOR CONVERSION OF FREQUENCY-COEFFICIENT MATRICES

[75] Inventors: Ibrahim Hajjahmad, Somerville; Munib A. Wober, Haverhill; Michael L. Reisch, Carlisle, all of Mass.

[73] Assignee: Polaroid Corporation, Cambridge, Mass.

[21] Appl. No.: 08/887,093

[22] Filed: Jul. 2, 1997

Related U.S. Application Data

[63] Continuation of application No. 08/681,933, Jul. 29, 1996, abandoned.

[51] Int. Cl.$^6$ .............................. G06T 9/00; H04N 1/415

[52] U.S. Cl. ........................................... 382/250; 358/433

[58] Field of Search ................................... 382/250, 248; 348/420, 403; 358/420, 403

[56] References Cited

U.S. PATENT DOCUMENTS

| | | | |
|---|---|---|---|
| 5,168,375 | 12/1992 | Reisch et al. | 358/432 |
| 5,563,718 | 10/1996 | Wober et al. | 358/433 |

*Primary Examiner*—Scott Rogers
*Attorney, Agent, or Firm*—Joseph Stecewycz

[57] ABSTRACT

A method and apparatus are disclosed for converting frequency-coefficient matrices between a configuration in which the matrices are transforms of unoverlapped image-data matrices and a configuration in which the matrices are transforms of overlapped image-data matrices, the image-data matrices comprising image-data terms corresponding to pixels from an original image, the method comprising the steps of: deriving a conversion matrix; transposing the conversion matrix; matrix multiplying a first frequency-coefficient matrix of one configuration by the conversion matrix; matrix multiplying a second frequency-coefficient matrix of the same configuration by the transpose conversion matrix; and combining the product results to form a matrix formatted in the other configuration.

13 Claims, 23 Drawing Sheets

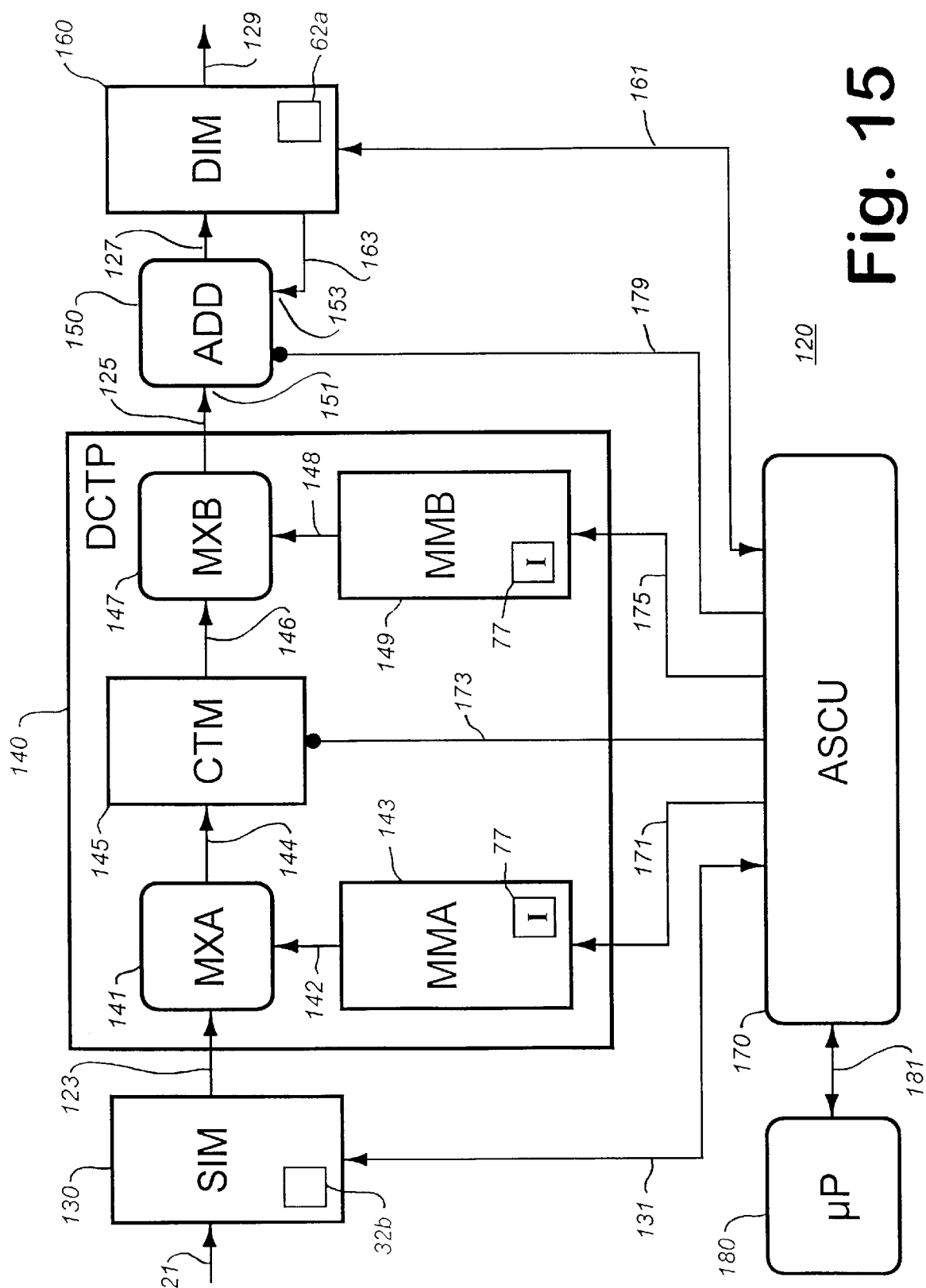

METHOD AND APPARATUS FOR CONVERSION OF FREQUENCY-COEFFICIENT MATRICES

This is a File Wrapper Continuation under 37 CFR 1.62 of U.S. application Ser. No. 08/681,933 filed Jul. 29, 1996, now abandoned.

FIELD OF THE INVENTION

This invention relates to image processing and, more particularly, to an apparatus and a method for converting an array of frequency-coefficient matrices between two different configurations.

BACKGROUND OF THE INVENTION

Image processing is employed in various applications, such as in the electronic conversion of photographic images, reproduction of graphical information in a printing operation, and coding and subsequent reconstruction of digital image data in electronic communication systems. Filtering is one such processing method and includes arithmetic operations performed on numerical values representing picture data elements, also known as pixels.

An original image, consisting of a photograph or a video frame, is typically digitized as a matrix of numerical values, commonly referred to as a "spatial domain" matrix comprising image data terms. Each image data term corresponds to a particular pixel in the image and the numerical value of the image data term quantitatively describes a feature characteristic of that pixel.

A widely-used standard for practicing filtering and other processing methods is described in the reference text, "JPEG Still Image Data Compression Standard," by William B. Pennebaker and Joan L. Mitchell. In accordance with the JPEG standard, a digitized image is provided as a series of image-data matrices, usually formatted as 8×8 matrices, and then a transformation process is applied to produce a series of processed frequency coefficient matrices which can be stored or transmitted. An inverse transformation is applied to the processed frequency coefficient matrices and the resulting series of processed image-data matrices are recombined into a processed image. The use of standard DCT electronic processing units for performing such transformations is well-known in the relevant art.

In many applications in the field of signal and image processing, a two-dimensional Discrete Cosine Transform (DCT) is used to transform the image data into frequency coefficients, and can be expressed in shorthand notation as, $$S(v,\mu) = C \times s(j,i) \times C^T$$

where, $S(v,\mu)$ are terms in the frequency coefficient matrix, $s(j,i)$ are terms in the image-data matrix, C is the basis matrix, and $C^T$ is the inverse transform of the basis matrix.

The corresponding 8-point DCT for an 8×8 image data matrix is given by the equation, $$S(v, \mu) = \frac{1}{4} C_v C_\mu \sum_{j=0}^{7} \sum_{i=0}^{7} s(j, i) \cos\left[(2i+1)\frac{\mu\pi}{16}\right] \cos\left[(2j+1)\frac{v\pi}{16}\right]$$

where $$C_k = \frac{1}{\sqrt{2}}$$

for k=0 and $C_k$=1 for k>0.

A two-dimensional inverse DCT (IDCT) is used to transform frequency coefficients into image data, and can be expressed in shorthand notation as, $$s(j,i) = C^T \times S(v,\mu) \times C$$

The corresponding 8-point two-dimensional IDCT is given by the equation, $$s(i, j) = \frac{1}{4} \sum_{v=0}^{7} C_v \sum_{\mu=0}^{7} C_\mu S(v, \mu) \cos\left[(2i+1)\frac{\mu\pi}{16}\right] \cos\left[(2j+1)\frac{v\pi}{16}\right]$$

The series of image-data matrices provided for processing is obtained from the original image by a method which first formats the original image pixels into a group of image-data blocks. Each block comprises an array of image-data terms, for example, an array of sixty-four terms in eight rows and eight columns. At least two alternative block configurations are discussed in the relevant art.

In one configuration, the image data matrix is simply partitioned into an array of "nonoverlapped" image-data blocks. Each block contains some of the image data terms from the image data matrix, and no block contains pixel data that is common to an adjacent block. The nonoverlapped image data block configuration is specified for image processing methods performed according to Joint Photographic Experts Group (JPEG) standard ISO DIS 10918-1. An array of image-data blocks in which each block contains no pixel data in common with an adjacent block is herein denoted as a standard spatial-domain array.

In an alternative, "overlapped" configuration, each block in the image data array has one or more rows and columns of image data terms in common with image-data terms found in one or more rows and columns of adjacent blocks. Image data terms are thus shared, or duplicated, among adjacent blocks in the array. It has been found that because image data is thus shared, certain image processing procedures show improved results when performed on blocks which have been overlapped, in comparison to blocks which have not been overlapped. An array of image-data blocks in which each block contains pixel data in common with adjacent blocks is herein denoted as an extended spatial-domain array.

The original image can also be defined by a set of frequency coefficient matrices, where the matrix terms are obtained by a mathematical transformation of blocks of original image data terms. These frequency-coefficient matrices can be derived from both overlapped and nonoverlapped image data blocks. Filtering operations are typically performed by mask multiplying a filter matrix with a frequency-coefficient matrix. For a particular filtering operation, one of the standard and the extended spatial-domain array configurations may be the preferred format. In such cases, a conventional filtering method includes applying a DCT, mask multiplying, and applying an IDCT.

However, in processing methods in which two or more filtering operations are performed, it may be necessary to execute one or more operations using extended-array matrices in addition to using standard array matrices. In such cases, it becomes necessary to convert between the standard and extended configurations so that all filtering operations can be accomplished.

The conventional process of converting frequency coefficients between standard and extended array configurations comprises the circuitous procedure of i) transforming frequency coefficients into image data by the application of an IDCT, ii) overlapping (or unoverlapping) the image-data blocks obtained, and iii) transforming the image data obtained into frequency coefficients by the application of a DCT. This process is inherently inefficient because of the reciprocal DCT/IDCT computations required. What is needed is a more efficient, direct method for converting between a standard-array and an extended-array matrix configuration.

It is therefore an object of the present invention to provide a method for efficiently converting a given array of frequency-transformed image data matrices between two different formats: one format in which the given matrices are derived from a standard array of nonoverlapped blocks of image data, and another format in which the given matrices are derived from an extended array of overlapped blocks of the same image data.

It is a further object of the present invention to provide such a method which performs the conversion between formats with greater computational efficiency than is typically found in the relevant art.

It is a further object of the present invention to provide a such method which is implemented in the frequency domain alone and does not require either a transform operation or the inverse transform operation for implementation.

It is a further object of the present invention to provide an apparatus for performing the conversion of an array of frequency-coefficient matrices between such formats.

It is a still further object of the present invention to provide such an apparatus by utilizing a standard DCT electronic processing unit.

Other objects of the invention will, in part, appear hereinafter and, in part, be apparent when the following detailed description is read in connection with the drawings.

SUMMARY OF THE INVENTION

The present invention is directed to an apparatus and a method for efficiently converting a given array of frequency-coefficient matrices between standard-array and extended-array configurations. In the standard-array configuration, the frequency-coefficient matrices comprise spatial-to-frequency transforms of an image-data matrix where the image-data matrix has been partitioned into nonoverlapped image-data blocks prior to transformation into the frequency domain. In the extended-array format, the frequency-coefficient matrices comprise spatial-to-frequency transforms of an image-data matrix where the image-data matrix has been partitioned into overlapped image-data blocks prior to transformation. The image-data matrix comprises terms derived from electrical signals corresponding to image element characteristics of an original image signal.

The disclosed method results from the observation that the conventional method of conversion, which includes execution of a frequency-to-spatial transformation followed by a reciprocal spatial-to-frequency transformation, can be made more efficient by eliminating redundant computations. A more efficient conversion method is realized by combining essential transformation computations into a mask multiply operation with suitable matrices. In the disclosed apparatus and method, conversion from standard to extended format is accomplished by mask multiplication by an R-matrix and its transform. Conversion from extended to standard format is accomplished by mask multiplication by P- and Q-matrices and their transforms.

BRIEF DESCRIPTION OF THE DRAWINGS

The novel features that are considered characteristic of the present invention are set forth with particularity herein. The organization and method of operation of the invention, together with other objects and advantages thereof, will be best understood from the following description of the illustrated embodiments when read in conjunction with the accompanying drawings wherein

FIG. 15 is a functional block diagram illustrating a preferred embodiment of the matrix array convertor of FIGS. 14A and 14B;

DETAILED DESCRIPTION OF THE INVENTION

I. Definitions and Nomenclature

The following definitions are used in this specification:
a) Nonoverlapped image-data block—an image-data block, or matrix, obtained by partitioning an array of image-data terms into smaller blocks of image-data terms, such that any image-data term in the initial array is mapped into, at most, one corresponding image-data block.
b) Overlapped image-data block—an image-data block, or matrix, obtained by the process of generating a plurality of such image-data blocks from an array of image-data terms, such that any image-data term in the initial array is mapped into at least two adjacent image-data blocks.
c) Standard spatial-domain array—an array of nonoverlapped image-data blocks.
d) Extended spatial-domain array—an array of overlapped image-data blocks.
e) Standard frequency-coefficient matrix—a matrix frequency-coefficient terms obtained by applying a transform to a nonoverlapped image-data matrix.
f) Extended frequency-coefficient matrix—a matrix of frequency-coefficient terms obtained by applying a transform to an overlapped image-data matrix.
g) Standard frequency-domain array—an array of standard frequency-coefficient matrices.
h) Extended frequency-domain array—an array of extended frequency-coefficient matrices.
i) Standard-array format—a configuration in which the matrices used in the image processing operation(s) are standard frequency-coefficient matrices.
j) Extended-array format—a configuration in which the matrices used in the image processing operation(s) are extended frequency-coefficient matrices.

II. Overview of Disclosed Method

Figure 1:
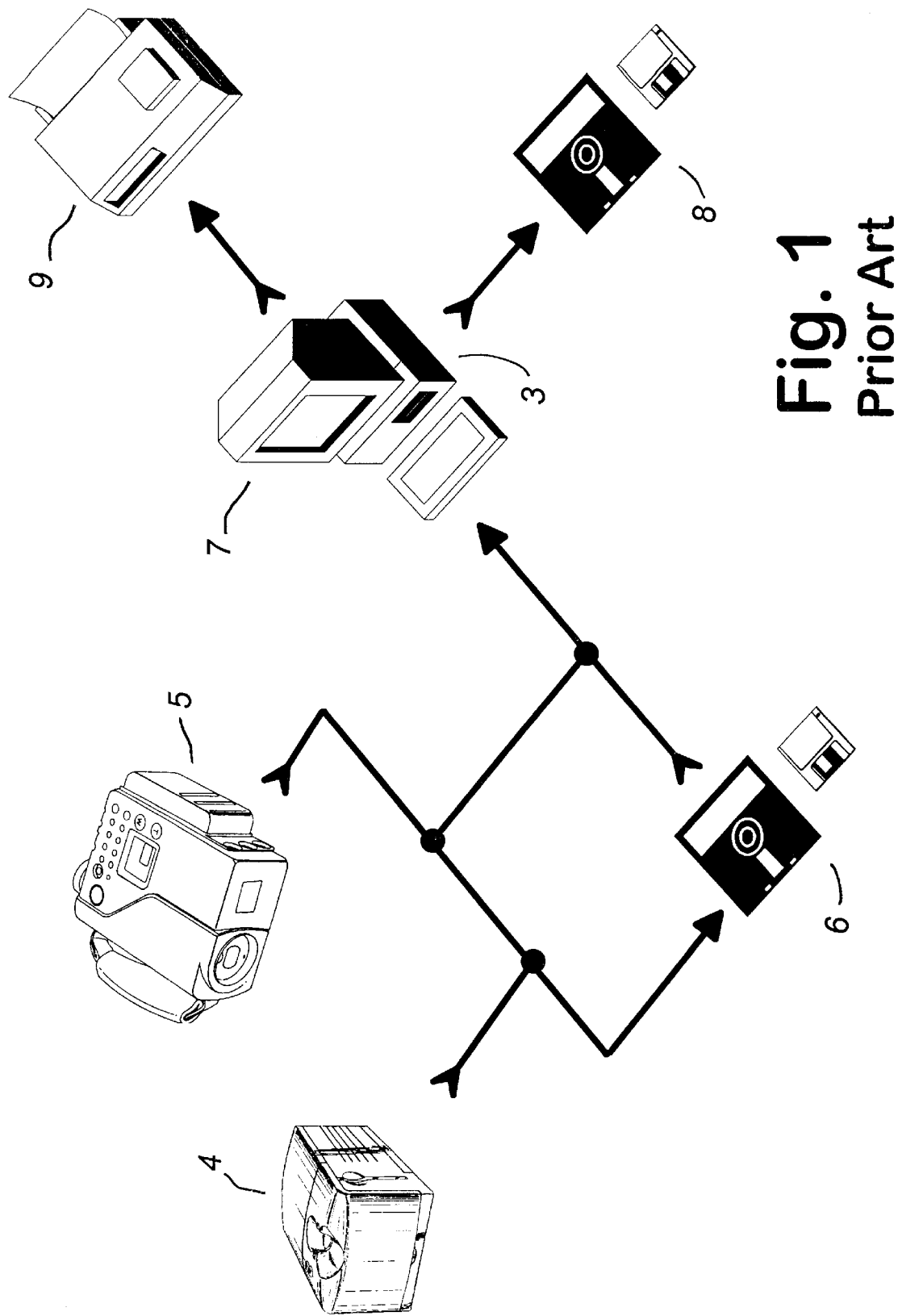
FIG. 1 is a diagrammatic illustration of a conventional image processing system indicating the flow of image data from an image source to an image processor to produce an image output.

FIG. 1 illustrates, in diagrammatic form, a conventional image processing system. An original image (not shown) is digitized and sent to an image processing unit 3 which performs one or more processing operations, such as image-data compression, color modification, or filtering. The source of the digitized image can be an image digitizer, such as an optical scanner 4 or a video camera 5. Alternatively, the digitized image can be stored by means of a optical or magnetic storage medium, such as input disc 6, before being sent to image processing unit 3.

After processing has been performed, the processed image data can be stored in an output disc 8. The processed image, recovered from the processed image data, can be displayed on a monitor 7 or transmitted to a printing device 9. Some or all of these processing steps can also be performed by an electronic component, or image-data processing apparatus, which can be made part of the optical scanner 4, the video camera 5, or the printing device 9 and can eliminate the need for the larger, separate processing unit 3.

Figure 2:
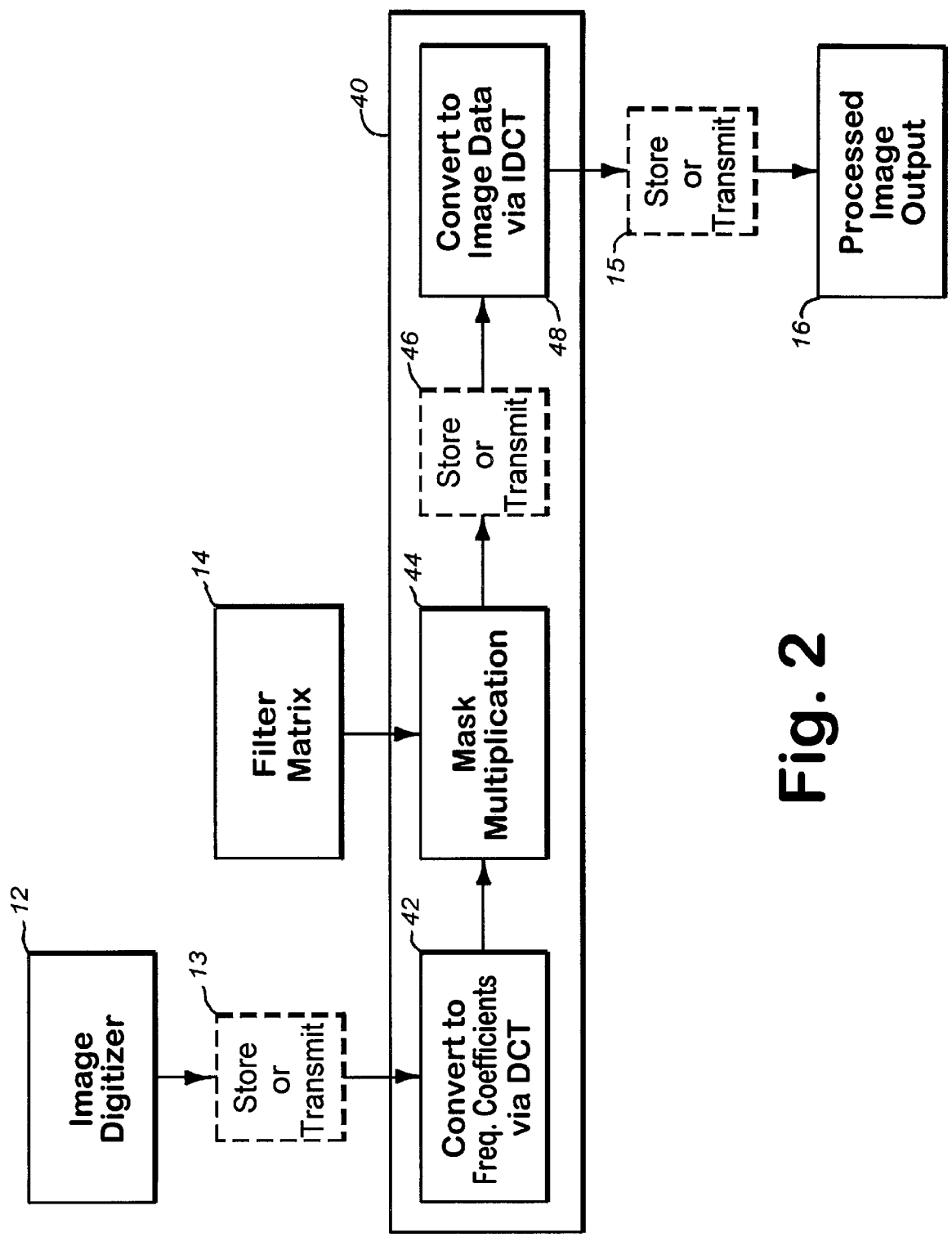
FIG. 2 is a block diagram illustrating the functional relationship between an image source, an image-data processing apparatus according to the present invention, and a processed image output.

FIG. 2 is a block diagram illustrating the relationship between an image digitizer 12, a processed image output 16, and an image-data processing apparatus 40 in accordance with the present invention. A digitized source image is generated from an original image by means of image digitizer 12, which can be a device such as a video camera, a digital still camera, or an optical scanner. The source image is usually configured as a two-dimensional array of numerical values, each value denoting a picture element, or pixel, where each pixel corresponds to a portion of the original image. In a standard display format, for example, this array can comprise 640 columns and 480 rows of pixels.

The array of numerical values comprising the source image is provided to image-data processing apparatus 40 where filtering, or convolution, is performed to produce filtered numerical values corresponding to a filtered image. The particular filtering process performed on the source image is determined by the characteristics of a filter matrix 14 provided to image-data processing apparatus 40. Alternatively, the source image may have been previously sent to an input storage or transmittal device 13 before being provided to image-data processing apparatus 40. Input storage or transmittal device 13 can be a component such as a magnetic storage medium, a solid-state memory, an optical medium, or an electronic transmittal device such as a facsimile machine or a modem.

After filtering has been performed on the array of numerical values, image-data processing apparatus 40 exports filtered numerical values which comprise a processed image output 16. In turn, processed image output 16 can be displayed on a panel or a CRT-type device, or fixed in a tangible medium by a printing device. In some applications, the filtered numerical values comprising processed image output 16 may have been sent to an output storage or transmittal device 15 before being displayed or printed.

Image-data processing apparatus 40 operates by first converting the inputted array of numerical values into an array of frequency coefficients by means of a forward DCT, at step 42, as is well-known in the relevant art. The frequency coefficients are then mask multiplied by a matrix derived from filter matrix 14, at step 44, and then converted into filtered numerical values by means of an IDCT, at step 48. In some applications, the modified frequency coefficients may be sent to an interim storage or transmittal device, at step 46, before conversion to image data is performed. In the descriptions which follow, the JPEG standard of 8×8 matrices is employed, but it should be understood that this is done for illustrative purposes only, and that the disclosed invention can be practiced with frequency-coefficient matrices of another desired size, such as 16×16.

III. Conventional (Indirect) Method of Matrix Conversion

Figure 3:
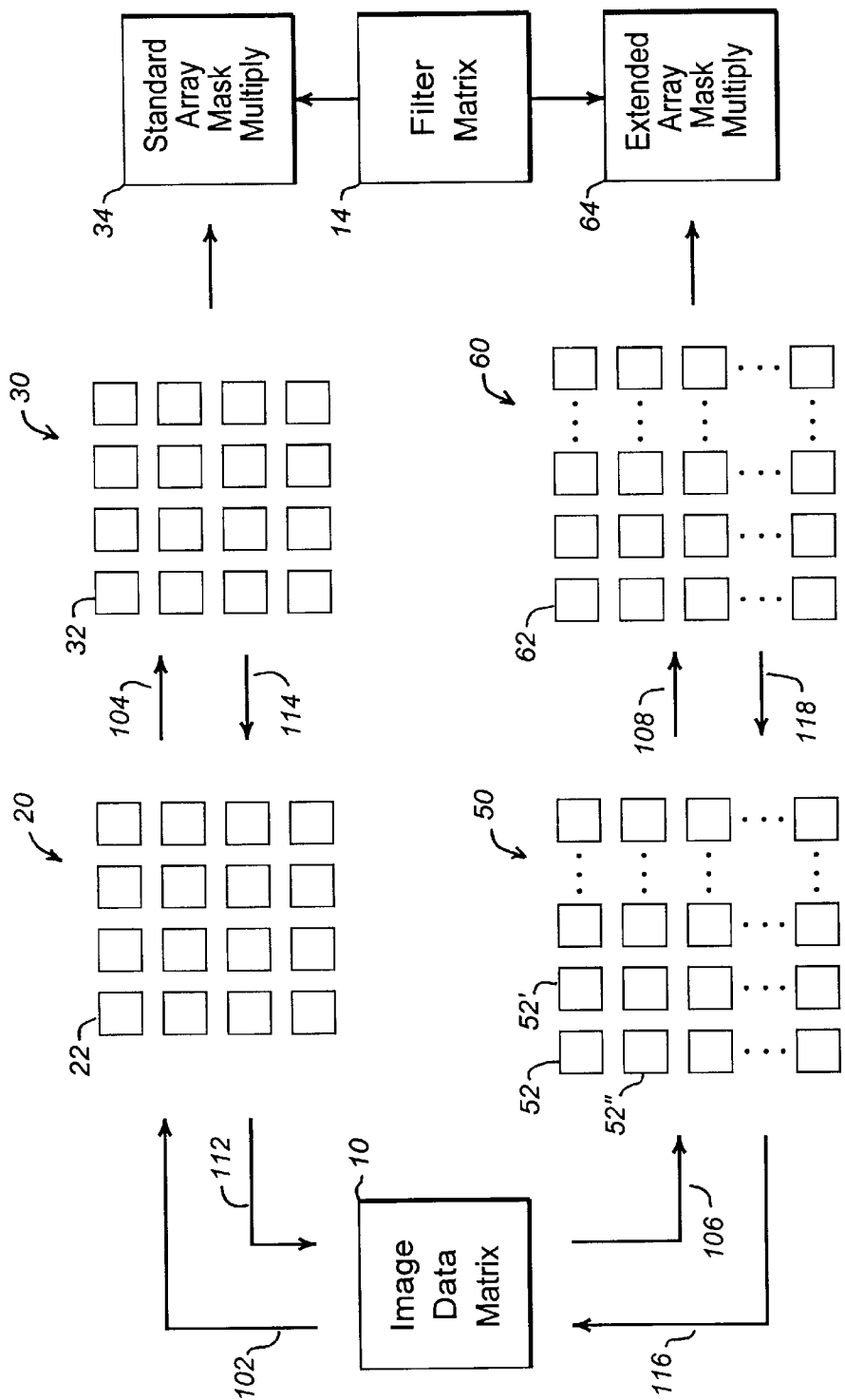
FIG. 3 is a diagram illustrating a conventional method of performing a filtering operation using frequency-coefficient matrices, including transformation between standard-array and extended-array formats.

FIG. 3 is a diagram illustrating a conventional method of transforming an H×V spatial domain image data matrix 10 into an M×N standard frequency-domain array 30 and also into an R×S extended frequency-domain array 60. The method used to obtain standard frequency-domain array 30 is shown in the upper portion of the diagram. Image data matrix 10 is first partitioned, at step 102, into an M×N standard spatial-domain array 20 of n×n nonoverlapped image-data blocks 22. The number of image-data blocks obtained by partitioning depends upon both the number of terms contained within image data matrix 10 and the size of image data block 22. The approximate size of standard spatial-domain array 20 can be found from the relationships, $$M = int\left|\frac{H}{n}\right| \text{ and } N = int\left|\frac{V}{n}\right|.$$

For the purpose of illustration, consider image data matrix 10 to be a 32×32 matrix and nonoverlapped image-data blocks 22 to conform to the JPEG standard format of 8×8 matrices. Standard spatial-domain array 20 will, in this example, consist of sixteen nonoverlapped image-data blocks 22 in a 4×4 array as shown.

The set of terms contained in each nonoverlapped image-data block 22 is transformed, at step 104, into a corresponding set of frequency coefficients by means of an orthogonal linear mathematical transform such as a Discrete Cosine Transform (DCT), a Fourier Transform, or a Discrete Sine Transform. In a preferred embodiment, this transformation is accomplished by applying a forward DCT in accordance with the equation, $$S(v,u) = C \times s(j,i) \times C^T$$

where s(j,i) are image data terms in nonoverlapped image-data block 22 and S(v,u) are frequency coefficient terms in a corresponding 8×8 standard frequency-coefficient matrix 32. The standard frequency-coefficient matrices 32 are made available to a standard mask multiply operation 34 using filter matrix 14, such as image coding in a JPEG environment, which utilizes coefficient matrices obtained from nonoverlapped blocks of image data.

The process of transforming image data matrix 10 into standard frequency-domain array 30 can be reversed to recover image data matrix 10 by first performing an IDCT on the frequency coefficient terms, in accordance with the equation, $$s(j,i) = C^T \times S(v,u) \times C$$

To recover image data matrix 10, the IDCT is applied to each standard frequency-coefficient matrix 32, at step 114, to first obtain the corresponding nonoverlapped image-data block 22. The standard spatial-domain array 20 of 8×8 image-data blocks 22 derived by the IDCT is then recombined, at step 112, to form 32×32 image data matrix 10.

Although standard frequency-domain array 30 can be used in most standard image processing operations, there are certain operations which benefit from using an alternatively-formatted frequency-domain array. For example, when data compression is performed on standard frequency-domain array 30, undesirable "blocking" artifacts may appear in the processed image. However, when image data blocks have been overlapped prior to being transformed into frequency coefficient blocks, the incidence of blocking artifacts is reduced or eliminated. The use of overlapping to reduce blocking artifacts is well-known in the relevant art (e.g., Jae S. Lim, "Two-Dimensional Signal and Image Processing," 1990 Prentice Hall, p. 653). For an image data matrix partitioned into 8×8 blocks, a 50% overlap is typically used. This yields overlapped image data blocks having four rows and columns of terms which are repeated in adjacent image data blocks.

For filtering operations which require an alternatively-formatted frequency domain array, image data matrix 10 is first overlapped, at step 106, into an extended spatial-domain array 50 of 8×8 overlapped image-data blocks 52. One or more rows and columns of image-data block 52 are repeated in adjacent blocks, such as image-data blocks 52' and 52". Because image data terms are repeated in the overlapping process, redundant image data terms are introduced into extended spatial-domain array 50 as overlapped image-data blocks 52 are generated.

The inclusion of the additional, redundant data terms results in extended spatial-domain array 50 having a size greater than the 4×4 size of standard spatial-domain array 20. That is, R>M and S>N. The overlapped image-data blocks 52 in extended spatial-domain array 50 are then transformed by means of a forward DCT, at step 108, to produce an extended frequency-domain array 60 of extended frequency-coefficient matrices 62. The extended frequency-coefficient matrices 62 are made available to a mask multiply operation 64 using filter matrix 14, or to another image-processing operation or sequence of operations which require frequency coefficient matrices obtained from overlapped blocks of image data.

The process of converting image data matrix 10 into extended frequency-domain array 60 can be reversed to recover image data matrix 10. An IDCT is applied to each extended frequency-coefficient matrix 62, at step 118, to yield a corresponding overlapped image-data block 52. Extended spatial-domain array 50 is then unoverlapped, at step 116, to recover image data matrix 10. The process of unoverlapping image-data blocks at step 116 is described in greater detail below.

By executing the appropriate steps, it is thus possible to convert an array of frequency-coefficient matrices between a standard-array format, such as standard frequency-domain array 30, and an extended-array format, such as extended frequency-domain array 60. The inventive method disclosed herein achieves these conversions in a more direct and efficient manner than do the conventional methods described above. The greater relative efficiency of the disclosed method can be best explained with reference to FIGS. 4 and 5.

Figure 4:
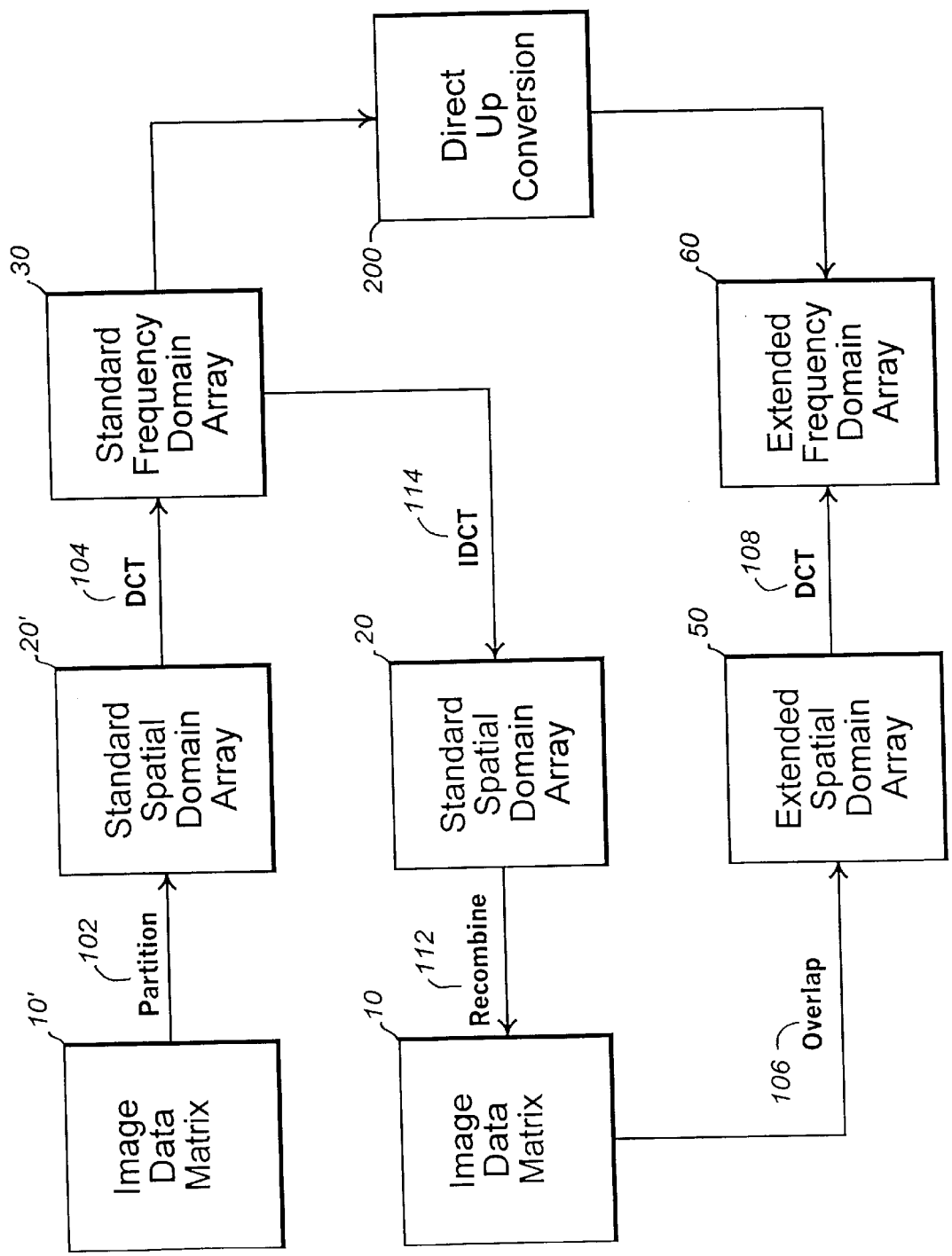
FIG. 4 is a block diagram illustrating both a conventional method and the disclosed method of upconverting frequency-coefficient matrices in a standard-array format into frequency-coefficient matrices in an extended-array format.

FIG. 4 illustrates both the direct method according to the invention and the conventional indirect method for converting from standard frequency-domain array 30 into extended frequency-domain array 60. Standard frequency-domain array 30 may have been previously derived from a standard spatial domain array 20' which, in turn, may have been previously derived from an image data matrix 10'. The disclosed method, denoted as direct upconversion, at step 200, is described in more detail in the next section below. In the conventional method, an IDCT is first applied to the standard frequency-domain array 30, at step 114, to obtain standard spatial-domain array 20 which is then recombined, at step 112, into image data matrix 10. Image data matrix 10 is then overlapped, at step 106, into extended spatial-domain array 50 which is then transformed by applying a DCT, at step 108, to yield extended frequency-domain array 60.

The procedure of performing an IDCT to recover image data terms, at step 114, and the procedure of re-transforming the image data terms by performing a DCT, at step 108, are, effectively, reciprocal mathematical operations. It can be appreciated that the inclusion of these reciprocal transform operations in the indirect method makes it a relatively inefficient process. In contrast, the disclosed method of direct upconversion, at step 200, is performed entirely in the frequency domain and eliminates the need for performing the IDCT of step 114 and the DCT of step 108.

Figure 5:
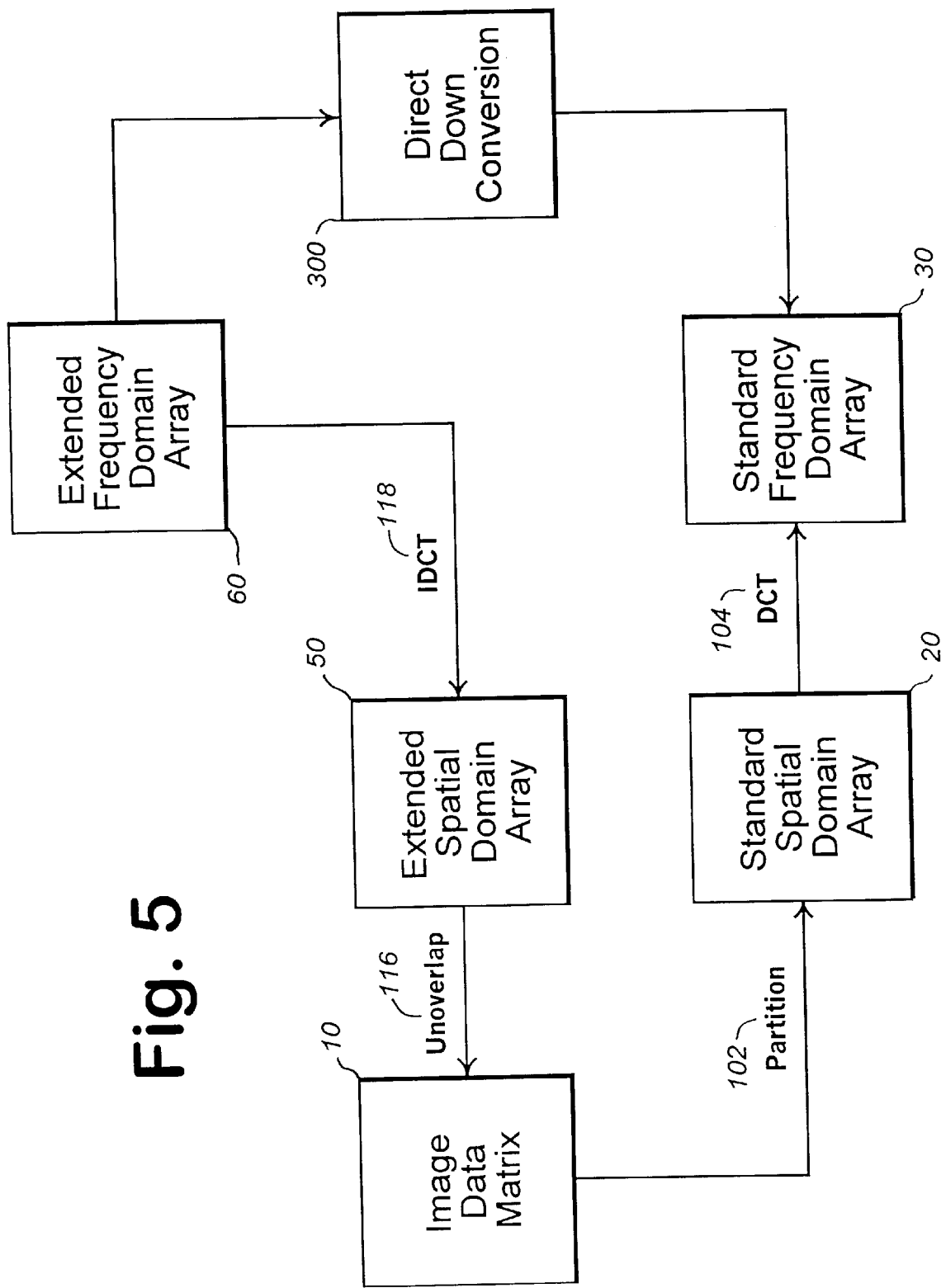
FIG. 5 is a block diagram illustrating both a conventional method and the disclosed method of downconverting frequency-coefficient matrices in the extended-array format into frequency-coefficient matrices in the standard-array format.

FIG. 5 illustrates both the direct method, in accordance with the present invention, and the conventional indirect method for converting from extended frequency-domain array 60 into standard frequency-domain array 30. The disclosed method, denoted as direct downconversion, at step 300, is described in greater detail below following the section describing the disclosed direct upconversion method. In the conventional method, an IDCT is first applied to extended frequency-domain array 60, at step 118, to obtain extended spatial-domain array 50 which is then unoverlapped, at step 116, into image data matrix 10. Image data matrix 10 is then partitioned, at step 102, into standard spatial-domain array 20 which is then transformed by applying a DCT, at step 104, to yield standard frequency-domain array 30. The application of an IDCT, at step 118, and a DCT, at step 104, are reciprocal transformation operations which are not used in the more efficient direct downconversion method, at step 300.

IV. Method of Direct Upconversion

The disclosed method of direct upconversion is best described with reference to FIG. 6 which is a diagram illustrating two relationships: a first relationship between standard frequency-coefficient matrices 32 and the image data terms in image data matrix 10, and a second relationship between extended frequency-coefficient matrices 62 and the image data terms in image data matrix 10. In the example provided, and discussed in detail below, extended frequency-coefficient matrices 62 are presumed to have been derived from overlapped 8×8 image-data blocks 52 obtained by using a 50% overlap of nonoverlapped image-data blocks 22, although the method of direct upconversion disclosed herein is not to be construed as limited to this configuration. That is to say, a larger or a smaller overlap can be used with image-data blocks of other sizes to obtain overlapped image data terms.

A. Method of Overlapping Image-Data Blocks

Image data matrix 10 consists of a 32×32 array of image data terms, partitioned into sixteen 8×8 nonoverlapped image-data blocks 22 as indicated by dashed lines 12, each block 22 containing sixty-four image data terms. The nonoverlapped image-data blocks 22 form four rows and four columns of blocks within partitioned image data matrix 10. Image data matrix 10 includes a block 22*a* in the first row and first column, a block 22*b* in the first row and second column, and a block 22*r* in the fourth row and fourth column. Each 8×8 image-data block 22 corresponds to the IDCT, applied at step 114, of one standard frequency-coefficient matrix 32 in standard frequency-domain array 30.

In the example provided, an IDCT has been applied to standard matrices 32*a*, 32*b*, 32*c*, and 32*d* through 32*r* to obtain nonoverlapped image-data blocks 22*a*, 22*b*, 22*c*, and 22*d* through 22*r* respectively. Thus, the set of image data terms found in each of the sixteen nonoverlapped image-data blocks 22 is related, via the application of an IDCT, to one of the sixteen standard frequency-coefficient matrices 32.

The relationship between the image data terms in image data matrix 10 and extended frequency-coefficient matrices 62 can be shown by utilizing a "window," sized to enclose a set of sixty-four image data terms in four rows of four columns, where the window is moved along successive rows or columns of image data matrix 10 to define a sequence of image-data sets. Each image-data set thus defined corresponds to an overlapped image-data block.

To produce this sequence of 8×8 overlapped image-data blocks using a 50% overlap, one method is to proceed as follows: 1) a set of sixty-four image data terms is enclosed by the window (e.g., the image data terms corresponding to nonoverlapped image-data block 22*a*) to define a first overlapped image-data block; 2) a second, horizontally-adjacent, overlapped image-data block is then found by moving the window four columns to the right so as to enclose the set of sixty-four image data terms consisting of thirty-two terms, in four columns (common to the first nonoverlapped image-data block 22*a*) and thirty-two additional terms, in four columns (common to the adjacent nonoverlapped image-data block 22*b*); 3) step (1) is repeated for nonoverlapped image data blocks 22*b*, 22*c*, and 22*d* to define third, fifth, and seventh overlapped image-data blocks respectively; and 4) step (2) is repeated for nonoverlapped image data block pairs 22*b*/22*c*, and 22*c*/22*d* to define fourth and sixth overlapped image-data blocks respectively. This process is repeated after moving downward four rows at a time, until all desired overlapped image-data blocks have been obtained.

In the example provided, it can be seen that an overlapped image-data block can be derived from a single nonoverlapped image-data block, or from two horizontally-adjacent blocks, or from two vertically-adjacent blocks, or from four abutting blocks, when a 50% overlap is used. Each of these four cases of overlapping-block derivation is represented by one of four windows, denoted as 52*a*', 52*b*', 52*c*', and 52*d*', which have been superimposed upon image data matrix 10. Each window shown encloses image data terms in eight rows of eight terms each. Overlapped image-data blocks 52*a*, 52*b*, 52*c*, and 52*d* contain the same image data terms as are enclosed within windows 52*a*', 52*b*', 52*c*', and 52*d*'respectively. In the first and simplest case of overlapped-block derivation, window 52*a*' is coincident with and encloses the same image data terms found in image-data block 22*b*. Overlapped image-data block 52*a*, therefore, includes the same image data terms as nonoverlapped image-data block 22*b*.

In the second case of overlapped-block derivation, window 52*b*' encloses some of the image data terms found in horizontally-adjacent, nonoverlapped image-data blocks 22*c* or 22*d*. These terms include the four rightmost columns of nonoverlapped image-data block 22*c* and the four leftmost columns of nonoverlapped image-data block 22*d*. Overlapped image-data block 52*b*, therefore, contains the four rightmost columns of block 22*c* and the four leftmost columns of block 22*d*.

In the third case, window 52*c*' encloses some of the image data terms found in vertically-adjacent, nonoverlapped image-data blocks 22*e* or 22*i*. These terms include the four bottom rows of nonoverlapped image-data block 22*e* and the four top rows of nonoverlapped image-data block 22*i*. Overlapped image-data block 52*c*, therefore, contains the four bottom rows of block 22*e* and the four top rows of block 22*i*.

In the fourth case, window 52*d*' encloses some of the image data terms found in the four abutting nonoverlapped image-data blocks 22*k*, 22*m*, 22*q* or 22*r*. These terms include: i) the four rightmost image data terms in each of the bottom four rows of nonoverlapped image-data block 22*k*, ii) the four leftmost image data terms in each of the bottom four rows of nonoverlapped image-data block 22*m*, iii) the four rightmost terms in each of the four top rows of nonoverlapped image-data block 22*q*, and iv) the four leftmost terms in each of the four top rows of nonoverlapped image-data block 22*r*. Overlapped image-data block 52*d*, therefore, contains sixteen terms from each of nonoverlapped image-data blocks 22k, 22m, 22q and 22r. Image data terms at the boundaries of image data matrix 10 can be used to produce overlapped image-data blocks by alternative means, such as copying, reflection, or discarding, as is well-known in the relevant art.

As stated above, the disclosed method of direct upconversion is computationally more efficient than the prior art indirect conversion method. The method of direct upconversion recognizes that overlapped image-data blocks are equivalent to one of the above-described four cases of nonoverlapped image-data blocks conversions, and that this observation can be used to directly relate the image data terms to be derived for overlapped image-data blocks with image data terms provided in nonoverlapped image-data blocks. That is to say, the image data terms in an overlapped image-data block may be identical to: i) all the image data terms within a single nonoverlapped block, or to ii) some columns of image data terms within two horizontally-adjacent nonoverlapped blocks, or to iii) some rows of image data terms found within two vertically-adjacent nonoverlapped blocks, or to iv) some portions of the rows and columns found within four abutting nonoverlapped blocks.

Because a direct relationship exists between image data terms in nonoverlapped blocks and image data terms in overlapped blocks, a secondary relationship can be ascertained between frequency-coefficients derived from overlapped image-data blocks and frequency-coefficients derived from nonoverlapped image-data blocks. By this secondary relationship there is determined: i) a first type of frequency coefficient terms in standard frequency-coefficient matrices which are the same as terms found in a related upconverted extended frequency-coefficient matrices and, therefore, need no mathematically processing for derivation, and ii) a second type of frequency coefficient terms in standard frequency-coefficient matrices which are not the same terms found in related upconverted extended frequency-coefficient matrices and, therefore, do need to be mathematically processed for derivation.

The first type of frequency-coefficient terms derive from nonoverlapped image-data blocks which are coincident with some of the overlapped image-data blocks in extended spatial-domain array 50. The first type of frequency-coefficient terms are found in the first case of overlapped-block derivation described above. The second type of frequency-coefficient terms are found in the second, third, and fourth cases described above. For the latter three cases, there is derived below a simplified mathematical relationship which can be used to find frequency coefficient terms comprising the extended frequency-coefficient matrices, these terms being found from the frequency-coefficient terms comprising the secondarily-related standard frequency-coefficient matrices.

B. Direct Upconversion with Coincident Image-Data Blocks

Figure 7:
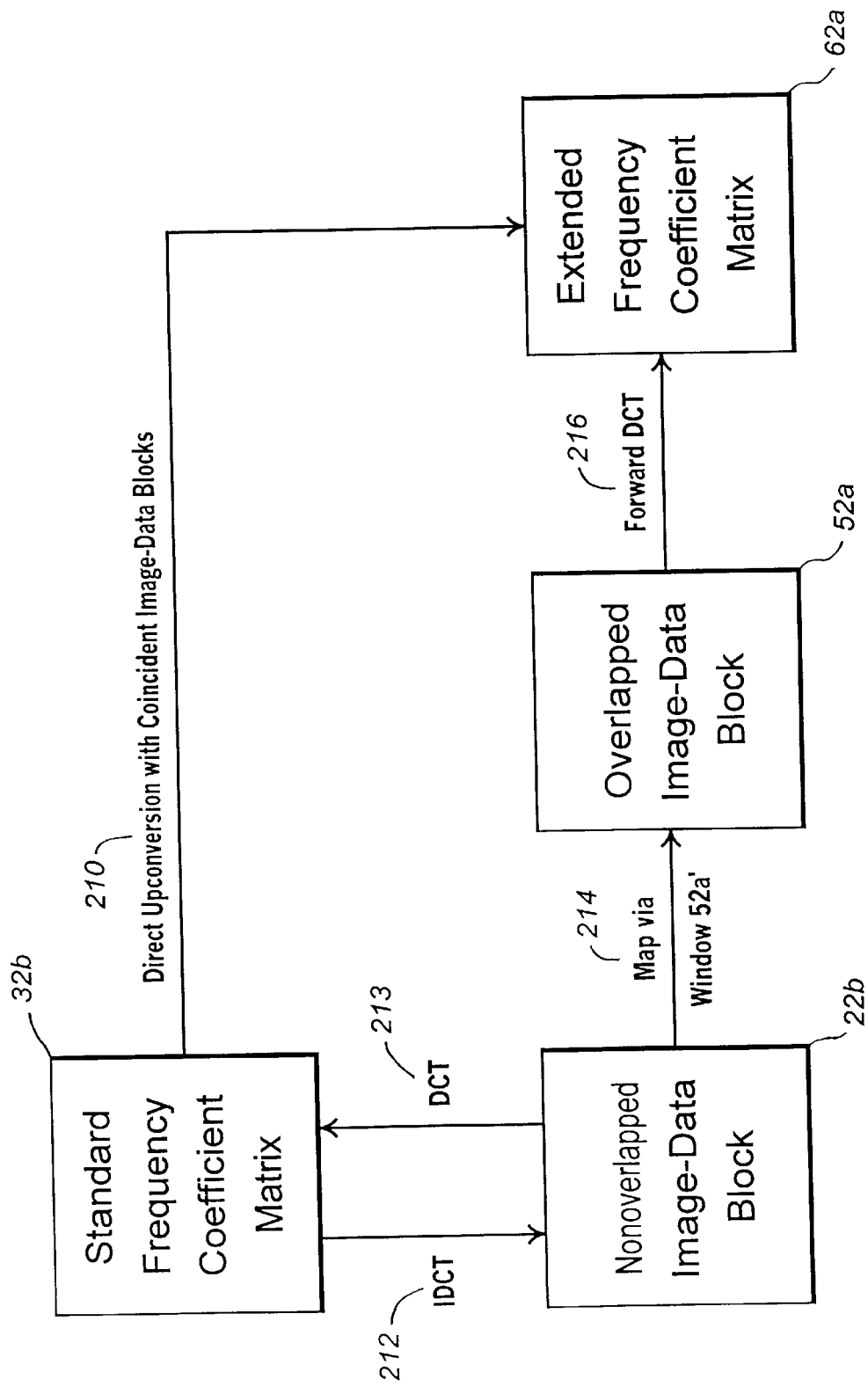
FIG. 7 is a diagram illustrating both conventional and disclosed methods of converting a frequency-coefficient matrix of a first type into a frequency-coefficient matrix in an extended-array format.

The direct upconversion procedure used for the first case of overlapped-block derivation (i.e., coincident image data blocks) is derived by simplifying the operational steps, described above, by which an extended frequency-coefficient matrix, exemplified by matrix 62a, is converted from a standard frequency-coefficient matrix (i.e., matrix 32b in the example provided). Extended frequency-coefficient matrix 62a is used as an example of a "first case matrix," that is, a matrix derived from an overlapped image-data block which has terms identical to the terms in the directly-related nonoverlapped image-data block. The operational steps followed in converting matrix 32b into matrix 62a are shown in FIG. 7, in a simplified diagrammatic form. Using a conventional method of derivation, standard frequency-coefficient matrix 32b is first transformed by means of an IDCT, at step 212, into nonoverlapped image-data block 22b. The image data terms in nonoverlapped image-data block 22b are mapped via window 52a', at step 214, into overlapped image-data block 52a. Extended frequency-coefficient matrix 62a is subsequently obtained by applying a forward DCT, at step 216, to overlapped image-data block 52a.

The foregoing steps are combined and simplified, in accordance with the disclosed method, into a direct conversion of standard frequency-coefficient matrix 32b to extended frequency-coefficient matrix 62a. The disclosed method is represented as a direct upconversion operation with coincident image-data blocks, at step 210.

From the diagram it can be seen that matrix 32b can be recovered from nonoverlapped image-data block 22b by performing a forward DCT, at step 213, in accordance with the following equation:

$$[SFM_{32b}] = C \times [NIB_{22b}] \times C^T$$

where $[SFM_{32b}]$ is the standard frequency-coefficient matrix 32b,

C is the DCT basis matrix, and $C^T$ is the transpose of the basis matrix, and $[NIB_{22b}]$ is an image-data matrix containing the image data terms comprising nonoverlapped image-data block 22b.

Similarly, extended frequency-coefficient matrix 62a can be obtained by performing a forward DCT, at step 216, in accordance with the following equation:

$$[EFM_{62a}] = C \times [OIB_{52a}] \times C^T$$

where $[EFM_{62a}]$ is the extended frequency-coefficient matrix 62a, and $[OIB_{52a}]$ is an image-data matrix containing the image data terms comprising overlapped image-data block 52a.

Because the image data terms in blocks 22b and 52a are identical, the DCT operation on block 22b, at step 213, which yields standard frequency-coefficient matrix 32b, produces the same frequency coefficient terms as does the DCT operation on block 52a, at step 216, which yields extended frequency-coefficient matrix 62a. That is, $$[EFM_{62a}] = [SFM_{32b}]$$

Thus, the direct upconversion at step 210, of standard frequency-coefficient matrix 32b to extended frequency-coefficient matrix 62a is equivalent to simply performing a one-to-one mapping of the frequency coefficient terms found in matrix 32b into the extended frequency-coefficient matrix 62a. More generally, the direct upconversion of any first case standard frequency-coefficient matrix to an extended frequency-coefficient matrix can be achieved by performing such a one-to-one mapping. The direct upconversion of a first case matrix simplifies computation by eliminating the need to perform an IDCT, as in step 212 and a subsequent DCT, as in step 216. Since about one in four matrices in standard frequency-domain array 30 are first case matrices, savings in computation and processing are realized by employing the direct conversion method for such matrices.

C. Direct Upconversion with Row-Adjacent Image-Data Semi-Blocks

Figure 6:
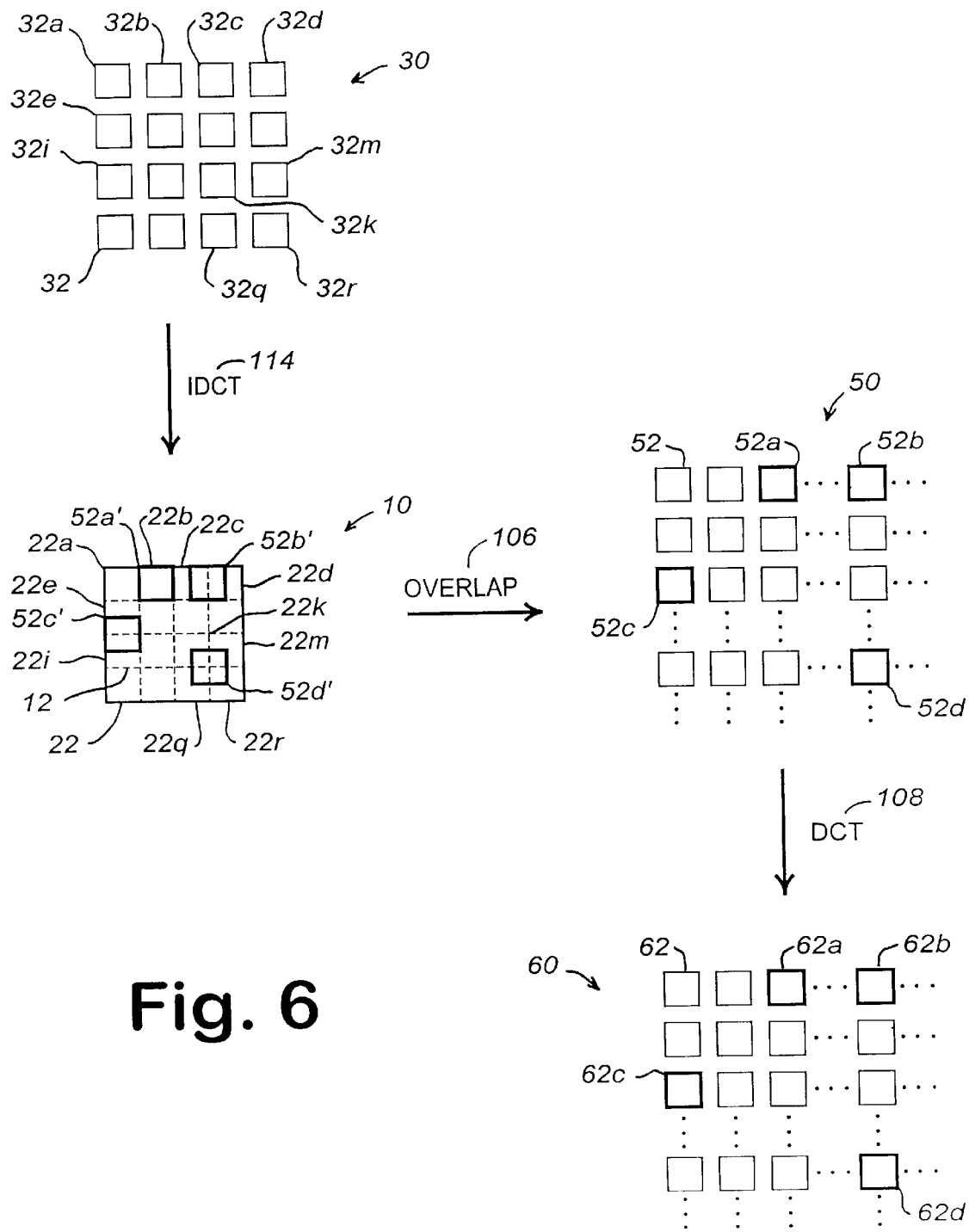
FIG. 6 is a diagram illustrating the relationships among frequency-coefficient matrices in the standard-array format, the image-data matrix, and frequency-coefficient matrices in the extended-array format.

The direct upconversion procedure used for the second case of overlapped-block derivation (i.e., row-adjacent image-data semi-blocks) is derived by simplifying the operational steps by which an extended frequency-coefficient matrix, exemplified by matrix 62b in FIG. 6, is converted from a pair of standard frequency-coefficient matrices (e.g., matrices 32c and 32d). Extended frequency-coefficient matrix 62b is used as an example of a "second case matrix," that is, a matrix derived from an overlapped image-data block having image data terms common with a pair of directly-related, horizontally-adjacent, nonoverlapping image-data blocks. The operational steps followed in converting matrices 32c and 32d into matrix 62b, introduced above, are further shown in FIG. 8 in a simplified diagrammatic form. Standard frequency-coefficient matrices 32c and 32d result from an application of a forward DCT, at steps 223 and 223', to nonoverlapped image-data blocks 22c and 22d respectively, in accordance with the equations:

$$[SFM_{32c}] = C \times [NIB_{22c}] \times C^T$$

$$[SFM_{32d}] = C \times [NIB_{22d}] \times C^T$$

where $[SFM_{32c}]$ is the standard frequency-coefficient matrix 32c,

[$NIB_{22c}$] is an image-data matrix corresponding to image-data block 22c,

[$SFM_{32d}$] is the standard frequency-coefficient matrix 32d, and

[$NIB_{22d}$] is an image-data matrix corresponding to image-data block 22d.

In the conventional method of transforming a standard frequency-domain array into a extended frequency-domain array (i.e., arrays 30 and 60, respectively, in FIG. 6), standard frequency-coefficient matrices, such as matrices 32c and 32d, are first transformed by means of an IDCT, at steps 222 and 222', into nonoverlapped image-data blocks 22c and 22d respectively. The image data terms enclosed within window 52b' are then one-to-one mapped into overlapped image data block 52b. These terms include the four rightmost columns of block 22c (i.e., the image data-terms identified by an "X"), and the four leftmost columns of block 22d (i.e., the image data-terms identified by a "+"). Those image data terms not mapped into block 52b are identified by an "O". The image data terms from block 22c are mapped, at step 224, into a left semi-block 72 (i.e., the leftmost four columns of block 52b). The image data terms from block 22d are mapped, at step 224', into a right semi-block 74 (i.e., the rightmost four columns of block 52b). Finally, extended frequency-coefficient matrix 62b is obtained by applying a forward DCT, at step 226, to overlapped image-data block 52b.

The foregoing steps are combined and simplified, in accordance with the disclosed method, into a direct conversion of standard frequency-coefficient matrices 32c and 32d into extended frequency-coefficient matrix 62b. The disclosed method is represented as a direct upconversion with row-adjacent image-data semi-blocks, at step 220, and can be derived as follows:

Nonoverlapped image-data blocks 22c and 22d are obtained from matrices 32c and 32d respectively by performing an IDCT, at steps 222 and 222', in accordance with the following equations:

$$[NIB_{22c}] = C^T \times [SFM_{32c}] \times C$$

$$[NIB_{22d}] = C^T \times [SFM_{32d}] \times C$$

Window 52b' encloses the four rightmost columns of block 22c and the four leftmost columns of block 22d. This can be represented by a matrix defined by the relationship:

$$[M_{52b'}] \triangleq [\text{semi-block 72}|\text{semi-block 74}]$$

where $[M_{52}b,]$ is an 8×8 image-data matrix corresponding to the image data terms enclosed within window 52d'. By inspection, it can be seen that this is equal to the image data terms found in overlapped image-data block 52b, that is $$[M_{52b,}] = [OIB_{52b}]$$

where $[OIB_{52b}]$ is an image-data matrix corresponding to image-data block 52b. The matrix obtained by the operation at step 226 is given by the equation:

$$[EFM_{62b}] = C \times [OIB_{52b}] \times C^T$$

where [$EFM_{62}$b] is the extended frequency-coefficient matrix 62b. Substituting [M52b,] for [$OIB_{52b}$] in the above equation for [$EFM_{62b}$], the following relationship is obtained:

$$[EFM_{62b}] C \times [M_{52b}] \times C^T$$

or, $$[EFM_{62b}] = C \times [\text{semi-block 72}|\text{semi-block 74}] \times C^T$$

For derivation of the semi-blocks, note that semi-block 72 can be obtained from block 22c by a matrix multiplication operation which retains only the four rightmost columns of block 22c. This can be accomplished by means of a "pick right" matrix operator defined as:

$$[PR]^{8,4} \triangleq \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix}$$

from which is obtained the expression:

$$[\text{semi-block 72}]^{8,4} = [NIB_{22c}] \times [PR]^{8,4}$$

Similarly, semi-block 74 can be obtained from block 22d by a matrix multiplication operation which retains only the four leftmost columns of block 22d. This can be accomplished by means of a "pick left" matrix operator defined as:

$$[PL]^{8,4} \triangleq \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}$$

from which is obtained the expression:

$$[\text{semi-block } 74]^{8,4} = [NIB_{22d}] \times [PL]^{8,4}$$

Matrices $[PR]^{8,4}$ and $[PL]^{8,4}$, used with 8×8 blocks when the amount of overlap is 50%, or four columns, yield 8×4 matrices as products. These two expressions for semi-blocks 72 and 74 can be substituted into the previous equation for $[EFM_{62b}]$ to obtain:

$$[EFM_{62b}] = C \times \{[NIB_{22c}] \times [PR]^{8,4} | [NIB_{22d}] \times [PL]^{8,4}\} \times C^T$$

From above, a further substitution for $[NIB_{22c}]$ and $[NIB_{22d}]$ yields:

$$[EFM_{62b}] = C \times \{C^T \times [SFM_{32c}] \times C \times [PR]^{8,4} | C^T \times [SFM_{32d}] \times C \times [PL]^{8,4}\} \times C^T$$

This expression can be further modified by means of two new matrices, [PRM] and [PLM], defined as:

$$[PRM] \triangleq \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}$$

and $$[PLM] \triangleq \begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Upon substitution of [PLM] into the above equation for $[EFM_{62b}]$, the expression an be rewritten as follows, $$[EFM_{62b}] = C \times \{C^T \times [SFM_{32c}] \times C \times [PRM] + C^T \times [SFM_{32d}] \times C \times [PLM]\} \times C^T$$

Upon invoking the distributive property of matrix multiplication with respect to addition, the above expression can be further rewritten as follows, $$[EFM_{62b}] = C \times C^T \times [SFM_{32c}] \times C \times PRM] \times C^T + C \times C^T \times [SFM_{32d}] \times C \times [PLM] \times C^T$$

Noting that $C \times C^T = [I]$, where $I$ is an 8×8 identity matrix, the above expression can be simplified to the following, $$[EFM_{62b}] = \{[SFM_{32c}] \times C \times [PRM] \times C^T\} + \{[SFM_{32d}] \times C \times [PLM] \times C^T\}$$

For the above expression, define an upconversion matrix [R], where $[R] \triangleq C \times [PRM] \times C^T$. Similarly, define a matrix [L], where $[L] \triangleq C \times [PLM] \times C^T$. Substitution of these new terms into the expression for $[EFM_{62b}]$ yields, $$[EFM_{62b}] = \{[SFM_{32c}] \times [R]\} + \{[SFM_{32d}] \times [L]\}$$

However, because $[PLM] = [PRM]^T$ by inspection, it follows that $R^T = C \times [PLM] \times C^T$, or that $[R]^T \equiv [L]$, and the above expression becomes, $$[EFM_{62b}] = \{[SFM_{32c}] \times [R]\} + ([SFM_{32d}] \times [R]^T\}$$

With the foregoing mathematical derivation completed, it can be seen that the disclosed direct upconversion procedure for the second case of overlapped-block derivation can be performed as follows:

Step 1. Upconversion R-matrix 73 and R-transpose matrix 75 are derived in accordance with the relationships given above, or obtained from storage means;

Step 2. Standard frequency-coefficient matrix 32c is matrix multiplied by R-matrix 73, at operation 273a;

Step 3. Standard frequency-coefficient matrix 32d is matrix multiplied by R-transpose matrix 75, at operation 275a; and Step 4. The results of both matrix multiplications are combined, by matrix addition, at operation 228, to yield extended frequency-coefficient matrix 62b.

Alternatively, steps 2 and 3 can be interchanged in sequence. Thus, the disclosed method requires only two matrix multiplications and a matrix addition to upconvert from the standard frequency-coefficient matrix pair 32c and 32d to extended frequency-coefficient matrix 62b. In contrast, the conventional method required two inverse DCT operations, a mapping operation, and a forward DCT operation for the equivalent transformation.

It should be noted that R-transpose matrix 75 can be stored for retrieval as needed, or it can be generated from R-matrix 73, as indicated by operation 274

D. Direct Upconversion with Column-Adjacent Image-Data Semi-Blocks

The direct upconversion procedure used for the third case of overlapped-block derivation (i.e., column-adjacent image-data semi-blocks) is derived in a manner similar to that for the second case of overlapped-block derivation, disclosed in the preceding section.

The third-case procedure is derived by simplifying the operational steps by which an extended frequency-coefficient matrix, exemplified by matrix 62c in FIG. 6, is converted from a pair of standard frequency-coefficient matrices (e.g., matrices 32e and 32i). Extended frequency-coefficient matrix 62c is used as an example of a "third case matrix," that is, a matrix derived from an overlapped image-data block having image data terms common with a pair of directly-related, vertically-adjacent, nonoverlapping image-data blocks. The operational steps followed in converting matrices 32e and 32i into matrix 62c, introduced above, are further shown in FIG. 9 in a simplified diagrammatic form.

Standard frequency-coefficient matrices 32e and 32i result from an application of a forward DCT, at steps 233 and 233', to nonoverlapped image-data blocks 22e and 22i respectively, in accordance with the equations:

$$[SFM_{32e}] = C \times [NIB_{22e}] \times C^T$$

$$[SFM_{32i}] = C \times [NIB_{22i}] \times C^T$$

where $[SFM_{32e}]$ is the standard frequency-coefficient matrix 32e, $[NIB_{22e}]$ is an image-data matrix corresponding to image-data block 22e, $[SFM_{32i}]$ is the standard frequency-coefficient matrix 32i, and $[NIB_{22i}]$ is an image-data matrix corresponding to image-data block 22i.

In the conventional method of transforming a standard frequency-domain array into a extended frequency-domain array, standard frequency-coefficient matrices, such as matrices 32e and 32i, are first transformed by means of an IDCT, at steps 232 and 232', into nonoverlapped image-data blocks 22e and 22i respectively. The image data terms enclosed within window 52c' are then one-to-one mapped into overlapped image data block 52c. These terms include the four lowermost rows of block 22e (i.e., the image data-terms identified by an "X"), and the four uppermost rows of block 22i (i.e., the image data-terms identified by a "+"). Those image data terms not mapped into block 52c are identified by an "O". The image data terms from block 22e are mapped, at step 234, into a top semi-block 76 (i.e., the uppermost four rows of block 52c). The image data terms from block 22i are mapped, at step 234', into a bottom semi-block 78 (i.e., the lowermost four row of block 52c). Finally, extended frequency-coefficient matrix 62c is obtained by applying a forward DCT, at step 236, to overlapped image-data block 52c.

The foregoing steps are combined and simplified, in accordance with the disclosed method, into a direct conversion of standard frequency-coefficient matrices 32e and 32i into extended frequency-coefficient matrix 62c. The disclosed method is represented as a direct upconversion with column-adjacent image-data semi-blocks, at step 230, and can be derived as follows:

Nonoverlapped image-data blocks 22e and 22i are obtained from matrices 32e and 32i respectively by performing an IDCT, at steps 232 and 232', in accordance with the following equations:

$$[NIB_{22e}] = C^T \times [SFM_{32e}] \times C$$

$$[NIB_{22i}] = C^T \times [SFM_{32i}] \times C$$

Window 52c' encloses the four lowermost rows of block 22e and the four uppermost rows of block 22i. This can be represented by a matrix defined by the relationship:

$$[M_{52c}] \triangleq [\text{semi-block 76/semi-block 78}]$$

where $[M_{52c}]$ is an 8×8 image-data matrix corresponding to the image data terms enclosed within window 52c'. By inspection, it can be seen that this is equal to the image data terms found in overlapped image-data block 52c, that is $$[M_{52c}] = [OIB_{52c}]$$

where $[OIB_{52}]$ is an image-data matrix corresponding to image-data block 52c. The matrix obtained by the operation at step 236 is given by the equation:

$$[EFM_{62c}] = C \times [OIB_{52c}] \times C^T$$

where $[EFM_{62c}]$ is the extended frequency-coefficient matrix 62c. Substituting $[M_{52c}]$ for $[OIB_{52c}]$ in the above equation for $[EFM_{62c}]$, the following relationship is obtained:

$$[EFM_{62c}] = C \times [M_{52c}] \times C^T$$

or, $$[EFM_{62c}] = C \times [\text{semi-block 76/semi-block 78}] \times C^T$$

Using a derivation similar to that of the previous section, it can be shown that this relationship is equivalent to:

$$[EFM_{62c}] = \{[R]^T \times [SFM_{32e}] + [R] \times [SFM_{32i}]\}$$

With the foregoing mathematical derivation completed, it can be seen that the disclosed direct upconversion procedure for the third case of overlapped-block derivation can be performed as follows:

Step 1. Upconversion R-matrix 73 and R-transpose matrix 75 are obtained or derived;

Step 2. R-transpose matrix 75 is matrix multiplied by standard frequency-coefficient matrix 32e, at operation 275b;

Step 3. R-matrix 73 is matrix multiplied by standard frequency-coefficient matrix 32i, at operation 273b; and Step 4. The results of both matrix multiplications are combined, by matrix addition, at operation 238, to yield extended frequency-coefficient matrix 62c.

Alternatively, steps 2 and 3 can be interchanged in sequence. Thus, the disclosed method requires only two matrix multiplications and a matrix addition to upconvert from the standard frequency-coefficient matrix pair 32e and 32i to extended frequency-coefficient matrix 62c. In contrast, the conventional method required two inverse DCT operations, a mapping operation, and a forward DCT operation for the equivalent transformation.

E. Direct Upconversion with Four Abutting Image-Data Quarter-Blocks

The direct upconversion procedure used for the fourth case of overlapped-block derivation (i.e., four abutting image-data quarter-blocks) is derived by combining the methods derived for the second and fourth cases of overlapped block derivation, as disclosed in the preceding two sections.

Extended frequency-coefficient matrix 62d is used as an example of a "fourth case matrix," that is, a matrix derived from an overlapped image-data block having image data terms common with four directly-related, abutting, nonoverlapping image-data blocks. The operational steps followed in converting matrices 32k, 32m, 32q, and 32r into matrix 62d are further shown in FIG. 10 in a simplified diagrammatic form.

In a conventional method of transforming a standard frequency-domain array into a extended frequency-domain array, standard frequency-coefficient matrices, such as matrices 32k, 32m, 32q, and 32r, are first transformed by means of an IDCT, at step 242, into nonoverlapped image-data blocks 22k, 22m, 22q, and 22r respectively. The image data terms enclosed within window 52d' are then one-to-one mapped, at step 244, into overlapped image data block 52d. These terms include the four bottom rows of the four rightmost columns of block 22k, the four bottom rows of the four leftmost columns of block 22m, the four top rows of the four rightmost columns of block 22q, and the four top rows of the four leftmost columns of block 22r. These image data-terms are identified by an "X", and the image data terms not mapped into block 52d are identified by an "O". Lastly, extended frequency-coefficient matrix 62d is obtained by applying a forward DCT, at step 246, to overlapped image-data block 52d.

The foregoing steps are combined and simplified, in accordance with the disclosed method, into a direct conversion of standard frequency-coefficient matrices 32k, 32m, 32q, and 32r into extended frequency-coefficient matrix 62d. The disclosed method is represented as a direct upconversion with abutting image-data quarter-blocks, at step 240. The derivation of step 240 is accomplished as follows.

A first intermediate matrix is obtained from standard frequency-coefficient matrices 32k and 32q in accordance with the relationship, $$[M_{32kq}] = \{[R]^T \times [SFM_{32k}] + [R] \times [SFM_{32q}]\}$$

Likewise, a second intermediate matrix is obtained from standard frequency-coefficient matrices 32m and 32r in accordance with the relationship, $$[M_{32mr}] = \{[R]^T \times [SFM_{32m}] + [R] \times [SFM_{32r}]\}$$

The method used in deriving the intermediate matrices corresponds to the procedure followed in a previous section disclosing direct upconversion with row-adjacent image-data semi-blocks. Extended frequency-coefficient matrix 62d is obtained from the resulting pair of intermediate matrices in accordance with the relationship, $$[EFM_{62d}] = \{[M_{32kq}] \times [R]\} + \{[M_{32mr}] \times [R]^T\}$$

The method used in deriving matrix 62d corresponds to the procedure followed in a previous section disclosing direct upconversion with column-adjacent image-data semi-blocks. By combining the above three expressions, the following relationship is obtained:

$$[EFM_{62d}] = [R]^T \times [SFM_{32k}] \times [R] + [R]^T \times [SFM_{32m}] \times [R]^T + [R] \times [SFM_{32q}] \times [R] + [R] \times [SFM_{32r}] \times [R]^T$$

where [R] and [R T] are matrices as defined in previous sections.

With the foregoing mathematical derivation completed, it can be seen that direct upconversion for the fourth case of overlapped-block derivation can be performed by executing the following steps.

Step 1. Upconversion R-matrix 73 and R-transpose matrix 75 are obtained or derived;

Step 2. Standard frequency-coefficient matrix 32k is matrix multiplied by R-matrix 73, at operation 273c; R-transpose matrix 75 is then matrix multiplied by this result, at operation 275c;

Step 3. Standard frequency-coefficient matrix 32m is matrix multiplied by R-transpose matrix 75, at operation 275d; R-transpose matrix 75 is then matrix multiplied by this result, at operation 275e;

Step 4. Standard frequency-coefficient matrix 32q is matrix multiplied by R-matrix 73, at operation 273d; R-matrix 73 is then matrix multiplied by this result, at operation 273e;

Step 5. Standard frequency-coefficient matrix 32r is matrix multiplied by R-transpose matrix 75, at operation 275f; R-matrix 73 is then matrix multiplied by this result, at operation 273f;

Step 6. The results obtained in steps 2 through 5 are combined, by matrix addition, at operation 248a.

It should be noted that steps 2 through 5 can be performed in any order, and that the various matrix multiplications can be performed in any sequence, as long as the operations conform to the above mathematical relationship. Thus, the disclosed method requires only eight matrix multiplications and one matrix addition to upconvert from the four abutting standard frequency-coefficient matrices 32k, 32m, 32q, and 32r to extended frequency-coefficient matrix 62d. In contrast, the conventional method required four inverse DCT operations, a mapping operation, and a forward DCT operation for the equivalent transformation.

Execution of the above expression for extended frequency-coefficient matrix 62d can be accomplished by means of other, alternative methods. For example, the expression for matrix 62d can also be written, $$[EFM_{62d}] = [R]^T \times \{[SFM_{32k}] \times [R] + [SFM_{32m}] \times [R]^T\} + [R] \times \{[SFM_{32q}] \times [R] + [SFM_{32r}] \times [R]^T\}$$

Figure 8A:
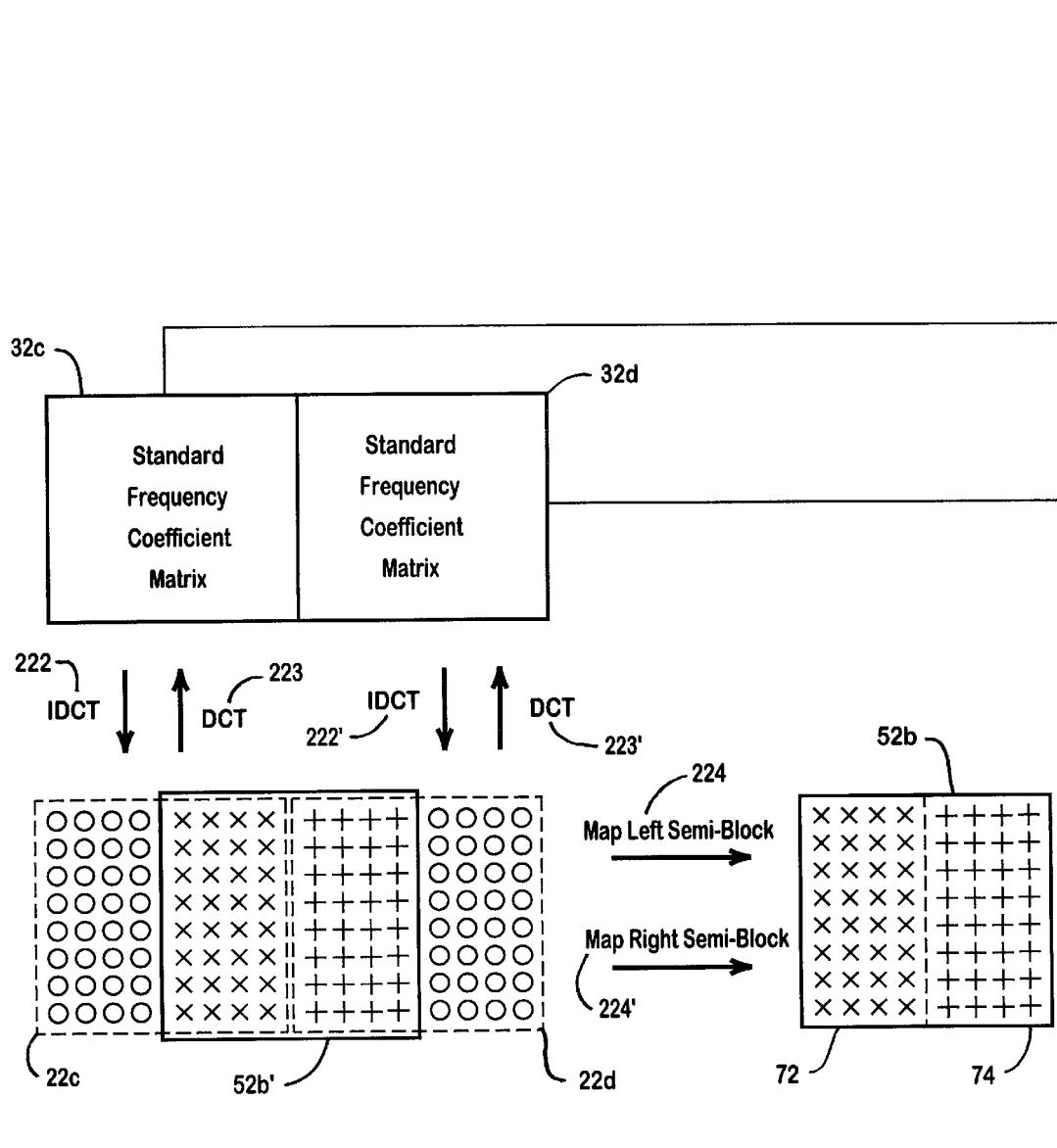
FIG. 8 is a diagram illustrating both conventional and disclosed methods of converting frequency-coefficient matrices of a second type, denoted as row-adjacent matrices, into a frequency-coefficient matrix in an extended-array format.
Figure 8B:
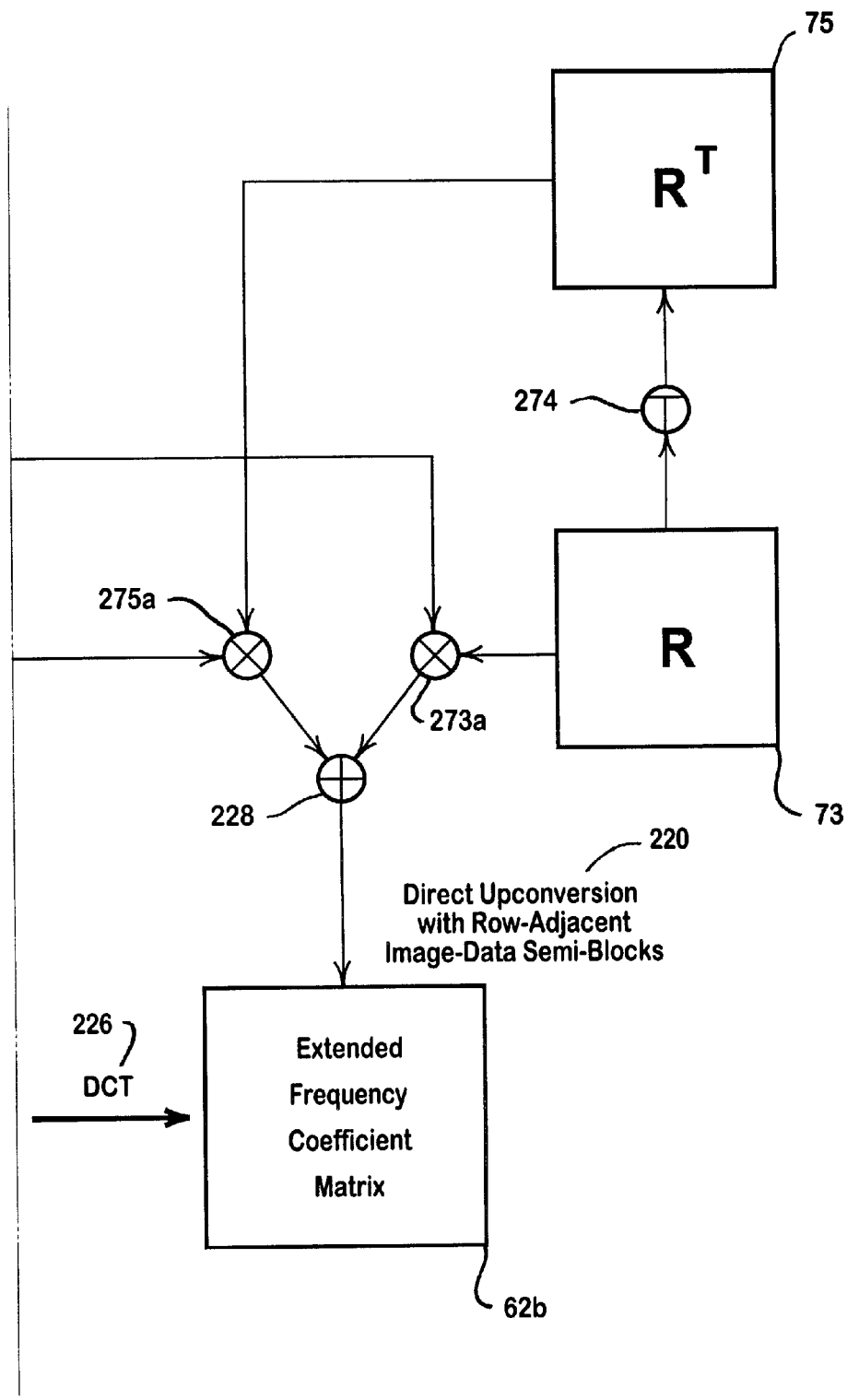

One method by which this expression can be executed, shown in FIG. 8B, includes the following steps:

Step 1. R-matrix 73 and R-transpose matrix 75 are obtained or derived;

Step 2. Standard frequency-coefficient matrix 32k is matrix multiplied by R-matrix 73, at operation 273c;

Step 3. Standard frequency-coefficient matrix 32m is matrix multiplied by R-transpose matrix 75, at operation 275d;

Step 4. The results of steps 2 and 3 are combined by means of matrix addition, at operation 248b;

Step 5. R-transpose matrix 75 is matrix multiplied by the result obtained in step 4, at operation 275g;

Step 6. Standard frequency-coefficient matrix 32q is matrix multiplied by R-matrix 73, at operation 273d;

Step 7. Standard frequency-coefficient matrix 32r is matrix multiplied by R-transpose matrix 75, at operation 275f;

Step 8. The results of steps 5 and 6 are combined by means of matrix addition, at operation 248c;

Step 9. R-matrix 73 is then matrix multiplied by the result obtained in step 8, at operation 273g;

Step 10. The results of steps 5 and 9 are combined by means of matrix addition, at operation 248d.

It should also be noted that steps 2 and 3 can be interchanged, and that steps 6 and 7 can be interchanged. Additionally, steps 2–5 can be performed after steps 6–9.

F. Direct Upconversion of a Standard Frequency-Domain Array

Figure 12:
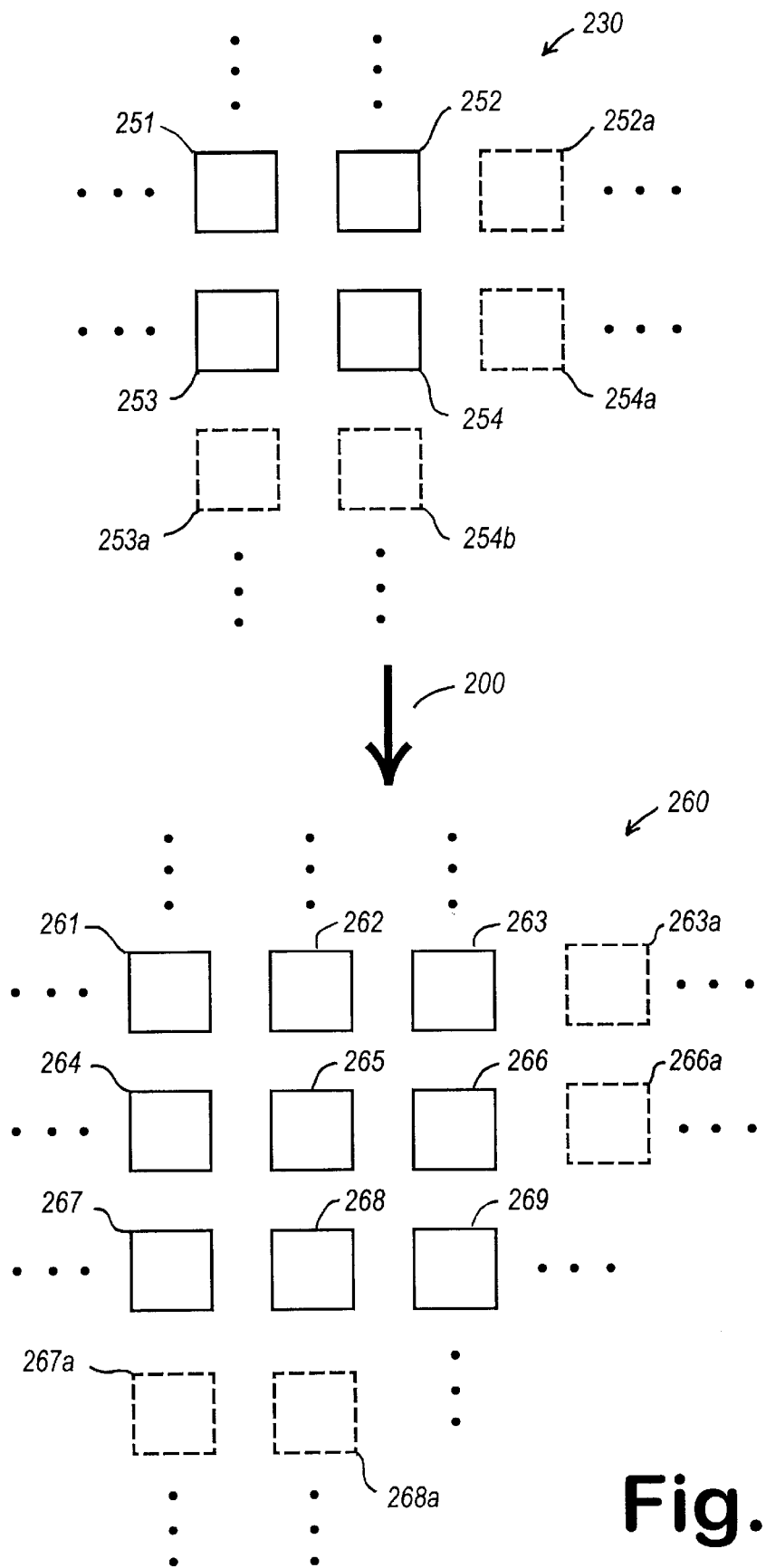
FIG. 12 is a diagram illustrating the disclosed method of directly converting a standard frequency-domain array into an extended frequency-domain array.

FIG. 12 is a diagram illustrating the disclosed method of direct upconversion. Using relationships derived above for the four cases of overlapped-block derivation, a standard frequency-domain array 230 is directly upconverted into an extended frequency-domain array 260, at step 200. Array 230 includes four standard frequency-coefficient matrices 251, 252, 253, and 254, from two adjacent rows and columns. Array 260 includes nine extended frequency-coefficient matrices 261 through 269 from three adjacent rows and columns. Matrices 261 through 269 are obtained from matrices 261 through 264 by means of the following operations, which can be performed in any sequence:

Extended frequency-coefficient matrix 261 is one-to-one mapped from standard frequency-coefficient matrix 251 (i.e., a first-case upconversion);

Extended frequency-coefficient matrix 262 is derived from standard frequency-coefficient matrices 251 and 252 in accordance with the relationship $[EFM_{262}]=[SFM_{251}]\times[R]+[SFM_{252}]\times[R]^T$ (i.e., a second-case upconversion);

Extended frequency-coefficient matrix 263 is one-to-one mapped from standard frequency-coefficient matrix 252;

Extended frequency-coefficient matrix 264 is derived from standard frequency-coefficient matrices 251 and 253 in accordance with the relationship $[EFM_{264}]=[R]^T\times[SFM_{251}]+[R]\times[SFM_{253}]$ (i.e., a third-case upconversion);

Extended frequency-coefficient matrix 265 is derived from standard frequency-coefficient matrices 251, 252, 253 and 254 in accordance with the relationship $[EFM_{265}]=[R]^T\times[SFM_{251}]\times[R]+[R]^T\times[SFM_{252}]\times[R]^T+[R]\times[SFM_{253}]\times[R]+[R]\times[SFM_{254}]\times[R]^T$ (i.e., a fourth-case upconversion);

Extended frequency-coefficient matrix 266 is derived from standard frequency-coefficient matrices 252 and 254 in accordance with the relationship $[EFM_{266}]=[R]^T\times[SFM_{252}]+[R]\times[SFM_{254}]$;

Extended frequency-coefficient matrix 267 is one-to-one mapped from standard frequency-coefficient matrix 253;

Extended frequency-coefficient matrix 268 is derived from standard frequency-coefficient matrices 253 and 254 in accordance with the relationship $[EFM_{268}]=[SFM_{253}]\times[R]+[SFM_{254}]\times[R]^T$;

Extended frequency-coefficient matrix 269 is one-to-one mapped from standard frequency-coefficient matrix 254.

Figure 10A:
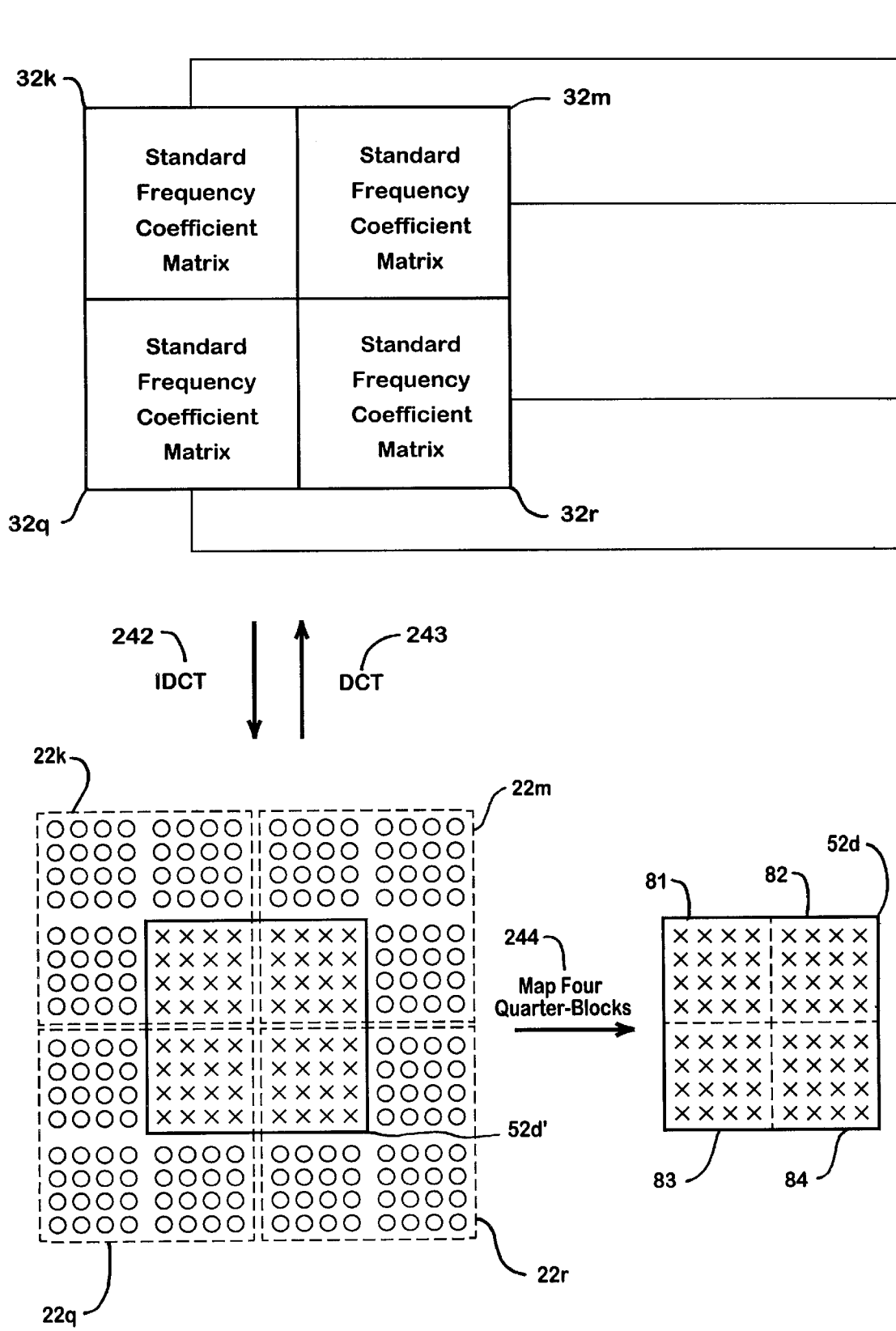
FIG. 10 is a diagram illustrating both conventional and disclosed methods of converting frequency-coefficient matrices of a fourth type, denoted as abutting matrices, into a frequency-coefficient matrix in an extended-array format.
Figure 10B:
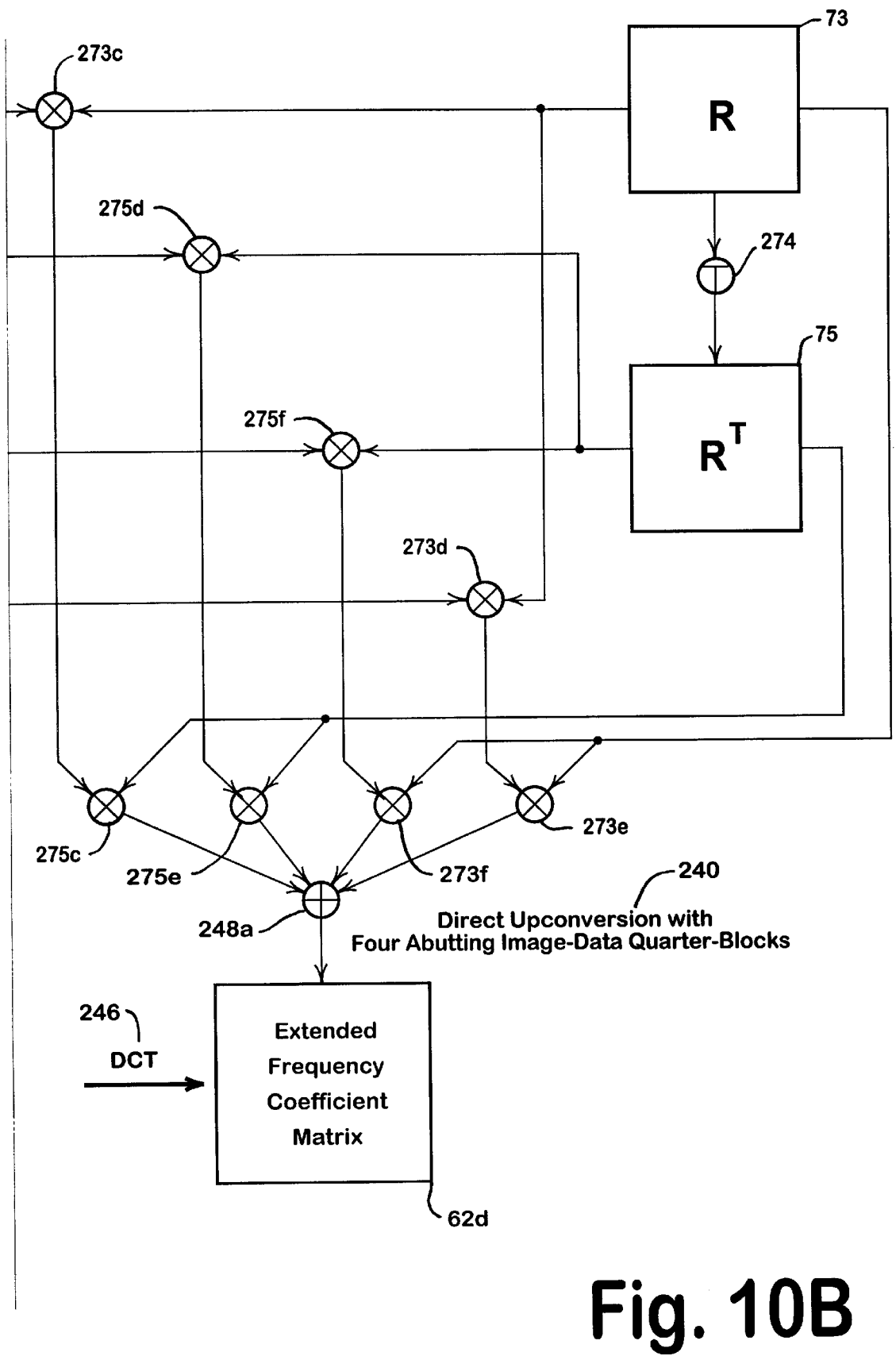
Figure 11A:
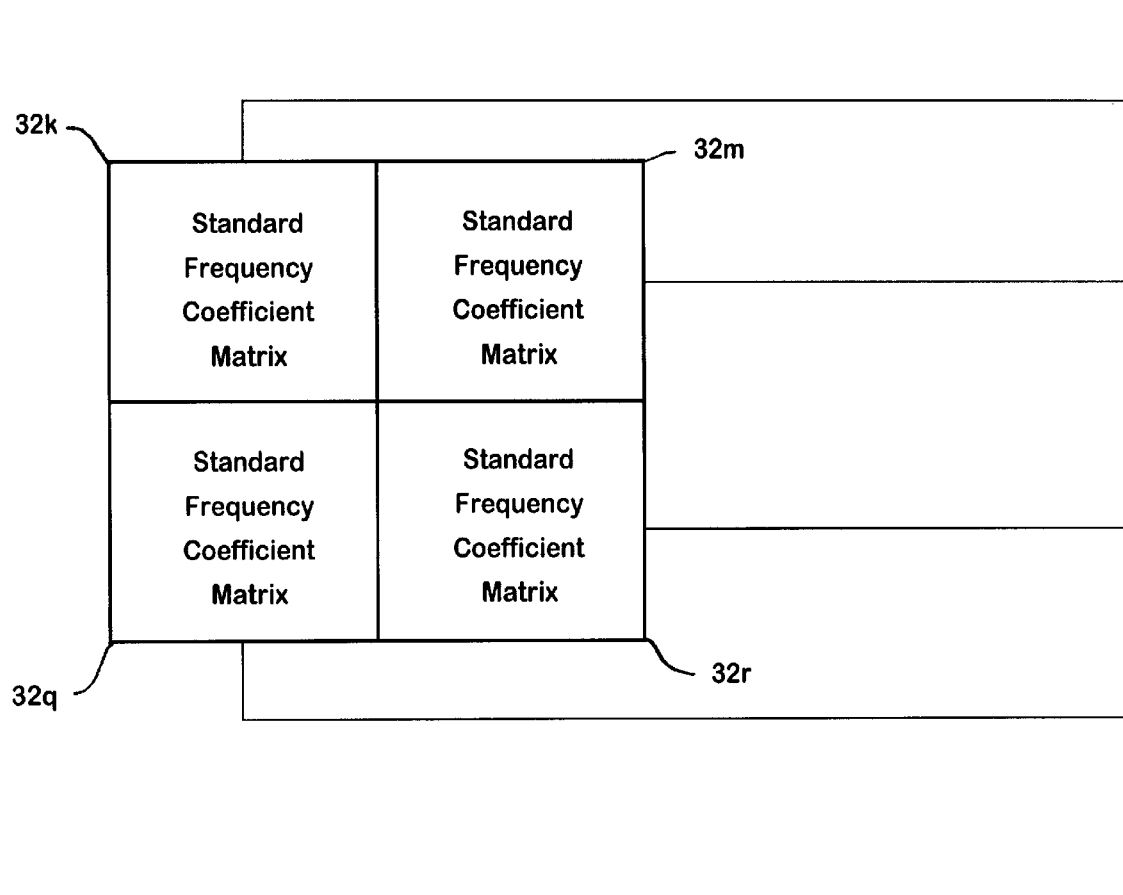
FIG. 11 is a diagram illustrating an alternative embodiment of the disclosed methods of FIG. 10.
Figure 11B:
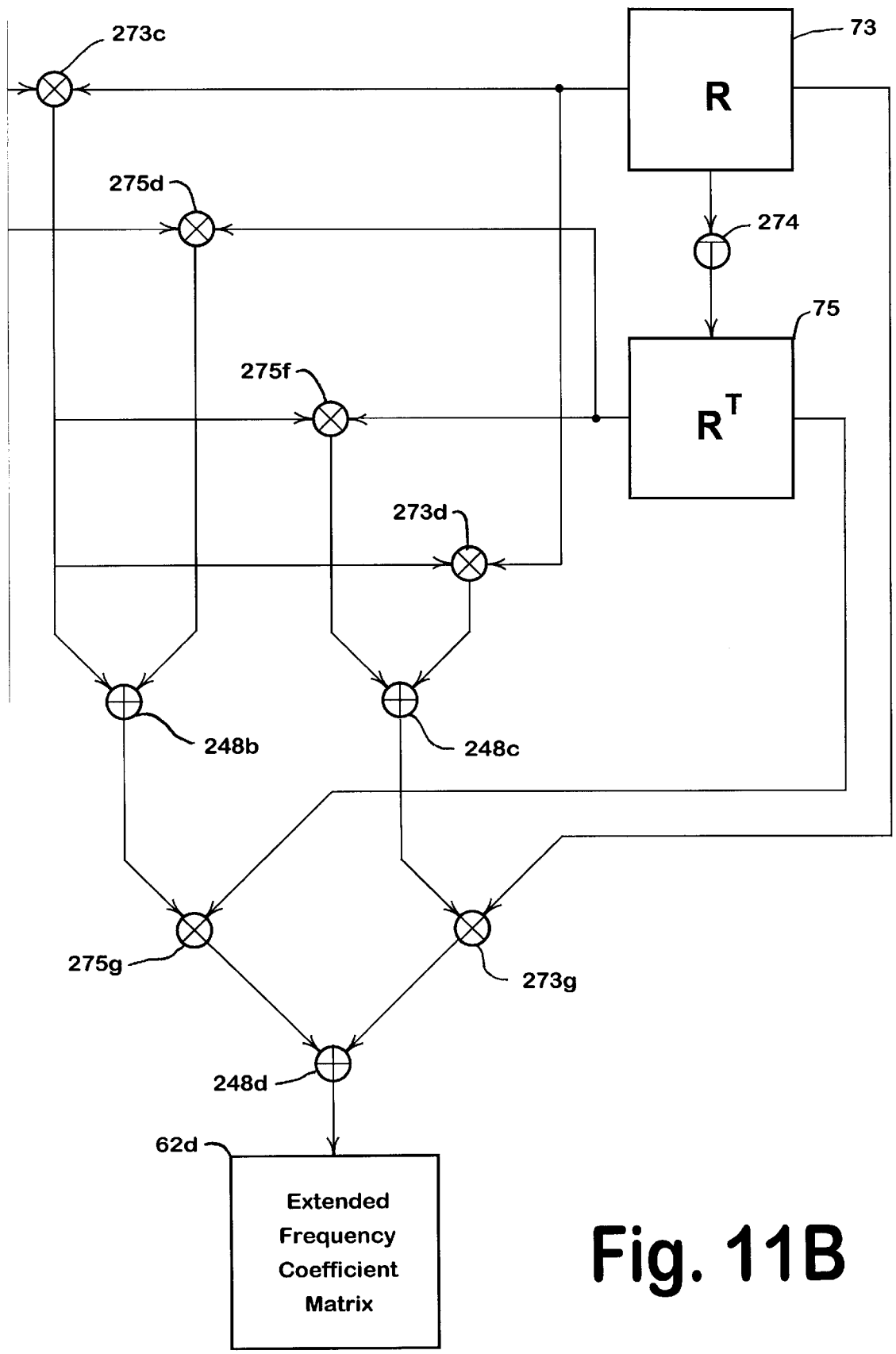

Additional extended frequency-coefficient matrices, comprising the remainder of array 260, are derived by repeating the above steps, as appropriate, for the standard frequency-coefficient matrices remaining in array 230. For example:

Matrix 263a in array 260 is derived from standard frequency-coefficient matrices 252 and 252a by the same method as matrix 262, that is, $[EFM_{263a}]=[SFM_{252}]\times[R]+[SFM_{252a}]\times[R]^T$ Matrix 266a is derived from standard frequency-coefficient matrices 252, 252a, 254 and 254a by the same method as matrix 265, that is, $[EFM_{266a}]=[R]\times[SFM_{252}]\times[R]+[R]^T\times[SFM_{252a}]\times[R]^T+[R]\times[SFM_{254}]\times[R]+[R]\times[SFM_{254a}]\times[R]^T$ Matrix 267a is derived from standard frequency-coefficient matrices 253 and 253a by the same method as matrix 264, that is, $[EFM_{267a}]=[R]^T\times[SFM_{253}]+[R]\times[SFM_{253a}]$ Matrix 268a is derived from standard frequency-coefficient matrices 253, 253a, 254, and 254b by the same method as matrix 265, that is, $[EFM_{268a}]=[R]^T\times[SFM_{253}]\times[R]+[R]^T\times[SFM_{254}]\times[R]^T+[R]\times[SFM_{253a}]\times[R]+[R]\times[SFM_{254b}]\times[R]^T$ V. Numerical Example of Matrix Upconversion The following numerical example serves to illustrate that the disclosed method, as best shown in FIG. 10, yields the same numerical result as does the above-described conventional method of converting from an unoverlapped configuration to an overlapped configuration.

Numerical data for the four standard frequency matrices 32k, 32m, 32q, and 32r are provided below.

Matrix 32k is given by $$[SFM_{32k}] = \begin{bmatrix} 159.5000 & 13.9124 & -6.3302 & -6.3267 & -3.0000 & -8.0809 & 29.1407 & -19.9654 \\ 7.3565 & -15.3356 & -11.0158 & -19.6375 & -15.4467 & 4.7739 & 8.4464 & -1.4278 \\ -6.0437 & -9.3225 & 11.5104 & -1.6657 & 7.6865 & -5.4112 & -14.5815 & -0.3704 \\ -4.8821 & -34.4614 & -1.1280 & 5.1240 & 20.0701 & -0.4362 & 17.2133 & 12.2598 \\ -9.0000 & 21.1048 & -13.0792 & -3.0755 & 3.5000 & 5.9902 & 1.0880 & 13.1813 \\ -20.2066 & -3.1948 & 0.2342 & -10.5575 & -15.2514 & -7.8103 & -1.7253 & -6.7690 \\ -15.8973 & 4.4096 & -11.5815 & 1.8931 & 21.1700 & -6.2945 & -0.5104 & 8.7321 \\ 5.1224 & 4.4508 & -10.4225 & 4.5338 & -0.6954 & 16.2975 & 4.3681 & -9.9781 \end{bmatrix}$$

Matrix 32m is given by $$[SFM_{32m}] = \begin{bmatrix} 74.5000 & -3.4114 & -7.1833 & 0.5126 & 8.2500 & 3.2442 & 4.8696 & 9.3515 \\ -1.7274 & 1.2598 & -9.0048 & -9.1473 & 0.1302 & -1.9684 & 4.6316 & -2.5526 \\ -3.8376 & -1.4872 & -8.6945 & -5.3195 & 7.1601 & 0.1545 & -2.9268 & -0.4289 \\ -6.7952 & -5.8509 & -7.2679 & 7.0444 & 2.3208 & 1.7148 & -5.1645 & 5.4944 \\ 2.2500 & -2.0026 & 15.5078 & -5.3914 & 4.5000 & 0.8756 & -3.7176 & 8.8052 \\ -5.7689 & 8.8769 & 1.8477 & -6.5352 & -3.3802 & -3.0622 & 5.8090 & -2.4544 \\ 5.1074 & 1.2403 & 2.5732 & 0.8230 & -2.9658 & 3.7067 & -4.8055 & -7.8152 \\ -2.1060 & 5.6974 & -3.0919 & 6.0719 & 0.8924 & 0.9813 & 6.9821 & 6.2579 \end{bmatrix}$$

Matrix 32q is given by $$[SFM_{32q}] = \begin{bmatrix} 45.2500 & 4.0142 & 1.0852 & 1.2481 & 3.5000 & -0.1517 & 5.2331 & 3.9282 \\ -0.7225 & -2.6246 & -4.9199 & -1.5037 & -0.9447 & -0.4191 & -0.8361 & 5.4295 \\ 0.6601 & -0.2658 & 0.4090 & -0.0706 & 1.0196 & -2.6286 & -2.3839 & 2.6637 \\ -0.8665 & 2.8663 & -1.8698 & -0.7724 & 3.4050 & -1.0807 & -0.6316 & -3.8789 \\ -0.5000 & -4.5050 & 3.3389 & -4.1248 & -1.7500 & 5.0934 & 3.4878 & 0.3512 \\ 1.7855 & -0.3283 & -2.0687 & 4.1693 & 6.0700 & -5.3918 & 2.3977 & -4.5228 \\ -2.9794 & 4.3583 & 0.6161 & 0.0110 & -0.1517 & -0.5210 & 3.5910 & 1.9113 \\ -1.3835 & 0.1795 & 2.9085 & 0.8082 & 1.9478 & -4.2966 & -0.8442 & -0.7112 \end{bmatrix}$$

Matrix 32r is given by $$[SFM_{32r}] = \begin{bmatrix} 125.5000 & -4.4936 & -1.6921 & -3.6246 & -3.2500 & -7.9780 & -9.3113 & -11.7323 \\ 2.5944 & 3.4826 & 19.7304 & -0.4205 & -10.5181 & 5.3808 & 8.9515 & -9.8910 \\ 3.6095 & 15.6220 & -26.1673 & -0.4421 & -14.3501 & -0.2916 & 8.9571 & -4.3525 \\ 2.9728 & 6.0111 & -5.0903 & 6.1094 & 10.6250 & 6.5310 & 8.8325 & 11.1952 \\ -1.2500 & 11.6942 & -4.4020 & 13.8503 & 18.5000 & 13.2380 & 8.3177 & -6.9136 \\ 2.0851 & 8.6614 & 0.8223 & -10.3330 & 6.6911 & 13.4868 & 10.2288 & 12.5185 \\ 2.8345 & 4.4300 & -7.5429 & -6.8572 & 11.0854 & -5.0050 & -2.8327 & -24.0890 \\ -0.8422 & -5.7549 & -0.0641 & 9.6119 & -9.6479 & -1.7771 & 10.0919 & 6.9212 \end{bmatrix}$$

A. Conventional Method of Matrix Upconversion

In accordance with the conventional method of converting from a matrix array in standard format into a matrix array in extended format, these matrices are first inverse DCT transformed, as in operation 242 (e.g., see FIG. 10), to yield matrices 22k, 22m, 22q, and 22r, in accordance with the relationship, $$[NIB_{22}] = C^T \times [SFM_{32}] \times C$$

where the basis matrix is given by $$[C] = \begin{bmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{bmatrix}$$

and the inverse basis matrix is given by $$[C]^T = \begin{bmatrix} 0.3536 & 0.4904 & 0.4619 & 0.4157 & 0.3536 & 0.2778 & 0.1913 & 0.0975 \\ 0.3536 & 0.4157 & 0.1913 & -0.0975 & -0.3536 & -0.4904 & -0.4619 & -0.2778 \\ 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4904 \\ 0.3536 & -0.0975 & -0.4619 & 0.2778 & 0.3536 & -0.4157 & -0.1913 & 0.4904 \\ 0.3536 & -0.2778 & -0.1913 & 0.4904 & -0.3536 & -0.0975 & 0.4619 & -0.4157 \\ 0.3536 & -0.4157 & 0.1913 & 0.0975 & -0.3536 & 0.4904 & -0.4619 & 0.2778 \\ 0.3536 & -0.4904 & 0.4619 & -0.4157 & 0.3536 & -0.2778 & 0.1913 & -0.0975 \end{bmatrix}$$

The results of these matrix multiplication operations are four matrices corresponding to nonoverlapped image-data blocks 22k, 22m, 22q, and 22r. The matrix corresponding to block 22k is given by $$[NIB_{22k}] = \begin{bmatrix} 2.0000 & 2.0000 & 26.0000 & 20.0000 & 18.0000 & 20.0000 & 8.0000 & 28.0000 \\ 20.0000 & 30.0000 & 30.0000 & 24.0000 & 12.0000 & 38.0000 & 28.0000 & 38.0000 \\ 16.0000 & 30.0000 & 30.0000 & 34.0000 & 8.0000 & 30.0000 & 6.0000 & 10.0000 \\ 12.0000 & 34.0000 & 40.0000 & 16.0000 & 6.0000 & 22.0000 & 4.0000 & 8.0000 \\ 36.0000 & 6.0000 & 36.0000 & 34.0000 & 22.0000 & 36.0000 & 10.0000 & 12.0000 \\ 22.0000 & 2.0000 & 10.0000 & 10.0000 & 32.0000 & 24.0000 & 2.0000 & 36.0000 \\ 18.0000 & 28.0000 & 12.0000 & 16.0000 & 2.0000 & 34.0000 & 16.0000 & 26.0000 \\ 38.0000 & 34.0000 & 14.0000 & 22.0000 & 22.0000 & 6.0000 & 2.0000 & 6.0000 \end{bmatrix}$$

The matrix corresponding to block 22m is given by $$[NIB_{22m}] = \begin{bmatrix} 4.0000 & 1.0000 & 12.0000 & 13.0000 & 14.0000 & 1.0000 & 5.0000 & 9.0000 \\ 1.0000 & 1.0000 & 11.0000 & 16.0000 & 18.0000 & 11.0000 & 6.0000 & 9.0000 \\ 12.0000 & 10.0000 & 17.0000 & 14.0000 & 7.0000 & 16.0000 & 3.0000 & 6.0000 \\ 12.0000 & 12.0000 & 15.0000 & 5.0000 & 4.0000 & 5.0000 & 9.0000 & 18.0000 \\ 17.0000 & 0.0000 & 9.0000 & 1.0000 & 18.0000 & 8.0000 & 16.0000 & 9.0000 \\ 7.0000 & 7.0000 & 2.0000 & 13.0000 & 13.0000 & 14.0000 & 16.0000 & 5.0000 \\ 9.0000 & 1.0000 & 12.0000 & 6.0000 & 14.0000 & 9.0000 & 1.0000 & 2.0000 \\ 15.0000 & 8.0000 & 7.0000 & 11.0000 & 12.0000 & 4.0000 & 16.0000 & 17.0000 \end{bmatrix}$$

The matrix corresponding to block 22q is given by $$[NIB_{22q}] = \begin{bmatrix} 6.0000 & 3.0000 & 7.0000 & 5.0000 & 9.0000 & 4.0000 & 2.0000 & 7.0000 \\ 4.0000 & 5.0000 & 9.0000 & 5.0000 & 9.0000 & 3.0000 & 10.0000 & 3.0000 \\ 8.0000 & 5.0000 & 7.0000 & 1.0000 & 9.0000 & 5.0000 & 2.0000 & 4.0000 \\ 7.0000 & 1.0000 & 8.0000 & 7.0000 & 5.0000 & 9.0000 & 6.0000 & 7.0000 \\ 7.0000 & 4.0000 & 7.0000 & 5.0000 & 1.0000 & 4.0000 & 6.0000 & 7.0000 \\ 10.0000 & 6.0000 & 7.0000 & 7.0000 & 5.0000 & 5.0000 & 0.0000 & 2.0000 \\ 10.0000 & 9.0000 & 0.0000 & 7.0000 & 10.0000 & 8.0000 & 0.0000 & 8.0000 \\ 9.0000 & 4.0000 & 9.0000 & 2.0000 & 2.0000 & 4.0000 & 8.0000 & 7.0000 \end{bmatrix}$$

The matrix corresponding to block 22r is given by $$[NIB_{22r}] = \begin{bmatrix} 28.0000 & 13.0000 & 26.0000 & 28.0000 & 9.0000 & 25.0000 & 4.0000 & 6.0000 \\ 3.0000 & 32.0000 & 14.0000 & 4.0000 & 8.0000 & 22.0000 & 25.0000 & 17.0000 \\ 2.0000 & 31.0000 & 9.0000 & 13.0000 & 3.0000 & 21.0000 & 18.0000 & 29.0000 \\ 25.0000 & 13.0000 & 7.0000 & 20.0000 & 8.0000 & 2.0000 & 19.0000 & 26.0000 \\ 21.0000 & 9.0000 & 0.0000 & 6.0000 & 21.0000 & 20.0000 & 20.0000 & 19.0000 \\ 7.0000 & 23.0000 & 7.0000 & 28.0000 & 23.0000 & 8.0000 & 11.0000 & 24.0000 \\ 7.0000 & 10.0000 & 32.0000 & 6.0000 & 26.0000 & 11.0000 & 23.0000 & 10.0000 \\ 2.0000 & 25.0000 & 8.0000 & 33.0000 & 23.0000 & 23.0000 & 4.0000 & 4.0000 \end{bmatrix}$$

Image data terms are selected by means of window 52d' and combined to yield overlapped image-data block 52d. The matrix corresponding to block 52d is given by $$[OIB_{52d}] = \begin{bmatrix} 22.0000 & 36.0000 & 10.0000 & 12.0000 & 17.0000 & 0.0000 & 9.0000 & 1.0000 \\ 32.0000 & 24.0000 & 2.0000 & 36.0000 & 7.0000 & 7.0000 & 2.0000 & 13.0000 \\ 2.0000 & 34.0000 & 16.0000 & 26.0000 & 9.0000 & 1.0000 & 12.0000 & 6.0000 \\ 22.0000 & 6.0000 & 2.0000 & 6.0000 & 15.0000 & 8.0000 & 7.0000 & 11.0000 \\ 9.0000 & 4.0000 & 2.0000 & 7.0000 & 28.0000 & 13.0000 & 26.0000 & 28.0000 \\ 9.0000 & 3.0000 & 10.0000 & 3.0000 & 3.0000 & 32.0000 & 14.0000 & 4.0000 \\ 9.0000 & 5.0000 & 2.0000 & 4.0000 & 2.0000 & 31.0000 & 9.0000 & 13.0000 \\ 5.0000 & 9.0000 & 6.0000 & 7.0000 & 25.0000 & 13.0000 & 7.0000 & 20.0000 \end{bmatrix}$$

A DCT is performed on this matrix, as in step 246, to yield extended frequency-coefficient matrix 62d in accordance with the equation, $$[EFM_{62d}] = C \times [OIB_{52d}] \times C^T \qquad 20$$

from which $$[EFM_{62d}] = \begin{bmatrix} 96.8750 & 1.9977 & 3.3545 & 10.8777 & 6.3750 & -7.3251 & -8.5603 & -10.1718 \\ 11.0264 & 38.1784 & 2.7012 & -12.6390 & 8.3506 & 3.4693 & -24.5507 & -6.2584 \\ 1.7637 & 16.7363 & -1.3850 & -2.3110 & -0.0104 & -7.0406 & -3.4523 & -7.3588 \\ -0.3768 & -6.5509 & 5.1635 & 14.7742 & -10.0182 & 4.2448 & 8.0170 & 3.0002 \\ 1.3750 & -7.3330 & 3.7371 & 3.3856 & 12.8750 & -11.6943 & -7.6364 & 23.1181 \\ -11.7628 & 6.9443 & 2.3833 & 5.1842 & -13.6610 & -1.5199 & 4.6780 & 0.1970 \\ -1.9482 & 4.9619 & -9.4523 & -8.7987 & -17.9904 & -4.8878 & -6.8650 & 7.0556 \\ 6.8539 & -9.3191 & -2.7360 & -11.2171 & -5.6873 & -6.5836 & -13.0617 & 4.0673 \end{bmatrix}$$

B. Disclosed Method of Matrix Upconversion

In accordance with the disclosed method, as best shown in FIG. 10, standard frequency-coefficient matrices 32k, 32m, 32q, and 32r are directly upconverted into extended frequency-coefficient matrix 62d. Matrix 62d is found in accordance with the relationship, $$[EFM_{62d}] = R^T \times \{[SFM_{32k}] \times R + [SFM_{32m}] \times R^T\} + R \times \{[SFM_{32q}] \times R + [SFM_{32r}] \times R_T\} \qquad 45$$

where upconversion R-matrix 73 is given by $$R = \begin{bmatrix} 0.5000 & 0.4531 & 0.0000 & -0.1591 & 0.0000 & 0.1063 & 0.0000 & -0.0901 \\ -0.4531 & -0.3266 & 0.2079 & 0.3266 & 0.0373 & -0.1353 & 0.0114 & 0.1353 \\ 0.0000 & -0.2079 & -0.5000 & -0.3955 & 0.0000 & 0.1762 & 0.0000 & -0.1389 \\ 0.1591 & 0.3266 & 0.3955 & 0.1353 & -0.2566 & -0.3266 & -0.0488 & 0.1353 \\ 0.0000 & -0.0373 & 0.0000 & 0.2566 & 0.5000 & 0.3841 & 0.0000 & -0.1877 \\ -0.1063 & -0.1353 & -0.1762 & -0.3266 & -0.3841 & -0.1353 & 0.2452 & 0.3266 \\ 0.0000 & -0.0114 & 0.0000 & 0.0488 & 0.0000 & -0.2452 & -0.5000 & -0.4329 \\ 0.0901 & 01353 & 0.1389 & 0.1353 & 0.1877 & 0.3266 & 0.4329 & 0.3266 \end{bmatrix}$$

60 and R-transpose matrix 75 is given by $$R^T = \begin{bmatrix} 0.5000 & -0.4531 & 0.0000 & 0.1591 & 0.0000 & -0.1063 & 0.0000 & 0.0901 \\ 0.4531 & -0.3266 & -0.2079 & 0.3266 & -0.0373 & -0.1353 & -0.0114 & 0.1353 \\ 0.0000 & 0.2079 & -0.5000 & 0.3955 & 0.0000 & -0.1762 & 0.0000 & 0.1389 \\ -0.1591 & 0.3266 & -0.3955 & 0.1353 & 0.2566 & -0.3266 & 0.0488 & 0.1353 \\ 0.0000 & 0.0373 & 0.0000 & -0.2566 & 0.5000 & -0.3841 & 0.0000 & 0.1877 \\ 0.1063 & -0.1353 & 0.1762 & -0.3266 & 0.3841 & -0.1353 & -0.2452 & 0.3266 \\ 0.0000 & 0.0114 & 0.0000 & -0.0488 & 0.0000 & 0.2452 & -0.5000 & 0.4329 \\ -0.0901 & 0.1353 & -0.1389 & 0.1353 & -0.1877 & 0.3266 & -0.4329 & 0.3266 \end{bmatrix}$$

The first bracketed sum, $\{[SFM_{32k}] \times R + [SFM_{32m}] \times R^T\}$, corresponding to operations 273c, 275d, and 248b, is found to be, $$\begin{bmatrix} . & -37.9297 & 4.7951 & 15.2321 & -0.8750 & -9.6232 & 10.5966 & -6.3071 \\ 5.5278 & .** & -5.9533 & 10.0529 & -0.5786 & -0.2358 & 1.1348 & 6.1819 \\ 10.2728 & -12.3214 & .** & -0.9792 & -5.1394 & 10.9871 & -1.0225 & -0.8979 \\ 0.8337 & -2.9351 & -0.6481 & .** & 8.7584 & -1.5852 & -12.1922 & 11.4436 \\ 5.1250 & -2.9978 & -7.5011 & -11.8252 & .** & -13.9229 & -4.0638 & 10.8810 \\ 8.7865 & -4.1706 & 5.4506 & 0.9755 & 6.3761 & .** & -19.1289 & 9.4843 \\ 2.9157 & -11.3511 & 8.9775 & -4.1270 & 6.8643 & -10.5134 & .** & -10.0704 \\ -5.6221 & 5.7425 & -4.3509 & 3.8164 & -1.8338 & 7.7799 & -8.0480 & .**** \end{bmatrix}$$

The second bracketed sum, $\{[SFM_{32q}] \times R + [SFM_{32r}] \times R^T\}$, corresponding to operations 275f, 273d, and 248c, is found to be, $$\begin{bmatrix} 82.8750 & -37.9297 & 4.7951 & 15.2321 & -0.8750 & -9.6232 & 10.5966 & -6.3071 \\ 5.5278 & 1.1921 & -5.9533 & 10.0529 & -0.5786 & -0.2358 & 1.1348 & 6.1819 \\ 10.2728 & -12.3214 & 11.1098 & -0.9792 & -5.1394 & 10.9871 & -1.0225 & -0.8979 \\ 0.8337 & -2.9351 & -0.6480 & -0.1461 & 8.7584 & -1.5852 & -12.1922 & 11.4436 \\ 5.1250 & -2.9978 & -7.5011 & -11.8252 & 16.8750 & -13.9229 & -4.0638 & 10.8810 \\ 8.7865 & -4.1706 & 5.4506 & 0.9755 & 6.3761 & 3.5426 & -19.1289 & 9.4843 \\ 2.9157 & -11.3511 & 8.9775 & -4.1270 & 6.8643 & -10.5134 & 11.6402 & -10.0704 \\ -5.6221 & 5.7425 & -4.3509 & 3.8164 & -1.8338 & 7.7799 & -8.0480 & 2.9114 \end{bmatrix}$$

The matrix sum $$[EFM_{62d}] = R^T \times \{[SFM_{32k}] \times R + [SFM_{32m}] \times R^T\} + R \times \{[SFM_{32q}] \times R + [SFM_{32r}] \times R^T\}$$

corresponding to operations 275g, 273g, and 248d, is found to be, $$\begin{bmatrix} 96.8750 & 1.9977 & 3.3545 & 10.8777 & 6.3750 & -7.3251 & -8.5603 & -10.1718 \\ 11.0264 & 38.1784 & 2.7012 & -12.6390 & 8.3506 & 3.4693 & -24.5507 & -6.2584 \\ 1.7637 & 16.7363 & -1.3850 & -2.3110 & -0.0104 & -7.0406 & -3.4523 & -7.3588 \\ -0.3768 & -6.5509 & 5.1635 & 14.7742 & -10.0182 & 4.2448 & 8.0170 & 3.0002 \\ 1.3750 & -7.3330 & 3.7371 & 3.3856 & 12.8750 & -11.6943 & -7.6364 & 23.1181 \\ -11.7628 & 6.9443 & 2.3833 & 5.1842 & -13.6610 & -1.5199 & 4.6780 & 0.1970 \\ -1.9482 & 4.9619 & -9.4523 & -8.7987 & -17.9904 & -4.8878 & -6.8650 & 7.0556 \\ 6.8539 & -9.3191 & -2.7360 & -11.2171 & -5.6873 & -6.5836 & -13.0617 & 4.0673 \end{bmatrix}$$

which is, by inspection, the same numerical result as obtained by following the conventional method above.

VI. Method of Direct Downconversion

This conventional method of converting an extended frequency-domain array into a standard frequency-domain array can best be described with reference to FIG. 13, in which is shown a group of four abutting, extended frequency-coefficient matrices 62v, 62w, 62x, and 62y lying within the extended frequency-domain array. In a conventional method of transformation, an IDCT is performed on the four 8×8 matrices, at step 252, to yield four overlapped image-data blocks 52v, 52w, 52x, and 52y, respectively. Because these blocks are in an overlapped configuration, each block includes redundant image data terms which are identical to image data terms found in an adjacent block.

Blocks 52v, 52w, 52x, and 52y collectively include 256 image data terms, of which all but 64 are redundant. An unoverlap operation, at step 254, eliminates the redundant terms. The 64 terms retained, each denoted by an "X," are those terms lying in the two innermost rows and columns of each overlapped image-data block. Within block 52v, the terms lying within a quadrant core 21v are retained. Within blocks 52w, 52x, and 52y, the terms lying within quadrant cores 21w, 21x, and 21y, respectively, are retained. Those image data terms not retained by the unoverlap operation are identified by an "O." The terms comprising quadrant core 21v are mapped into the second quadrant of nonoverlapped image-data block 22g. Likewise, the terms comprising quadrant cores 21w, 21x, and 21y are mapped into first, third, and fourth quadrants of block 22g, respectively. A DCT operation is applied to an 8×8 matrix corresponding to nonoverlapped image-data block 22g, at step 256, to yield standard frequency-coefficient matrix 32g.

Steps 252, 254, and 256 are is repeated for successive groups of four abutting extended frequency-coefficient matrices comprising the extended frequency-domain array until the desired standard spatial-domain array has been obtained. Thus, this conventional method requires an IDCT, an unoverlapping operation, and a DCT for each standard frequency-coefficient matrix derived. In comparison, the disclosed method accomplishes this conversion in a more efficient manner, denoted by a direct downconversion, at step 258.

The direct downconversion method is derived by simplifying the operational steps executed in the conventional method described above. The transformation of extended frequency-coefficient matrices 62v, 62w, 62x, and 62y into overlapped image-data blocks 52v, 52w, 52x, and 52y, respectively, is accomplished by means of an IDCT, in accordance with the equation, $$[OIB_{52}] = C^T \times [EFM_{62}] \times C$$

where $[OIB_{52}]$ is a matrix corresponding to the overlapped image-data block 52, $[EFM_{62}]$ is the extended frequency-coefficient matrix 62. For convenience in derivation, these blocks are formed into a single 16×16 aggregate block 53 in which the image data terms of block 52v make up the second quadrant of aggregate block 53, and the image data terms of blocks 52w, 52x and 52y make up the first, third, and fourth quadrants, respectively, of aggregate block 53. Nonoverlapped image-data block 22g may then be obtained by matrix multiplication in accordance with the following equation, $$[NIB_{22g}] = [MBM]^{8,16} \times [ABM_{53}]^{16,16} \times [MBM^T]^{16,8}$$

where $[NIB_{22g}]$ is an 8×8 matrix corresponding to block 22g, $[ABM_{53}]^{16,16}$ is a 16×16 matrix corresponding to aggregate block 53, $[MBM]^{8,16}$ is an 8×16 modified basis matrix defined below, and $[MBM^T]^{16,8}$ is a 16×8 transform of the modified basis matrix.

The modified basis matrix is found from the relationship, $$[MBM]^{8,16} = \begin{bmatrix} t & 0 \\ 0 & t \end{bmatrix}$$

where [t] is the 4×8 matrix having terms given by the equation, $$t_{mn} = \sqrt{\frac{2}{N}} \, k_n \cos\left[\frac{(2m+1)n\pi}{2N}\right]$$

where $$k_n = \frac{1}{\sqrt{2}}$$

for n=0 and k=1 for k>0, and 2≤m≤5 and 0≤n≤7. For the 8×8 block configuration of the present example, this becomes, $$t_{mn} = \frac{1}{\sqrt{2}} k_n \cos\left[\frac{(2m+1)n\pi}{16}\right]$$

This is followed by a DCT, in accordance with the relationship, $$[SFM_{32g}] = C \times [NIB_{22g}] \times C^T$$

When the expression for $[NIB_{22g}]$ is substituted into the equation for $[SFM_{32g}]$, the following equation is obtained, $$[SFM_{32g}] = C \times [MBM]^{8,16} \times [ABM_{53}]^{16,16} \times [MBM^T]^{16,8} \times C^T$$

Terms are rearranged to obtain the expression, $$[SFM_{32g}] = [FTM]^{8,16} \times [ABM_{53}]^{16,16} \times [FTM^T]^{16,8}$$

where $[FTM]^{8,16}$ is an 8×16 format transform matrix, and $[FTM^T]^{16,8}$ is the transpose of the format-transform matrix, given by:

$$[FTM]^{8,16} = C \times [MBM]^{8,16}$$

$$[FTM^T]^{16,8} = [MBM^T]^{16,8} \times C^T$$

After substitution, the expression can be rewritten to become the following equation for direct downconversion, $$[SFM_{32g}] = P \times [EFM_{61v}] \times P^T + P \times [EFM_{61w}] \times Q^T + Q \times [EFM_{61x}] \times P^T + Q \times [EFM_{61y}] \times Q^T$$

where P is a first 8×8 downconversion matrix comprised of terms mapped from the left half of the format transfer matrix $[FTM]^{8,16}$, $P^T$ is the transpose of matrix P, Q is a second 8×8 downconversion matrix comprised of terms mapped from the right half of the format transfer matrix $[FTM]^{8,16}$, and $Q^T$ is the transpose of Q.

The derivations of P-transpose matrix 85 and Q-transpose matrix 89 from P-matrix 83 and Q-matrix 87 respectively, are indicated by transposition operations 284 and 288. Alternatively, Q-matrix 87 can be derived from P-matrix 83, as indicated by mask multiply operation 281*a*, by a matrix multiplication with a mask matrix 81, in accordance with the equation, $$[Q_{87}] = [P_{83}] \times [M_{81}]$$

where, $$[M_{81}] \triangleq \begin{bmatrix} 1 & 1 & 1 & 1 & 1 & 1 & 1 & 1 \\ -1 & 1 & -1 & 1 & -1 & 1 & -1 & 1 \\ 1 & -1 & 1 & -1 & 1 & -1 & 1 & -1 \\ -1 & 1 & -1 & 1 & -1 & 1 & -1 & 1 \\ 1 & 1 & 1 & 1 & 1 & 1 & 1 & 1 \\ -1 & 1 & -1 & 1 & -1 & 1 & -1 & 1 \\ 1 & -1 & 1 & -1 & 1 & -1 & 1 & -1 \\ -1 & 1 & -1 & 1 & -1 & 1 & -1 & 1 \end{bmatrix}$$

Likewise, Q-transform matrix 89 can be derived from P-transform matrix 85 by matrix multiplication with mask matrix 81, as indicated by mask multiplication operation 281*b*.

With the foregoing mathematical derivation completed, it can be seen that a preferred method of accomplishing direct downconversion of extended frequency-coefficient matrices is by executing the following steps:

Step 1.) First downconversion P-matrix 83, P-transpose matrix 85, second downconversion Q-matrix 87, and Q-transpose matrix 89 are obtained or derived;

Step 2.) Extended frequency-coefficient matrix 62*v* is matrix multiplied by P-transform matrix 85, at operation 285*a*; P-matrix 83 is then matrix multiplied by this result, at operation 283*a*;

Step 3.) Extended frequency-coefficient matrix 62*w* is matrix multiplied by Q-transpose matrix 89, at operation 289*a*; P-matrix 83 is then matrix multiplied by this result, at operation 283*b*;

Step 4.) Extended frequency-coefficient matrix 62*x* is matrix multiplied by P-transpose matrix 85, at operation 285*b*; Q-matrix 87 is then matrix multiplied by this result, at operation 287*a*;

Step 5.) Extended frequency-coefficient matrix 62*y* is matrix multiplied by Q-transpose matrix 89, at operation 289*b*; Q-matrix 87 is then matrix multiplied by this result, at operation 287*b*;

Step 6.) The results obtained in steps 2 through 5 are combined, by matrix addition, at operation 258.

It should be noted that the matrix multiplication operations described in each of steps 2 through 5 can be performed in the reverse of the order given and, further, that steps 2 through 5 can be performed in any sequence, as long as the resulting sequence of operations conforms to the above mathematical relationship.

VII. Numerical Example of Matrix Downconversion

Figure 13A:
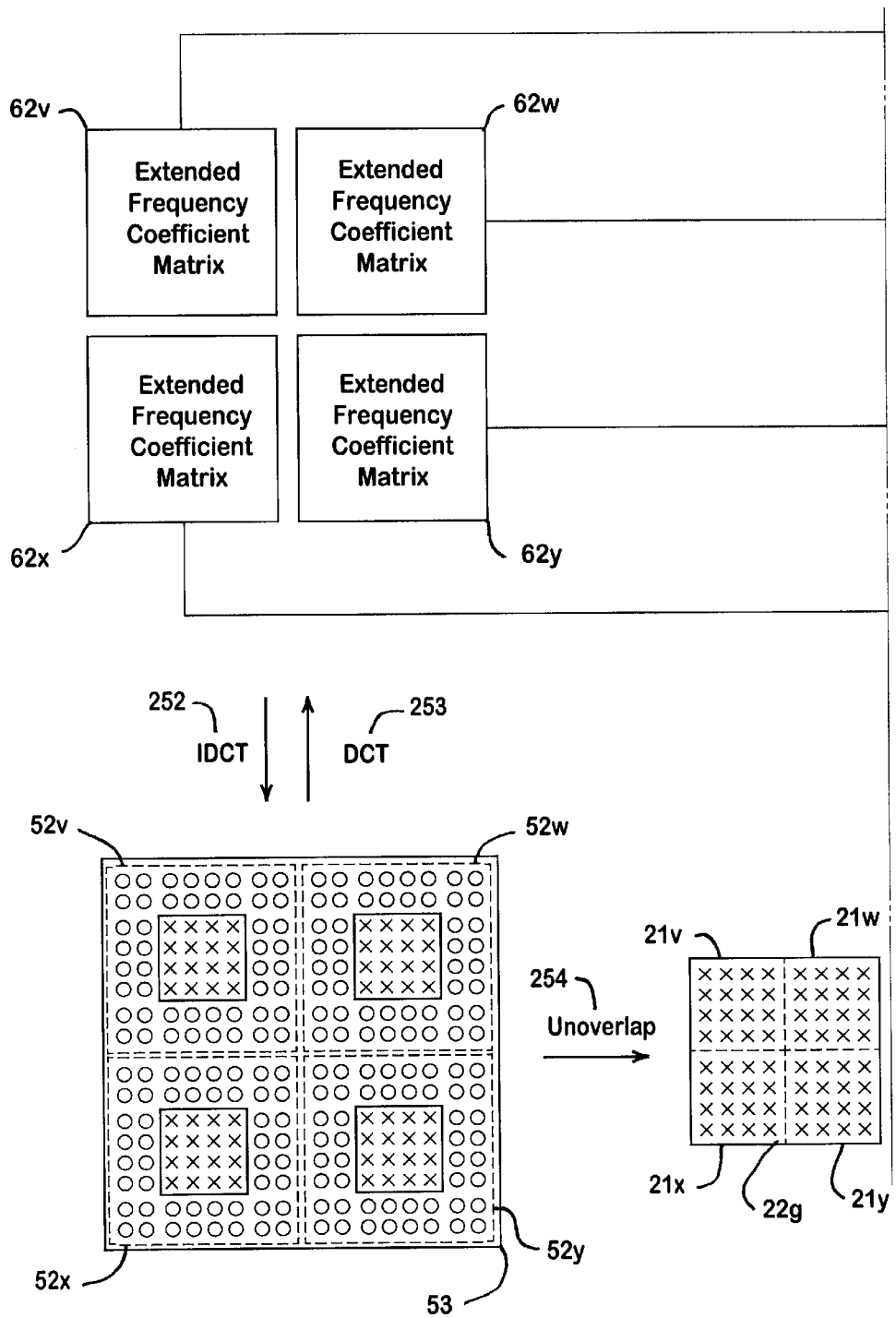
FIG. 13 is a diagram illustrating both conventional and disclosed methods of converting extended frequency-coefficient matrices into a standard frequency-coefficient matrix.
Figure 13B:
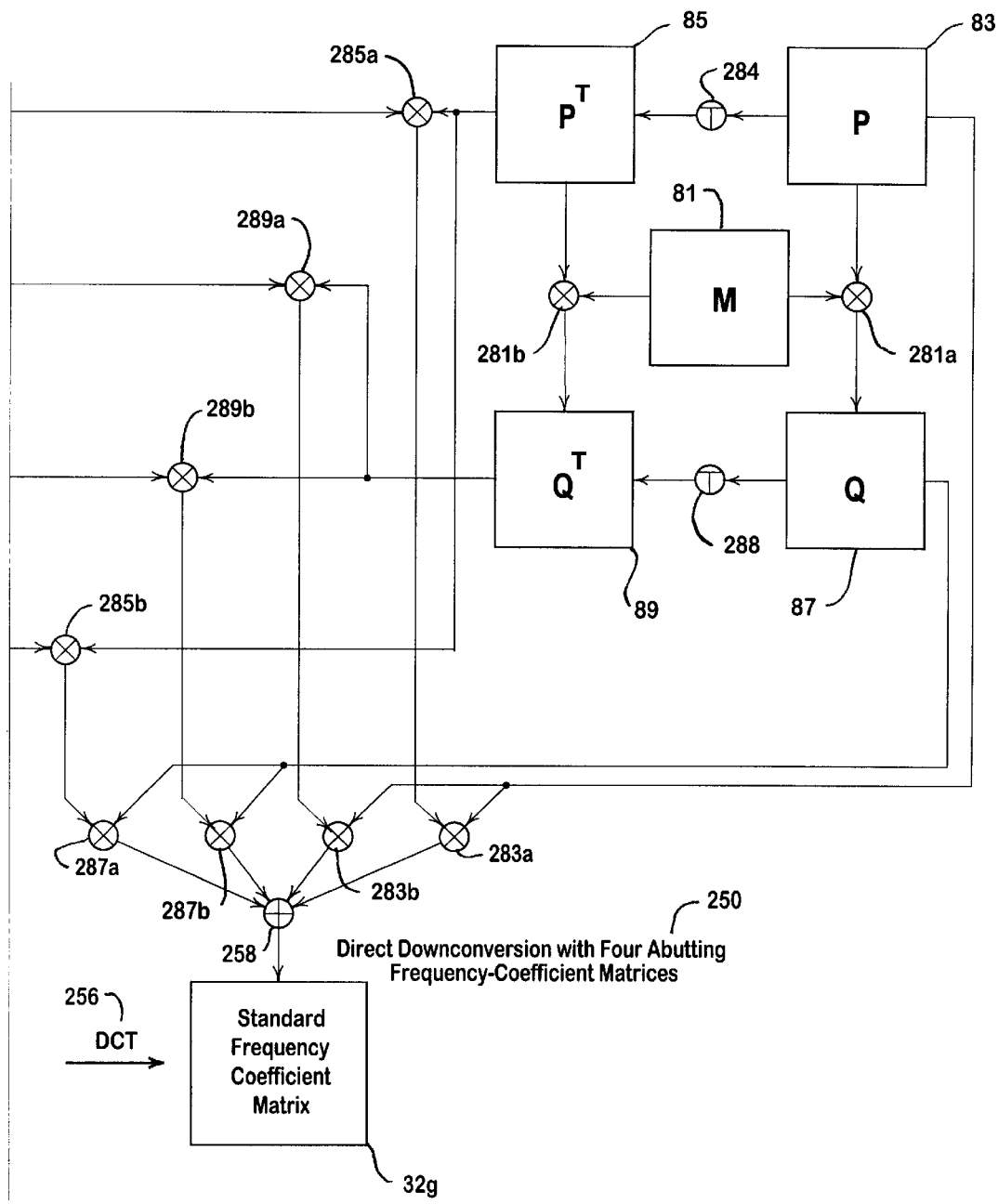

The four matrices 62*v*, 62*w*, 62*x*, and 62*y*, as in FIG. 13, are given by $$[EFM_{62v}] = \begin{bmatrix} 404.8750 & 73.4930 & -49.9543 & 19.7667 & -48.1250 & -4.1433 & 28.6744 & 0.2697 \\ -16.2098 & -24.1889 & 30.0464 & -11.4324 & -64.8922 & -44.5934 & 24.0000 & -44.6385 \\ -28.1123 & -11.9589 & 6.0568 & -45.0467 & -8.6532 & -9.7699 & -3.7719 & 30.5910 \\ -0.0668 & -27.3030 & -18.8583 & -43.5762 & -13.0165 & 46.5353 & 3.4326 & 27.8475 \\ 38.6250 & 18.5405 & -16.6307 & 36.3841 & 5.6250 & 26.9025 & -6.5060 & -20.4302 \\ -63.5937 & 25.1971 & 50.6665 & 18.9253 & -26.5973 & -35.1023 & -0.8502 & -32.7215 \\ -15.2800 & 9.8553 & -13.0219 & 23.4742 & 4.2608 & 54.5763 & -42.5568 & 2.2709 \\ 21.8465 & 25.7515 & 20.7369 & 13.0119 & -1.0467 & -26.9771 & 14.6997 & 15.8674 \end{bmatrix}$$

$$[EFM_{62w}] = \begin{bmatrix} 453.1250 & -30.9701 & -63.6517 & 55.2250 & 9.1250 & 14.4305 & -5.7005 & 16.9669 \\ 38.3974 & -19.9031 & 13.6242 & -26.9813 & -51.4771 & 21.0546 & -4.7413 & -25.4767 \\ 23.3039 & 7.9815 & 30.1049 & 10.6818 & -3.6607 & 18.8813 & -11.2268 & 13.4496 \\ -18.3320 & 28.6802 & -14.2116 & 7.5651 & -11.9510 & 14.4762 & 5.7172 & 33.4287 \\ -32.1250 & -29.6425 & 17.5131 & -5.7548 & -0.6250 & -33.9475 & 90.2965 & 20.1330 \\ 40.8306 & 70.9726 & -25.3558 & -13.7833 & -24.8916 & 56.4848 & -33.7180 & 55.5870 \\ -21.1532 & 7.7867 & -21.4768 & 64.9134 & -1.3250 & -22.6294 & -23.1049 & -24.3711 \\ -10.0870 & 25.7637 & -2.0567 & -5.4615 & -18.0832 & -12.3826 & -45.7255 & 9.3532 \end{bmatrix}$$

$$[EFM_{62x}] = \begin{bmatrix} 404.3750 & -52.7199 & -23.0859 & -13.9801 & -42.1250 & -5.5206 & -37.1157 & -7.6081 \\ 25.4898 & -14.9531 & 15.2115 & -7.3629 & -23.2414 & -9.1045 & -12.8013 & -18.4667 \\ -5.7791 & -2.0166 & 5.7673 & -16.2582 & 12.4744 & -55.1189 & -27.1025 & -25.9044 \\ -48.7432 & -50.7808 & 73.5776 & -57.5930 & -33.0922 & 7.8607 & 11.4926 & -23.5808 \\ -45.3750 & 13.3219 & -47.0122 & 34.1525 & 48.1250 & 38.9917 & -7.9926 & -58.9806 \\ -21.2928 & 9.9387 & 7.1790 & 17.8555 & 25.6176 & 3.3139 & -3.8357 & 17.6321 \\ 0.0937 & 57.7072 & 19.1475 & -3.2863 & -10.7143 & -5.6818 & 19.7327 & -21.8150 \\ -21.0577 & -34.4719 & -9.7085 & 25.1916 & -52.4778 & 7.2792 & 23.0945 & 11.2321 \end{bmatrix}$$

and $$[EFM_{62y}] = \begin{bmatrix} 397.8750 & -28.4437 & -0.7458 & -1.0099 & 46.6250 & 29.1802 & -24.9920 & -40.9086 \\ -4.0842 & 49.0518 & 47.3908 & 26.3723 & -5.6003 & -15.1282 & -28.9631 & -31.6396 \\ -0.3767 & 3.2239 & -4.7207 & -6.3051 & 35.3008 & -8.3215 & 2.7946 & 2.2224 \\ 30.4253 & 7.8207 & -16.3989 & 17.0952 & -7.4761 & -2.2689 & 20.1776 & -15.5648 \\ 8.1250 & -6.2604 & 41.0002 & -3.5531 & 40.8750 & 43.6692 & 13.7300 & -45.1220 \\ 45.7400 & -18.5305 & 40.0424 & 19.6085 & -6.1545 & 24.2480 & 17.3409 & 19.5391 \\ -17.5681 & 23.9444 & -36.2054 & -49.2498 & -19.6281 & -1.2984 & -13.0293 & -3.3130 \\ -0.1783 & -8.2622 & 3.1944 & -21.5902 & 15.9273 & -33.5324 & -29.6017 & 3.6051 \end{bmatrix}$$

A. Conventional Method of Matrix Downconversion

In accordance with the conventional conversion procedure described above, each of the frequency-domain matrices is converted into a spatial-domain matrix by an IDCT, at step 252, in accordance with the equation, $$[OIB_{62}] = C^T \times [EFM_{62}] \times C$$

This yields four spatial-domain matrices, where $$[OIB_{52v}] = \begin{bmatrix} 22.0000 & 69.0000 & 76.0000 & 27.0000 & 7.0000 & 63.0000 & 47.0000 & 21.0000 \\ 5.0000 & 59.0000 & 99.0000 & 36.0000 & 50.0000 & 74.0000 & 29.0000 & 71.0000 \\ 68.0000 & 93.0000 & 37.0000 & 17.0000 & 38.0000 & 73.0000 & 18.0000 & 13.0000 \\ 68.0000 & 85.0000 & 25.0000 & 49.0000 & 28.0000 & 100.0000 & 15.0000 & 9.0000 \\ 93.0000 & 53.0000 & 98.0000 & 90.0000 & 91.0000 & 89.0000 & 57.0000 & 27.0000 \\ 38.0000 & 9.0000 & 72.0000 & 91.0000 & 53.0000 & 23.0000 & 80.0000 & 0.0000 \\ 52.0000 & 65.0000 & 75.0000 & 6.0000 & 46.0000 & 31.0000 & 3.0000 & 41.0000 \\ 83.0000 & 42.0000 & 65.0000 & 90.0000 & 94.0000 & 35.0000 & 53.0000 & 3.0000 \end{bmatrix}$$

$$[OIB_{52w}] = \begin{bmatrix} 68.0000 & 49.0000 & 90.0000 & 45.0000 & 63.0000 & 73.0000 & 92.0000 & 21.0000 \\ 39.0000 & 46.0000 & 43.0000 & 81.0000 & 44.0000 & 87.0000 & 87.0000 & 100.0000 \\ 39.0000 & 96.0000 & 14.0000 & 93.0000 & 82.0000 & 72.0000 & 89.0000 & 15.0000 \\ 50.0000 & 13.0000 & 95.0000 & 65.0000 & 69.0000 & 80.0000 & 54.0000 & 63.0000 \\ 15.0000 & 20.0000 & 41.0000 & 22.0000 & 70.0000 & 71.0000 & 14.0000 & 62.0000 \\ 59.0000 & 32.0000 & 13.0000 & 68.0000 & 99.0000 & 74.0000 & 45.0000 & 0.0000 \\ 85.0000 & 63.0000 & 89.0000 & 91.0000 & 95.0000 & 2.0000 & 99.0000 & 0.0000 \\ 59.0000 & 13.0000 & 9.0000 & 25.0000 & 85.0000 & 89.0000 & 22.0000 & 77.0000 \end{bmatrix}$$

$$[OIB_{52x}] = \begin{bmatrix} 3.0000 & 70.0000 & 7.0000 & 50.0000 & 5.0000 & 51.0000 & 50.0000 & 71.0000 \\ 5.0000 & 91.0000 & 63.0000 & 52.0000 & 76.0000 & 59.0000 & 96.0000 & 94.0000 \\ 53.0000 & 76.0000 & 88.0000 & 32.0000 & 77.0000 & 85.0000 & 75.0000 & 24.0000 \\ 67.0000 & 26.0000 & 27.0000 & 99.0000 & 83.0000 & 41.0000 & 55.0000 & 18.0000 \\ 1.0000 & 5.0000 & 44.0000 & 49.0000 & 13.0000 & 84.0000 & 89.0000 & 32.0000 \\ 38.0000 & 74.0000 & 77.0000 & 27.0000 & 2.0000 & 27.0000 & 62.0000 & 89.0000 \\ 7.0000 & 33.0000 & 48.0000 & 9.0000 & 69.0000 & 42.0000 & 84.0000 & 65.0000 \\ 42.0000 & 63.0000 & 24.0000 & 95.0000 & 87.0000 & 54.0000 & 16.0000 & 15.0000 \end{bmatrix}$$

and

-continued $$[OIB_{52y}] = \begin{bmatrix} 96.0000 & 65.0000 & 16.0000 & 86.0000 & 29.0000 & 52.0000 & 45.0000 & 73.0000 \\ 56.0000 & 62.0000 & 7.0000 & 47.0000 & 54.0000 & 46.0000 & 32.0000 & 32.0000 \\ 15.0000 & 80.0000 & 37.0000 & 51.0000 & 51.0000 & 7.0000 & 51.0000 & 42.0000 \\ 98.0000 & 25.0000 & 25.0000 & 60.0000 & 10.0000 & 71.0000 & 88.0000 & 68.0000 \\ 41.0000 & 48.0000 & 14.0000 & 82.0000 & 41.0000 & 49.0000 & 44.0000 & 68.0000 \\ 14.0000 & 39.0000 & 78.0000 & 76.0000 & 58.0000 & 67.0000 & 47.0000 & 21.0000 \\ 56.0000 & 20.0000 & 46.0000 & 46.0000 & 88.0000 & 68.0000 & 81.0000 & 84.0000 \\ 25.0000 & 3.0000 & 35.0000 & 95.0000 & 44.0000 & 20.0000 & 37.0000 & 71.0000 \end{bmatrix}$$

The four spatial-domain matrices are unoverlapped, as in step 254, to yield the four quadrant cores, $$[QCB_{21v}] = \begin{bmatrix} 37.0000 & 17.0000 & 38.0000 & 73.0000 \\ 25.0000 & 49.0000 & 28.0000 & 100.0000 \\ 98.0000 & 90.0000 & 91.0000 & 89.0000 \\ 72.0000 & 91.0000 & 53.0000 & 23.0000 \end{bmatrix}$$

$$[QCB_{21w}] = \begin{bmatrix} 14.0000 & 93.0000 & 82.0000 & 72.0000 \\ 95.0000 & 65.0000 & 69.0000 & 80.0000 \\ 41.0000 & 22.0000 & 70.0000 & 71.0000 \\ 13.0000 & 68.0000 & 99.0000 & 74.0000 \end{bmatrix}$$

$$[QCB_{21x}] = \begin{bmatrix} 88.0000 & 32.0000 & 77.0000 & 85.0000 \\ 27.0000 & 99.0000 & 83.0000 & 41.0000 \\ 44.0000 & 49.0000 & 13.0000 & 84.0000 \\ 77.0000 & 27.0000 & 2.0000 & 27.0000 \end{bmatrix}$$

and $$[QCB_{21y}] = \begin{bmatrix} 37.0000 & 51.0000 & 51.0000 & 7.0000 \\ 25.0000 & 60.0000 & 10.0000 & 71.0000 \\ 14.0000 & 82.0000 & 41.0000 & 49.0000 \\ 78.0000 & 76.0000 & 58.0000 & 67.0000 \end{bmatrix}$$

The four quadrant cores are combined to form nonoverlapped image-data block 22g, and the corresponding matrix $[NIB_{22g}]$ is given by, $$\begin{bmatrix} 37.0000 & 17.0000 & 38.0000 & 73.0000 & 14.0000 & 93.0000 & 82.0000 & 72.0000 \\ 25.0000 & 49.0000 & 28.0000 & 100.0000 & 95.0000 & 65.0000 & 69.0000 & 80.0000 \\ 98.0000 & 90.0000 & 91.0000 & 89.0000 & 41.0000 & 22.0000 & 70.0000 & 71.0000 \\ 72.0000 & 91.0000 & 53.0000 & 23.0000 & 13.0000 & 68.0000 & 99.0000 & 74.0000 \\ 88.0000 & 32.0000 & 77.0000 & 85.0000 & 37.0000 & 51.0000 & 51.0000 & 7.0000 \\ 27.0000 & 99.0000 & 83.0000 & 41.0000 & 25.0000 & 60.0000 & 10.0000 & 71.0000 \\ 44.0000 & 49.0000 & 13.0000 & 84.0000 & 14.0000 & 82.0000 & 41.0000 & 49.0000 \\ 77.0000 & 27.0000 & 2.0000 & 27.0000 & 78.0000 & 76.0000 & 58.0000 & 67.0000 \end{bmatrix}$$

A DCT is performed on matrix 22g, as in step 256, to yield standard frequency-coefficient matrix 32g in accordance with the equation, $$[SFM_{32g}] = C \times [NIB_{22g}] \times C^T$$

where $$[SFM_{32g}] = \begin{bmatrix} 454.2500 & -13.7034 & 21.7632 & 0.2688 & -4.7500 & 27.8285 & 2.8917 & -53.1845 \\ 39.8330 & -22.7535 & -7.9434 & -32.7715 & -2.0655 & 30.4927 & -17.8849 & 7.1563 \\ -20.3882 & -81.0070 & -23.4418 & 38.0990 & 39.2020 & -7.3775 & 1.8152 & -22.5455 \\ -36.0291 & -1.6916 & -35.9223 & -22.4333 & -27.0073 & 2.2770 & 34.1146 & -33.5527 \\ -14.5000 & -22.3554 & 25.1377 & 52.0432 & -13.0000 & 36.6928 & 16.9180 & 23.4948 \\ -7.0973 & -8.2741 & 49.3916 & -9.2326 & -42.0873 & 13.0776 & 4.3583 & -36.0595 \\ 10.8804 & 34.2681 & 31.0652 & -31.8271 & -13.8026 & -20.7269 & 19.6918 & 22.2089 \\ -1.1159 & 41.6468 & -26.1254 & 3.3752 & 27.8724 & 65.0553 & 7.7784 & -0.3907 \end{bmatrix}$$

B. Disclosed Method of Matrix Downconversion

In accordance with the disclosed method, extended frequency-coefficient matrix 62g is directly downconverted into standard frequency-coefficient matrix 32g, as in operation 258. Matrices P and Q are derived by first obtaining the matrix t in accordance with the relationship, $$t_{mn} = \frac{1}{\sqrt{2}} k_n \cos\left[\frac{(2m+1)n\pi}{16}\right]$$

to give $$[t]^{4,8} = \begin{bmatrix} 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4904 \\ 0.3536 & -0.0975 & -0.4619 & 0.2778 & 0.3536 & -0.4157 & -0.1913 & 0.4904 \\ 0.3536 & -0.2778 & -0.1913 & 0.4904 & -0.3536 & -0.0975 & 0.4619 & -0.4157 \end{bmatrix}$$

The modified basis matrix is determined from the relationship, $$[MBM]^{8,16} = \begin{bmatrix} t & 0 \\ 0 & t \end{bmatrix}$$

and is given by $$[MBM]^{8,16} = \begin{bmatrix} 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4904 \\ 0.3536 & -0.0975 & -0.4619 & 0.2778 & 0.3536 & -0.4157 & -0.1913 & 0.4904 \\ 0.3536 & -0.2778 & -0.1913 & 0.4904 & -0.3536 & -0.0975 & 0.4619 & -0.4157 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \end{bmatrix}$$

$$\begin{bmatrix} 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4904 \\ 0.3536 & -0.0975 & -0.1619 & 0.2778 & 0.3536 & -0.4157 & -0.1913 & 0.4904 \\ 0.3536 & -0.2778 & -0.1913 & 0.4904 & -0.3536 & -0.0975 & 0.4619 & -0.4157 \end{bmatrix}$$

The format transform matrix $[FTM]^{8,16}$ is derived from the relationship $$[FTM]^{8,16} = C \times [MBM]^{8,16} \qquad (5)$$

and is found to be $$\begin{bmatrix}
0.5000 & 0.0000 & -0.4619 & 0.0000 & 0.0000 & 0.0000 & 0.1913 & 0.0000 \\
0.4531 & 0.1226 & -0.4329 & -0.2310 & 0.0373 & 0.0957 & 0.1389 & 0.0957 \\
0.0000 & 0.2940 & 0.0000 & -0.5594 & 0.0000 & 0.2492 & 0.0000 & 0.1964 \\
-0.1591 & 0.2310 & 0.2452 & -0.4492 & -0.2566 & 0.2310 & 0.1762 & 0.0957 \\
0.0000 & 0.0000 & 0.1913 & 0.0000 & -0.5000 & 0.0000 & 0.4619 & 0.0000 \\
0.1063 & -0.0957 & 0.0488 & 0.2310 & -0.3841 & -0.2579 & 0.3955 & 0.2310 \\
0.0000 & 0.0162 & 0.0000 & 0.0690 & 0.0000 & -0.3468 & 0.0000 & 0.6122 \\
-0.0901 & 0.0957 & 0.0114 & -0.0957 & 0.1877 & -0.2310 & -0.2079 & 0.5845
\end{bmatrix}$$

$$\begin{bmatrix}
0.5000 & 0.0000 & -0.4619 & 0.0000 & 0.0000 & 0.0000 & 0.1913 & 0.0000 \\
-0.4531 & 0.1226 & 0.4329 & -0.2310 & -0.0373 & 0.0957 & -0.1389 & 0.0957 \\
0.0000 & -0.2940 & 0.0000 & 0.5594 & 0.0000 & -0.2492 & 0.0000 & -0.1964 \\
0.1591 & 0.2310 & -0.2452 & -0.4492 & 0.2566 & 0.2310 & -0.1762 & 0.0957 \\
0.0000 & 0.0000 & 0.1913 & 0.0000 & -0.5000 & 0.0000 & 0.4619 & 0.0000 \\
-0.1063 & -0.0957 & -0.0488 & 0.2310 & 0.3841 & -0.2579 & -0.3955 & 0.2310 \\
0.0000 & -0.0162 & 0.0000 & -0.0690 & 0.0000 & 0.3468 & 0.0000 & -0.6122 \\
0.0901 & 0.0957 & -0.0114 & -0.0957 & -0.1877 & -0.2310 & 0.2079 & 0.5845
\end{bmatrix}$$

(30)

Matrix P is the left half of the format transform matrix, and matrix Q is the right half of the format transform matrix. First downconversion P-matrix 83 is given by $$P = \begin{bmatrix}
0.5000 & 0.0000 & -0.4619 & 0.0000 & 0.0000 & 0.0000 & 0.1913 & 0.0000 \\
0.4531 & 0.1226 & -0.4329 & -0.2310 & 0.0373 & 0.0957 & 0.1389 & 0.0957 \\
0.0000 & 0.2940 & 0.0000 & -0.5594 & 0.0000 & 0.2492 & 0.0000 & 0.1964 \\
-0.1591 & 0.2310 & 0.2452 & -0.4492 & -0.2566 & 0.2310 & 0.1762 & 0.0957 \\
0.0000 & 0.0000 & 0.1913 & 0.0000 & -0.5000 & 0.0000 & 0.4619 & 0.0000 \\
0.1063 & -0.0957 & 0.0488 & 0.2310 & -0.3841 & -0.2579 & 0.3955 & 0.2310 \\
0.0000 & 0.0162 & 0.0000 & 0.0690 & 0.0000 & -0.3468 & 0.0000 & 0.6122 \\
-0.0901 & 0.0957 & 0.0114 & -0.0957 & 0.1877 & -0.2310 & -0.2079 & 0.5845
\end{bmatrix}$$

Second downconversion Q-matrix 87 is given by $$Q = \begin{bmatrix}
0.5000 & 0.0000 & -0.4619 & 0.0000 & 0.0000 & 0.0000 & 0.1913 & 0.0000 \\
-0.4531 & 0.1226 & 0.4329 & -0.2310 & -0.0373 & 0.0957 & -0.1389 & 0.0957 \\
0.0000 & -0.2940 & 0.0000 & 0.5594 & 0.0000 & -0.2492 & 0.0000 & -0.1964 \\
0.1591 & 0.2310 & -0.2452 & -0.4492 & 0.2566 & 0.2310 & -0.1762 & 0.0957 \\
0.0000 & 0.0000 & 0.1913 & 0.0000 & -0.5000 & 0.0000 & 0.4619 & 0.0000 \\
-0.1063 & -0.0957 & -0.0488 & 0.2310 & 0.3841 & -0.2579 & -0.3955 & 0.2310 \\
0.0000 & -0.0162 & 0.0000 & -0.0690 & 0.0000 & 0.3468 & 0.0000 & -0.6122 \\
0.0901 & 0.0957 & -0.0114 & -0.0957 & -0.1877 & -0.2310 & 0.2079 & 0.5845
\end{bmatrix}$$

The P-transform matrix 85 is given by $$P^T = \begin{bmatrix} 0.5000 & 0.4531 & 0.0000 & -0.1591 & 0.0000 & 0.1063 & 0.0000 & -0.0901 \\ 0.0000 & 0.1226 & 0.2940 & 0.2310 & 0.0000 & -0.0957 & 0.0162 & 0.0957 \\ -0.4619 & -0.4329 & 0.0000 & 0.2452 & 0.1913 & 0.0488 & 0.0000 & 0.0114 \\ 0.0000 & -0.2310 & -0.5594 & -0.4492 & 0.0000 & 0.2310 & 0.0690 & -0.0957 \\ 0.0000 & 0.0373 & 0.0000 & -0.2566 & -0.5000 & -0.3841 & 0.0000 & 0.1877 \\ 0.0000 & 0.0957 & 0.2492 & 0.2310 & 0.0000 & -0.2579 & -0.3468 & -0.2340 \\ 0.1913 & 0.1389 & 0.0000 & 0.1762 & 0.4619 & 0.3955 & 0.0000 & -0.2079 \\ 0.0000 & 0.0957 & 0.1964 & 0.0957 & 0.0000 & 0.2310 & 0.6122 & 0.5845 \end{bmatrix}$$

The Q-transform matrix 89 is given by $$Q^T = \begin{bmatrix} 0.5000 & -0.4531 & 0.0000 & 0.1591 & 0.0000 & -0.1063 & 0.0000 & 0.0901 \\ 0.0000 & 0.1226 & -0.2940 & 0.2310 & 0.0000 & -0.0957 & -0.0162 & 0.0957 \\ -0.4619 & 0.4329 & 0.0000 & -0.2452 & 0.1913 & -0.0488 & 0.0000 & -0.0114 \\ 0.0000 & -0.2310 & 0.5594 & -0.4492 & 0.0000 & 0.2310 & -0.0690 & -0.0957 \\ 0.0000 & -0.0373 & 0.0000 & 0.2566 & -0.5000 & 0.3841 & 0.0000 & -0.1877 \\ 0.0000 & 0.0957 & -0.2492 & 0.2310 & 0.0000 & -0.2579 & 0.3468 & -0.2310 \\ 0.1913 & -0.1389 & 0.0000 & -0.1762 & 0.4619 & -0.3955 & 0.0000 & 0.2079 \\ 0.0000 & 0.0957 & -0.1964 & 0.0957 & 0.0000 & 0.2310 & -0.6122 & 0.5845 \end{bmatrix}$$

The matrix product, $$P \times [EFM_{61v}] \times P^T$$

corresponding to operations as in steps 285a and 283a, is found to be, $$\begin{bmatrix} 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \end{bmatrix}$$

The matrix product, $$P \times [EFM_{61w}] \times Q^T$$

corresponding to operations as in steps 289a and 283b, is found to be, $$\begin{bmatrix} 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \end{bmatrix}$$

The matrix product, $$Q \times [EFM_{61x}] \times P^T$$

corresponding to operations as in steps 285b and 287a, is found to be, $$\begin{bmatrix} 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \end{bmatrix}$$

The matrix product, $$Q \times [EFM_{61y}] \times Q^T$$

corresponding to operations as in steps 289b and 287b, is found to be, $$\begin{bmatrix} 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \end{bmatrix}$$

The matrix sum, $$[SFM_{32g}] = P \times [EFM_{61v}] \times P^T + \\ P \times [EFM_{61w}] \times Q^T + \\ Q \times [EFM_{61x}] \times P^T + \\ Q \times [EFM_{61y}] \times Q^T$$

corresponding to the operation as in step 258, is found to be, $$\begin{bmatrix} 454.2500 & -13.7034 & 21.7632 & 0.2688 & -4.7500 & 27.8285 & 2.8917 & -53.1845 \\ 39.8330 & -22.7535 & -7.9434 & -32.7715 & -2.0655 & 30.4927 & -17.8849 & 7.1563 \\ -20.3882 & -81.0070 & -23.4418 & 38.0990 & 39.2020 & -7.3775 & 1.8152 & -22.5455 \\ -36.0291 & -1.6916 & -35.9223 & -22.4333 & -27.0073 & 2.2770 & 34.1146 & -33.5527 \\ -14.5000 & -22.3554 & 25.1377 & 52.0432 & -13.0000 & 36.6928 & 16.9180 & 23.4948 \\ -7.0973 & -8.2741 & 49.3916 & -9.2326 & -42.0873 & 13.0776 & 4.3583 & -36.0595 \\ 10.8804 & 34.2681 & 31.0652 & -31.8271 & -13.8026 & -20.7269 & 19.6918 & 22.2089 \\ -1.1159 & 41.6468 & -26.1254 & 3.3752 & 27.8724 & 65.0553 & 7.7784 & -0.3907 \end{bmatrix}$$

which is the same result as obtained by following the conventional method above.

VIII. Matrix Array Convertor

Figure 14A:
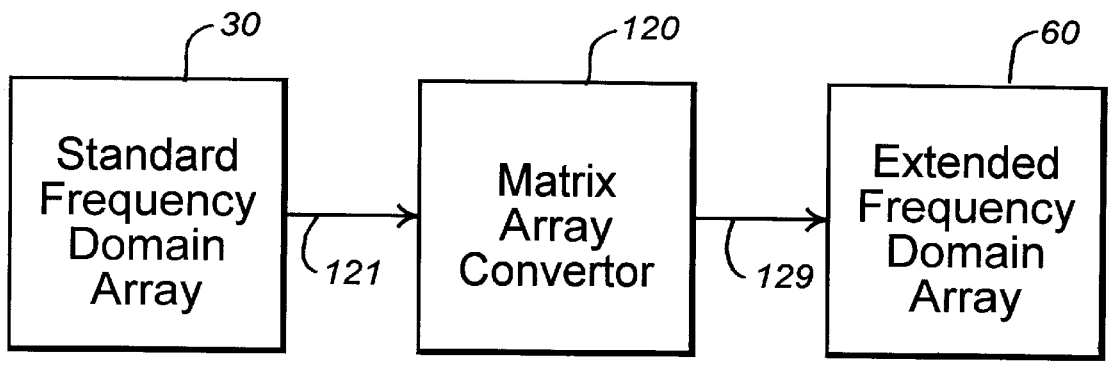
FIGS. 14A and 14B are block diagrams illustrating the use of a matrix array convertor, according to the present invention, in performing the conversion between a standard frequency-domain array and an extended frequency-domain array.
Figure 14B:
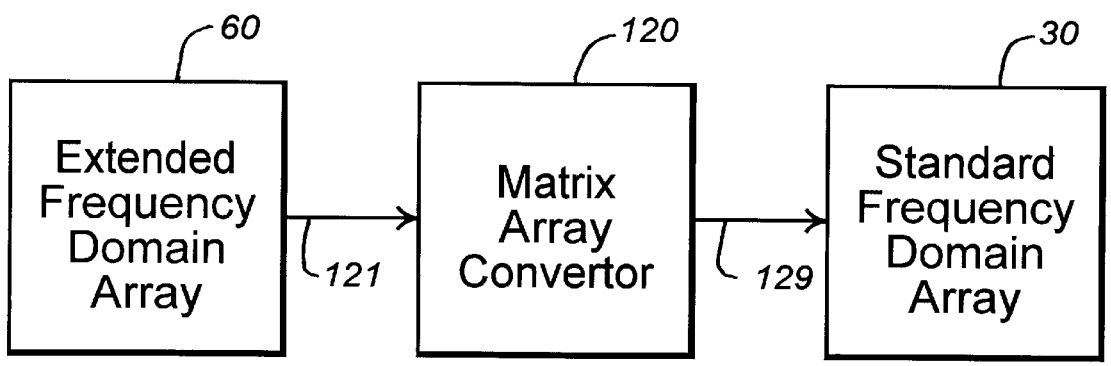

The method of direct upconversion, shown in FIG. 4 as step 200, functions to convert standard frequency domain array 30 into extended frequency domain array 60. This function can be performed by a conversion device such as a matrix array convertor 120 shown in FIG. 14A. Standard frequency domain array 30 is transmitted to matrix array convertor 120 via an input data bus 121, and extended frequency domain array 60 is obtained via an output data bus 129. Matrix array convertor 120 is similarly utilized in the method of direct downconversion, shown in FIG. 5 as step 300. In FIG. 14B, extended frequency domain array 60 is transmitted to matrix array convertor 120 via input data bus 121, and standard frequency domain array 30 is obtained via output data bus 129.

FIG. 15 is a functional block diagram illustrating a preferred embodiment of matrix array convertor 120. The frequency-coefficient matrix array selected for conversion into a different format is transmitted to a source image memory 130 via input data bus 121. A data bus 123 provides for the transmittal of matrix data to a DCT processor 140. Processed matrix data are subsequently transmitted to an adder 150 via a data bus 125, and into a destination image memory 160, via data bus 127, from which a converted matrix array is obtained via output data bus 129. An address sequencer and control unit 170 controls the read and write cycles of source image memory 130 and destination image memory 160 via data bus 131 and data bus 161 respectively. A microprocessor 180 sends commands to address sequencer and control unit 170 via a control data bus 181.

DCT processor 140 comprises a matrix multiplier A 141 which receives matrix data from a matrix memory A 143 via a data bus 142, and from source image memory 130 via data bus 123. Product matrix data are sent from matrix multiplier A 141 via a data bus 144 to a corner-turn memory 145. A matrix multiplier B 147 receives matrix data from corner-turn memory 145 via a data bus 146, and from a matrix memory B 149 via a data bus 148. Processed matrix data are sent from matrix multiplier B 147 to a first adder input 151 in adder 150 via data bus 125. Matrix memory A 143 and matrix memory B 149 are used to store utility matrix data, such as an identity matrix 77. Microprocessor 180 loads utility matrix data into matrix memory A 143 via a data bus 171, and into matrix memory B 149 via data bus 175. Address sequencer and control unit 170 generates the addresses for source image memory 130, matrix memory A 143, matrix memory B 149, and destination image memory 160 so that the correct data streams are sent to and received from matrix multiplier A 141 and matrix multiplier B 147.

DCT processor 140 can be configured to perform both matrix multiplication and mask multiplication. When matrix multiplication is required, such as in the computation of a DCT, the matrices transmitted via data bus 123 are processed row by row in matrix multiplier A 141. The product matrices thus produced are subsequently sent to corner-turn memory 145 and transposed. This transposition places the product matrices into proper configuration to be processed column by column in matrix multiplier B 147. When matrix multiplication without an intervening transposition is required, a control signal is sent via a control line 173 to place corner-turn memory 145 into a pass-through mode. Product matrix data are then sent without modification from matrix multiplier A 141 to matrix multiplier B 147.

Adder 150 functions to add matrix data provided on data bus 151 to matrix data provided on a data bus 153. A feedback data bus 163 allows for the transmittal of matrix data residing in destination image memory 160 to second adder input 153. A control line 179 is provided by which a control signal is sent to change the mode of adder 150 between a summing mode, and a pass-through mode selected for processing operations in which feedback data is not used. When adder 150 is in the pass-through mode, processed matrix data on output data bus 125 is sent without modification to destination image memory 160 via data bus 127.

A. Direct Upconversion with Coincident Image-Data Blocks

Direct upconversion of standard frequency-coefficient matrix 32b into extended frequency-coefficient matrix 62a, shown in FIG. 7 as step 210, is accomplished in matrix array convertor 120 by placing both corner-turn memory 145 and adder 150 into pass-through modes, in FIG. 15. Address sequencer and control unit 170 sends both matrix 32b, from source image memory 130, and identity matrix 77, from matrix memory A 143, to matrix multiplier A 141 for multiplication. Matrix 32b is obtained as a product matrix and passes unmodified through corner-turn memory 145. Address sequencer and control unit 170 sends identity matrix 77 from matrix memory B 149 for multiplication with matrix 32b in matrix multiplier B 147. Matrix 32b is obtained as a processed matrix and passes unmodified through adder 150. Matrix 32b is sent to destination image memory 160 to be read out as extended frequency-coefficient matrix 62a.

B. Direct Upconversion with Adjacent Image-Data Semi-Blocks

Figure 16:
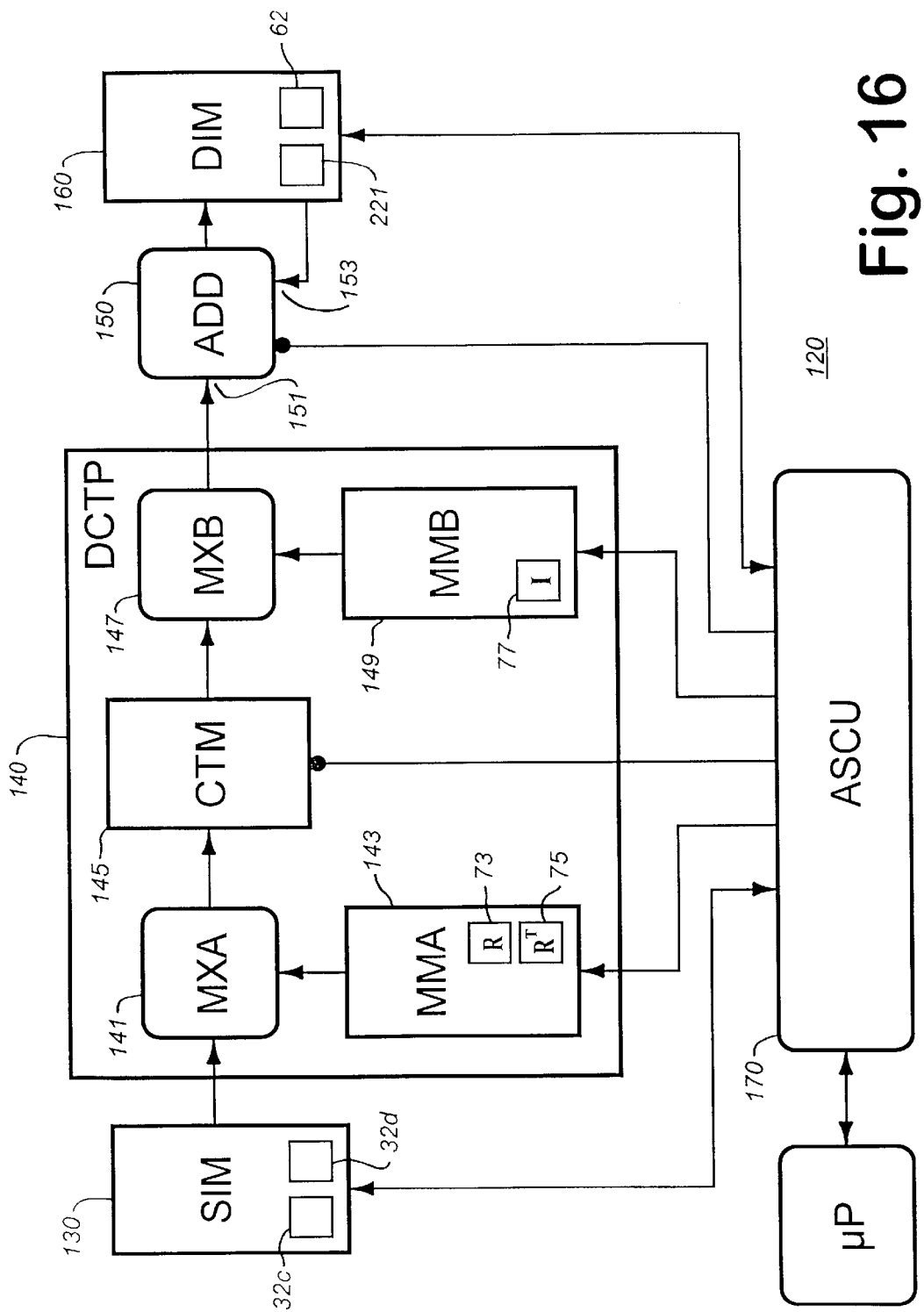
FIG. 16 is a functional block diagram of the matrix array convertor of FIG. 14A illustrating the direct upconversion of row-adjacent matrices, in accordance with the disclosed method of FIG. 8.

Direct upconversion of standard frequency-coefficient matrices 32c and 32d into extended frequency-coefficient matrix 62b, shown in FIG. 8 as step 220, is accomplished in matrix array convertor 120 by placing corner-turn memory 145 into the pass-through mode, in FIG. 16. In a first processing cycle, address sequencer and control unit 170 sends both matrix 32c from source image memory 130, and R matrix 73 from matrix memory A 143, to matrix multiplier A 141 for multiplication. The resulting product matrix passes unmodified through corner-turn memory 145 and is multiplied by identity matrix 77 in matrix multiplier B 147. Adder 150 is placed into the pass-through mode. The processed matrix sent from matrix multiplier B 147 passes unmodified through adder 150 and is temporarily stored in destination image memory 160 as a first processed matrix 221.

In a second processing cycle, address sequencer and control unit 170 sends both matrix 32*d* from source image memory 130, and R-transpose matrix 75 from matrix memory A 143, to matrix multiplier A 141 for multiplication. The resulting product matrix passes unmodified through corner-turn memory 145 and is multiplied by identity matrix 77 in matrix multiplier B 147 to produce a second processed matrix. Adder 150 is placed into the summing mode and, as each matrix element of the second processed matrix is sent to first adder input 151, a corresponding element of first processed matrix 221 is retrieved from destination image memory 160 and is sent to second adder input 153. The matrix sum of matrix 221 and second processed matrix is read into destination image memory 160 as extended frequency-coefficient matrix 62*b*.

Figure 9A:
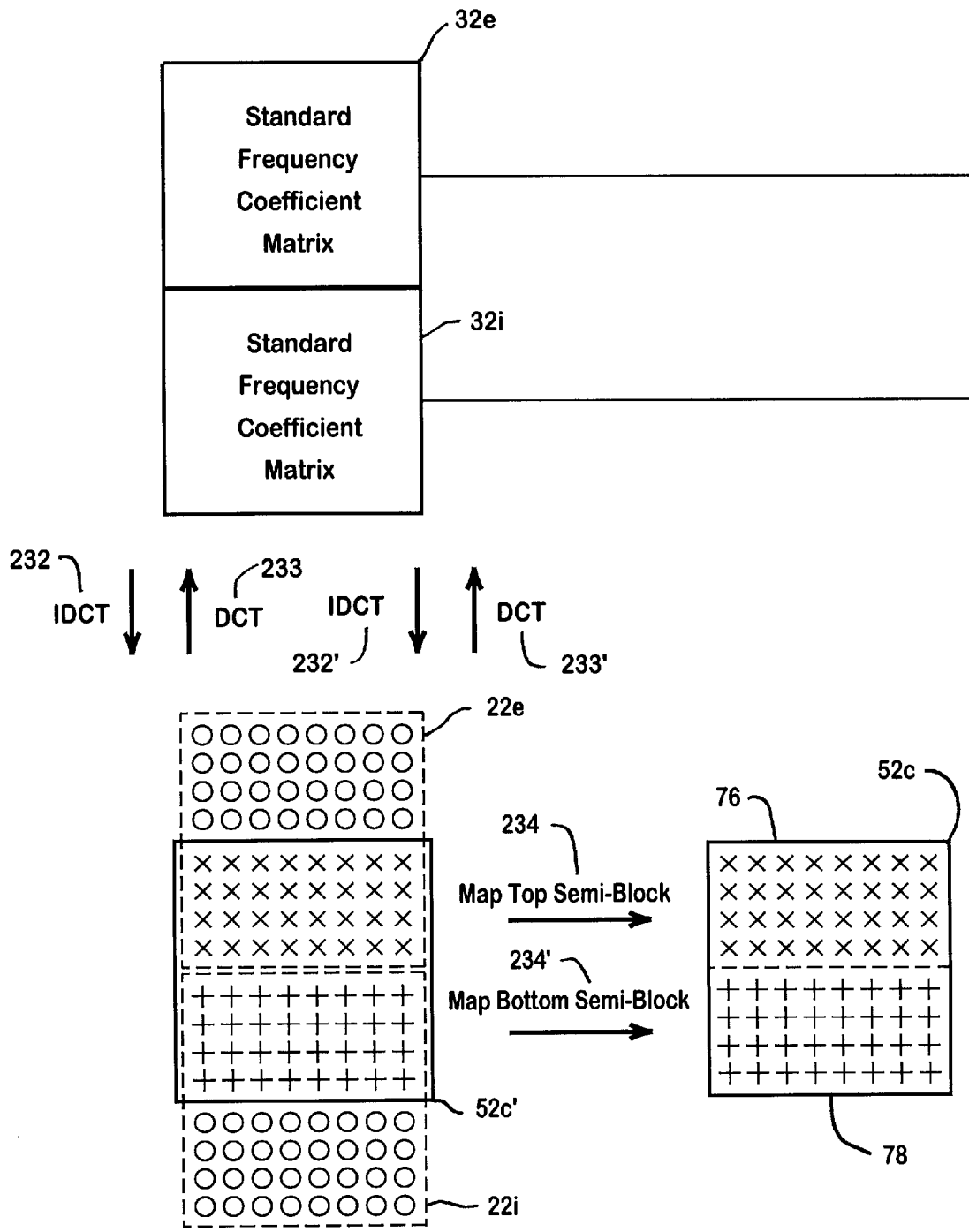
FIG. 9 is a diagram illustrating both conventional and disclosed methods of converting frequency-coefficient matrices of a third type, denoted as column-adjacent matrices, into a frequency-coefficient matrix in an extended-array format.
Figure 9B:
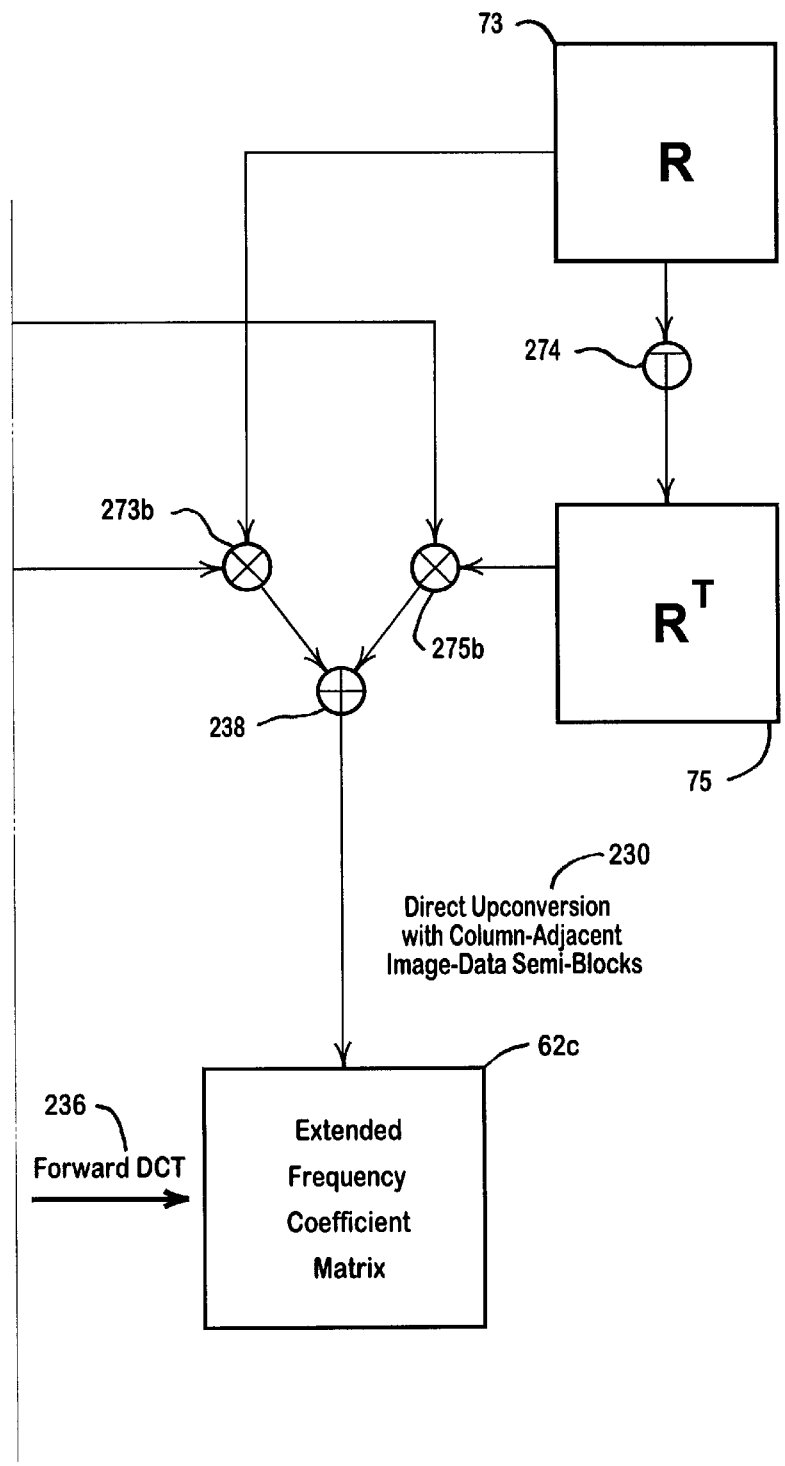

Direct upconversion of standard frequency-coefficient matrices 32*e* and 32*i* into extended frequency-coefficient matrix 62*c*, shown in FIG. 9 as step 230, is accomplished in matrix array convertor 120 using a procedure similar to that described above for the direct upconversion of matrices 32*c* and 32*d* into matrix 62*b*.

C. Direct Upconversion with Abutting Image-Data Quarter-Blocks

Figure 17:
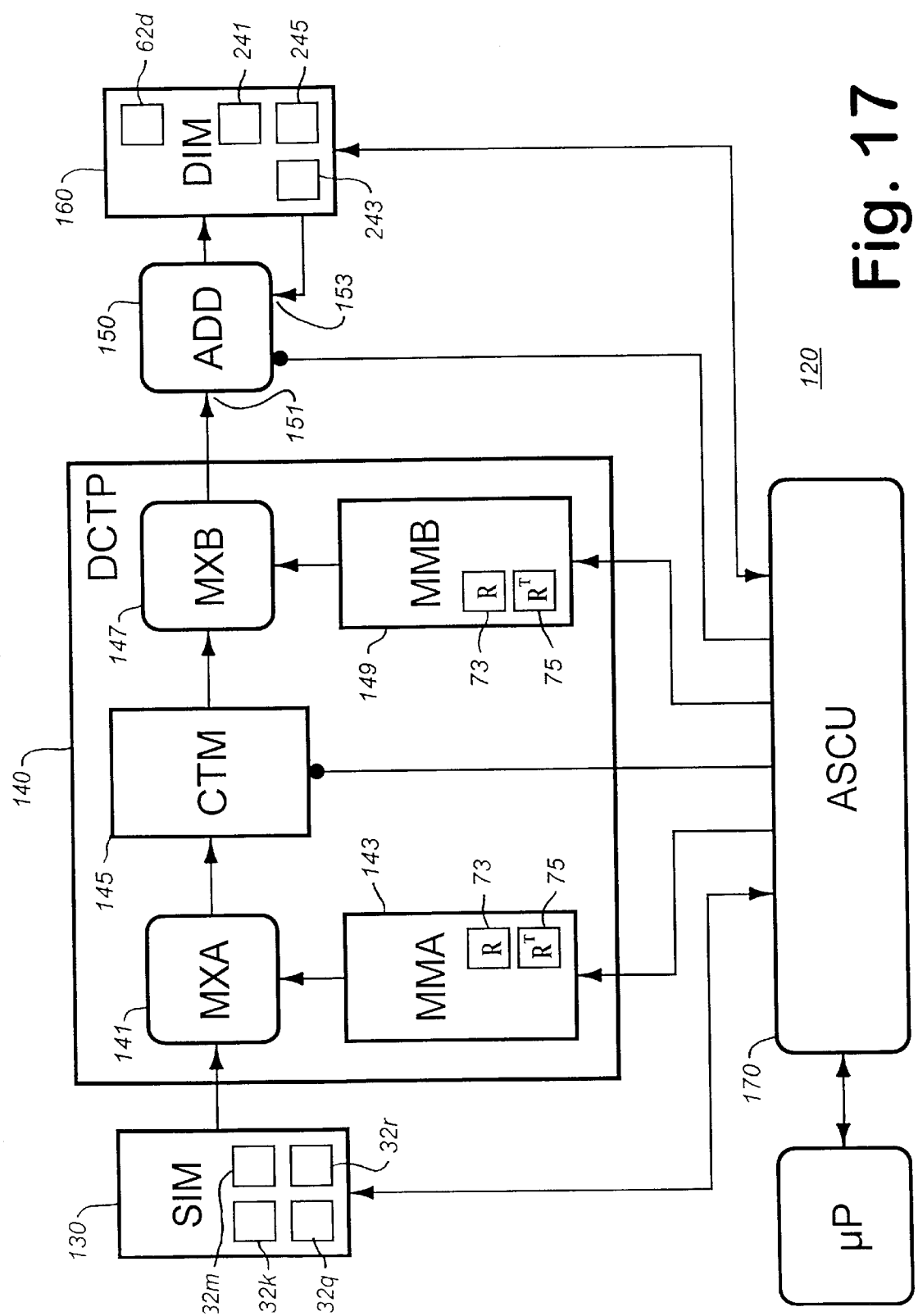
FIG. 17 is a functional block diagram of the matrix array convertor of FIG. 14A illustrating the direct upconversion of abutting matrices, in accordance with the disclosed method of FIG. 10.

Direct upconversion of standard frequency-coefficient matrices 32*k*, 32*m*, 32*q*, and 32*r* into extended frequency-coefficient matrix 62*d*, shown in FIG. 10 as step 240, is accomplished in matrix array convertor 120 by placing corner-turn memory 145 into the pass-through mode, in FIG. 17. In a first processing cycle, address sequencer and control unit 170 sends both matrix 32*k* from source image memory 130, and R matrix 73 from matrix memory A 143, to matrix multiplier A 141 for multiplication. The resulting product matrix passes unmodified through corner-turn memory 145 and is multiplied by R-transpose matrix 75 in matrix multiplier B 147. Adder 150 is placed into the pass-through mode. The processed matrix sent from matrix multiplier B 147 passes unmodified through adder 150 and is temporarily stored in destination image memory 160 as a first processed matrix 241.

In a second processing cycle, address sequencer and control unit 170 sends matrix 32*q* from source image memory 130 to matrix multiplier A 141 for multiplication with R matrix 73. The resulting product matrix passes unmodified through corner-turn memory 145 and is multiplied by R matrix 73 in matrix multiplier B 147 to produce a second processed matrix. Adder 150 is placed into the summing mode and, as each matrix element of the second processed matrix is sent to first adder input 151, a corresponding element of first processed matrix 241 is retrieved from destination image memory 160 and is sent to second adder input 153. The matrix sum of matrix 241 and second processed matrix is temporarily stored in destination image memory 160 as a third processed matrix 243.

In a third processing cycle, address sequencer and control unit 170 sends matrix 32*m* from source image memory 130 to matrix multiplier A 141 for multiplication with R-transpose matrix 75. The resulting product matrix passes unmodified through corner-turn memory 145 and is multiplied by R-transpose matrix 75 in matrix multiplier B 147 to produce a fourth processed matrix. Adder 150 remains in the summing mode and, as each matrix element of the fourth processed matrix is sent to first adder input 151, a corresponding element of third processed matrix 243 is retrieved from destination image memory 160 and is sent to second adder input 153. The matrix sum of matrix 243 and the fourth processed matrix is temporarily stored in destination image memory 160 as a fifth processed matrix 245.

In a fourth processing cycle, address sequencer and control unit 170 sends matrix 32*r* from source image memory 130 to matrix multiplier A 141 for multiplication with R-transpose matrix 75. The resulting product matrix passes unmodified through corner-turn memory 145 and is multiplied by R matrix 73 in matrix multiplier B 147 to produce a sixth processed matrix. As each matrix element of the sixth processed matrix is sent to first adder input 151 a corresponding element of fifth processed matrix 245 is retrieved from destination image memory 160 and is sent to second adder input 153. The matrix sum of matrix 245 and the sixth processed matrix is read into destination image memory 160 as extended frequency-coefficient matrix 62*d*.

D. Direct Downconversion of Abutting Matrices

Figure 18:
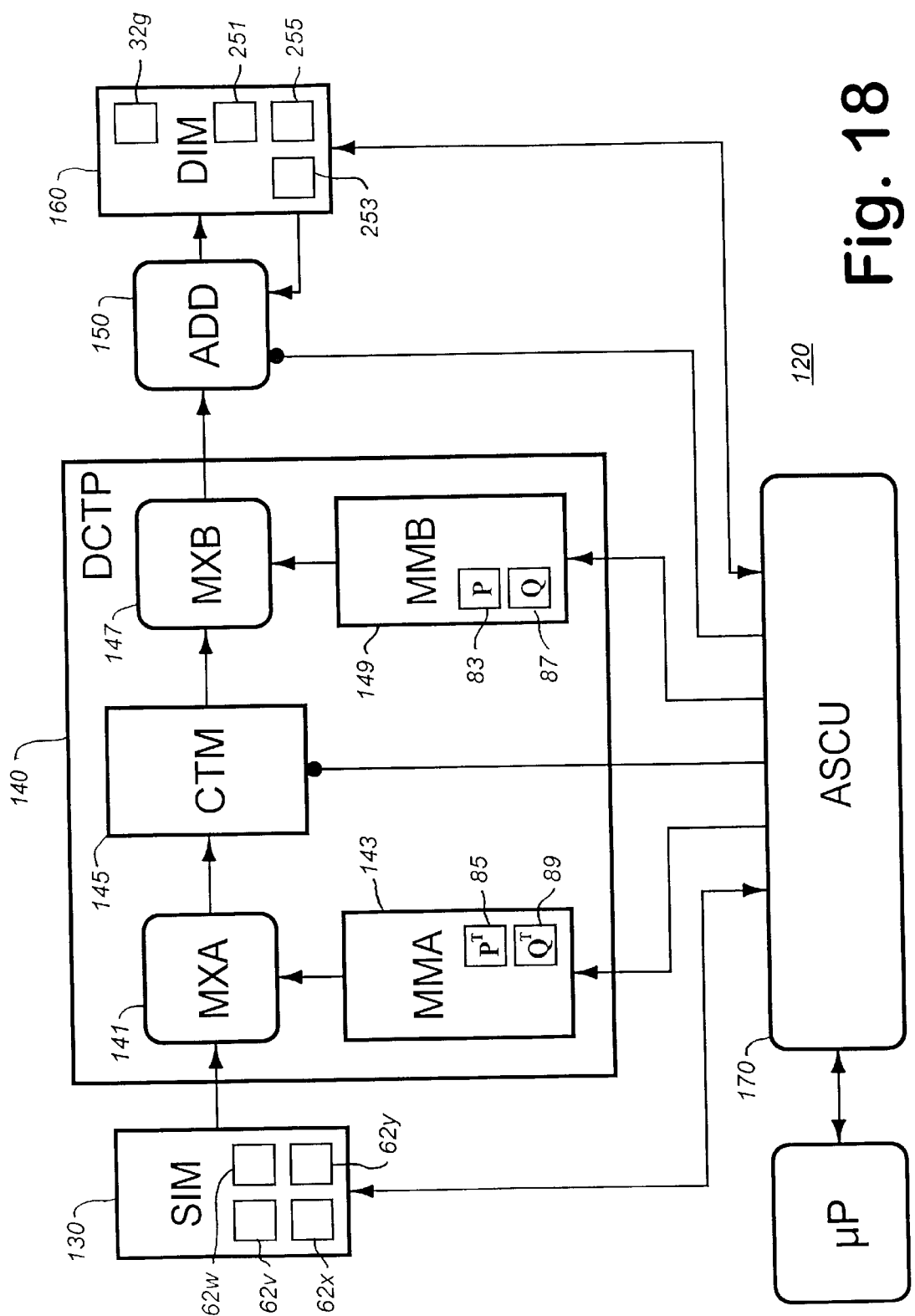
FIG. 18 is a functional block diagram of the matrix array convertor of FIG. 14B illustrating the direct downconversion of extended frequency-coefficient matrices, in accordance with the disclosed method of FIG. 13.

Direct downconversion of extended frequency-coefficient matrices 62*v*, 62*w*, 62*x*, and 62*y* into standard frequency-coefficient matrix 32*g*, shown in FIG. 13 as step 250, is accomplished using a sequence of processing steps similar to that described above for direct upconversion of abutting image-data quarter-blocks. Matrix array convertor 120 is configured so as to place corner-turn memory 145 into the pass-through mode, in FIG. 18. Address sequencer and control unit 170 loads P-transpose matrix 85 and Q-transpose matrix 89 into matrix memory A 143, and loads P matrix 83 and Q matrix 87 into matrix memory B 149. In a first processing cycle, address sequencer and control unit 170 multiplies matrix 62*v* with P-transpose matrix 85 in matrix multiplier A 141, and multiplies the resulting product matrix with P matrix 83 in matrix multiplier B 147 to produce a first processed matrix 251. Adder 150 is placed into the pass-through mode and matrix 251 is temporarily stored in destination image memory 160.

In a second processing cycle, matrix 62*w* is multiplied by Q-transpose matrix 89 in matrix multiplier A 141, and the resulting product matrix is multiplied by P matrix 83 in matrix multiplier B 147 to produce a second processed matrix. Adder 150 is placed into the summing mode, and matrix 251 and the second processed matrix are added to produce a third processed matrix 253 in destination matrix 160. In a third processing cycle, matrix 62*x* is multiplied by P-transpose matrix 85 in matrix multiplier A 141, and the resulting product matrix is multiplied by Q matrix 87 in matrix multiplier B 147. The resulting matrix is added to matrix 253 to produce a fourth processed matrix 255 in destination matrix 160. In a fourth processing cycle, matrix 62*y* is multiplied by Q-transpose matrix 89 in matrix multiplier A 141, and the resulting product matrix is multiplied by Q matrix 87 in matrix multiplier B 147. The resulting matrix is added to matrix 255 to produce standard frequency-coefficient matrix 32*g* in destination matrix 160.

Although a particular sequence of processing cycles has been used to describe the operation of matrix array convertor 120, one skilled in the art will recognize that another sequence of the processing cycles will produce the same numerical results and it should not, therefore, be construed that the disclosed device is limited to the described sequence of processing cycles. Other embodiments of the invention, including additions, subtractions, deletions, and other modifications of the preferred disclosed embodiments of the invention will be obvious to those skilled in the art and are within the scope of the following claims.

What is claimed is:

1. A method for converting an array of frequency-coefficient matrices between standard and extended formats, the standard format being a configuration in which the frequency-coefficient matrices are transforms of unoverlapped image-data matrices and the extended format being a configuration in which the frequency-coefficient matrices are transforms of overlapped image-data matrices, the respective image-data matrices comprising image-data terms corresponding to pixels from an original image, said method comprising the steps of:

obtaining first and second frequency-coefficient matrices, said frequency-coefficient matrices formatted in one of either standard or extended formats;

deriving a first conversion matrix;

transposing said first conversion matrix to form a first transpose conversion matrix;

deriving a first product matrix by matrix multiplying the first frequency-coefficient matrix and said first conversion matrix;

deriving a second product matrix by matrix multiplying the second frequency-coefficient matrix and said first transpose conversion matrix; and deriving a converted matrix, said converted matrix comprising a function of said product matrices and formatted in the other of either standard or extended formats.

2. The method of claim 1 wherein said step of deriving a first product matrix further comprises multiplication with said first transpose conversion matrix, and said step of deriving a second product matrix further comprises multiplication with said first conversion matrix.

3. The method of claim 2 further comprising the steps of:

obtaining third and fourth frequency-coefficient matrices;

deriving a third product matrix by matrix multiplying the third frequency-coefficient matrix, said first conversion matrix, and said first transpose conversion matrix; and, deriving a fourth product matrix by matrix multiplying the fourth frequency-coefficient matrix, said first transpose conversion matrix, and said first conversion matrix;

such that said converted matrix comprises the sum of four product matrices in accordance with the expression $$\sum_{i=1}^{4} R_1 \times M_i \times R_2$$

wherein $R_1$, $R_2$ denote either said conversion matrix or said transpose conversion matrix and $M_i$ denotes a frequency-coefficient matrix.

4. The method of claim 1 wherein said first conversion matrix comprises the product of three matrices given by the expression
C×H×C$^T$ where C$^T$ denotes the transpose of the basis matrix.

5. The method of claim 4 wherein H comprises the matrix:

$$\begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}$$

6. The method of claim 1 further comprising the steps of deriving a second conversion matrix; and, transposing said second conversion matrix to form a second transpose conversion matrix.

7. The method of claim 6 wherein said step of deriving a first product matrix further comprises multiplication with said second transpose conversion matrix, and said step of deriving a second product matrix further comprises multiplication with said second conversion matrix.

8. The method of claim 7 further comprising the steps of:

obtaining third and fourth frequency-coefficient matrices;

deriving a third product matrix by matrix multiplying the third frequency-coefficient matrix, said first conversion matrix, and said first transpose conversion matrix; and, deriving a fourth product matrix by matrix multiplying the fourth frequency-coefficient matrix, said second conversion matrix, and said second transpose conversion matrix;

such that said converted matrix comprises the sum of four product matrices in accordance with the expression $$P \times M_1 \times P^T + P \times M_2 \times Q^T + Q \times M_3 \times P^T + Q \times M_4 \times Q^T$$

where P denotes said first conversion matrix, Q denotes said second conversion matrix, and $M_i$ denotes a frequency-coefficient matrix.

9. The method of claim 6 wherein said second conversion matrix is derived from a matrix comprising terms $t_{mn}$ defined by the expression $$t_{mn} = \frac{1}{\sqrt{2}} k_n \cos\left[\frac{(2m+1)n\pi}{16}\right]$$

and where C$^T$ denotes the transpose of the basis matrix.

10. An apparatus suitable for converting an array of frequency-coefficient matrices between standard and extended formats, the standard format being a configuration in which the frequency-coefficient matrices are transforms of unoverlapped image-data matrices and the extended format being a configuration in which the frequency-coefficient matrices are transforms of overlapped image-data matrices, the respective image-data matrices comprising image-data terms corresponding to pixels from an original image, said apparatus comprising:

source memory means for providing a frequency-coefficient matrix formatted in one of either standard or extended formats;

processing means in electrical communication with said source memory means, said processing means for providing a conversion matrix and for generating a product matrix derived from the frequency-coefficient matrix and said conversion matrix;

summing means in electrical communication with said processing means, said summing means for selectively summing said product matrices to generate a summation matrix;

destination memory means in electrical communication with said summing means, said destination memory means for storing said summation matrix; and control means in electrical communication with said processing means and with said destination memory means, said control means for generating a converted matrix formatted in the other of either standard or extended formats.

11. The apparatus of claim 10 wherein said processing means comprises processing memory means for storing said conversion matrix.

12. The apparatus of claim 10 wherein said processing means comprises multiplication means for generating said product matrix.

13. The apparatus of claim 10 wherein said processing means comprises transposition means for selectively transposing said product matrix.

* * * * *